United States Patent
Aguilar, Jr. et al.

(10) Patent No.: US 7,549,145 B2
(45) Date of Patent: Jun. 16, 2009

(54) PROCESSOR DEDICATED CODE HANDLING IN A MULTI-PROCESSOR ENVIRONMENT

(75) Inventors: Maximino Aguilar, Jr., Austin, TX (US); Mark Richard Nutter, Austin, TX (US); James Michael Stafford, Liberty Hill, TX (US)

(73) Assignee: International Business Machines Corporation, Armonk, NY (US)

(*) Notice: Subject to any disclaimer, the term of this patent is extended or adjusted under 35 U.S.C. 154(b) by 884 days.

(21) Appl. No.: 10/670,836

(22) Filed: Sep. 25, 2003

(65) Prior Publication Data
US 2005/0071513 A1 Mar. 31, 2005

(51) Int. Cl.
G06F 9/45 (2006.01)
(52) U.S. Cl. .................. 717/149; 717/134; 717/147; 718/105
(58) Field of Classification Search ......... 717/168–178, 717/149, 134, 147, 134.1; 718/105; 708/607; 710/68
See application file for complete search history.

(56) References Cited

U.S. PATENT DOCUMENTS

| | | | |
|---|---|---|---|
| 4,394,727 A | 7/1983 | Hoffman et al. | 718/103 |
| 4,787,057 A | 11/1988 | Hammond | 708/607 |
| 4,862,354 A | 8/1989 | Fiacconi et al. | 709/216 |
| 4,945,479 A * | 7/1990 | Rusterholz et al. | 712/3 |
| 5,179,702 A * | 1/1993 | Spix et al. | 718/102 |
| 5,185,861 A | 2/1993 | Valencia | 711/120 |
| 5,307,495 A | 4/1994 | Seino et al. | 718/106 |
| 5,359,721 A | 10/1994 | Kempf et al. | 719/331 |
| 5,394,547 A | 2/1995 | Correnti et al. | 717/175 |
| 5,490,278 A * | 2/1996 | Mochizuki | 708/446 |
| 5,548,798 A | 8/1996 | King | 710/68 |
| 5,560,030 A | 9/1996 | Guttag et al. | 712/16 |
| 5,630,128 A | 5/1997 | Farrell et al. | 718/103 |
| 5,649,184 A * | 7/1997 | Hayashi et al. | 707/8 |
| 5,689,722 A | 11/1997 | Swarztrauber | 712/12 |
| 5,692,193 A | 11/1997 | Jagannathan et al. | 718/106 |
| 5,754,817 A * | 5/1998 | Wells et al. | 711/203 |

(Continued)

FOREIGN PATENT DOCUMENTS

JP 05-242057 9/1993

(Continued)

OTHER PUBLICATIONS

Microsoft Computer Dictionary Fifth Edition, Microsoft, 2002, p. 49—197196.*

(Continued)

*Primary Examiner*—Todd Ingberg
(74) *Attorney, Agent, or Firm*—VanLeeuwen & VanLeeuwen; Matthew B. Talpis

(57) ABSTRACT

Code handling, such as interpreting language instructions or performing "just-in-time" compilation, uses a heterogeneous processing environment that shares a common memory. In a heterogeneous processing environment that includes a plurality of processors, one of the processors is programmed to perform a dedicated code-handling task, such as perform just-in-time compilation or interpretation of interpreted language instructions, such as Java. The other processors request code handling processing that is performed by the dedicated processor. Speed is achieved using a shared memory map so that the dedicated processor can quickly retrieve data provided by one of the other processors.

7 Claims, 49 Drawing Sheets

U.S. PATENT DOCUMENTS

| | | | | |
|---|---|---|---|---|
| 5,790,855 | A * | 8/1998 | Faustini | 717/100 |
| 5,812,843 | A | 9/1998 | Yamazaki et al. | 718/100 |
| 5,835,775 | A | 11/1998 | Washington et al. | 717/153 |
| 5,842,020 | A * | 11/1998 | Faustini | 717/111 |
| 5,887,186 | A * | 3/1999 | Nakanishi | 712/28 |
| 5,913,065 | A * | 6/1999 | Faustini | 717/107 |
| 5,978,831 | A | 11/1999 | Ahamed et al. | 718/105 |
| 6,026,485 | A * | 2/2000 | O'Connor et al. | 712/226 |
| 6,044,218 | A * | 3/2000 | Faustini | 717/107 |
| 6,049,668 | A | 4/2000 | Smith et al. | 717/138 |
| 6,105,111 | A | 8/2000 | Hammarlund et al. | 711/136 |
| 6,128,724 | A | 10/2000 | Lee et al. | 712/32 |
| 6,195,676 | B1 * | 2/2001 | Spix et al. | 718/107 |
| 6,199,179 | B1 | 3/2001 | Kauffman et al. | 714/26 |
| 6,292,822 | B1 * | 9/2001 | Hardwick | 718/105 |
| 6,292,935 | B1 * | 9/2001 | Lueh et al. | 717/148 |
| 6,381,659 | B2 | 4/2002 | Proch et al. | 710/57 |
| 6,381,693 | B2 | 4/2002 | Fish et al. | 713/1 |
| 6,446,218 | B1 | 9/2002 | D'Souza | 714/4 |
| 6,463,521 | B1 * | 10/2002 | Long | 712/213 |
| 6,473,897 | B1 | 10/2002 | Ansari et al. | 717/136 |
| 6,480,818 | B1 | 11/2002 | Alverson et al. | 703/26 |
| 6,496,870 | B1 * | 12/2002 | Faustini | 719/316 |
| 6,513,057 | B1 | 1/2003 | McCrory | 718/102 |
| 6,526,491 | B2 | 2/2003 | Suzuoki et al. | 711/164 |
| 6,532,531 | B1 * | 3/2003 | O'Connor et al. | 712/202 |
| 6,542,926 | B2 * | 4/2003 | Zalewski et al. | 709/213 |
| 6,557,164 | B1 * | 4/2003 | Faustini | 717/107 |
| 6,559,854 | B2 | 5/2003 | Oka et al. | 345/619 |
| 6,567,502 | B2 | 5/2003 | Zellner et al. | 379/45 |
| 6,578,068 | B1 * | 6/2003 | Bowman-Amuah | 709/203 |
| 6,601,233 | B1 * | 7/2003 | Underwood | 717/102 |
| 6,622,219 | B2 | 9/2003 | Tramblay et al. | 711/147 |
| 6,684,390 | B1 * | 1/2004 | Goff | 717/148 |
| 6,704,926 | B1 * | 3/2004 | Blandy et al. | 717/148 |
| 6,718,535 | B1 * | 4/2004 | Underwood | 717/101 |
| 6,728,961 | B1 * | 4/2004 | Velasco | 718/105 |
| 6,789,252 | B1 * | 9/2004 | Burke et al. | 717/100 |
| 6,820,258 | B1 * | 11/2004 | Fink et al. | 717/158 |
| 6,862,608 | B2 | 3/2005 | Buhlman et al. | 709/213 |
| 6,892,298 | B2 | 5/2005 | West | 713/2 |
| 6,895,479 | B2 | 5/2005 | Reimer et al. | 711/152 |
| 6,950,848 | B1 * | 9/2005 | Yousefi'zadeh | 709/203 |
| 6,966,015 | B2 | 11/2005 | Steinberg et al. | 714/47 |
| 6,966,057 | B2 * | 11/2005 | Lueh | 717/158 |
| 6,981,072 | B2 | 12/2005 | Day et al. | 710/22 |
| 6,981,074 | B2 * | 12/2005 | Oner et al. | 710/32 |
| 6,990,653 | B1 * | 1/2006 | Burd et al. | 717/108 |
| 7,043,579 | B2 | 5/2006 | Dhong et al. | 710/107 |
| 7,047,534 | B2 | 5/2006 | Sadovsky et al. | 719/322 |
| 7,062,768 | B2 * | 6/2006 | Kubo et al. | 718/105 |
| 7,080,242 | B2 | 7/2006 | Morris | 713/1 |
| 7,093,258 | B1 * | 8/2006 | Miller et al. | 718/105 |
| 7,103,664 | B1 * | 9/2006 | Novaes et al. | 709/226 |
| 7,124,170 | B1 | 10/2006 | Sibert | 709/216 |
| 7,127,709 | B2 * | 10/2006 | Demsey et al. | 717/148 |
| 7,133,978 | B1 | 11/2006 | James-Roxby et al. | 711/152 |
| 7,134,007 | B2 | 11/2006 | Zimmer et al. | 713/1 |
| 7,137,115 | B2 * | 11/2006 | Sakamoto et al. | 718/102 |
| 7,143,419 | B2 | 11/2006 | Fischer et al. | 719/328 |
| 7,146,613 | B2 * | 12/2006 | Chauvel et al. | 718/1 |
| 7,165,108 | B2 * | 1/2007 | Matena et al. | 709/226 |
| 7,167,916 | B2 | 1/2007 | Willen et al. | 709/226 |
| 7,174,544 | B2 * | 2/2007 | Zee | 717/148 |
| 7,210,148 | B2 * | 4/2007 | Arnold et al. | 719/330 |
| 7,320,123 | B2 * | 1/2008 | Govindarajapuram et al. | 717/124 |
| 2001/0002130 | A1 | 5/2001 | Suzuoki | 345/420 |
| 2002/0046229 | A1 | 4/2002 | Yutaka et al. | 709/102 |
| 2002/0060690 | A1 | 5/2002 | Tanaka et al. | 345/619 |
| 2002/0095523 | A1 | 7/2002 | Shimakawa et al. | 709/316 |
| 2002/0120886 | A1 | 8/2002 | Nguyen et al. | 714/39 |
| 2002/0135582 | A1 | 9/2002 | Suzuoki et al. | 345/502 |
| 2002/0138637 | A1 | 9/2002 | Suzuoki et al. | 709/230 |
| 2002/0138701 | A1 | 9/2002 | Suzuoki et al. | 711/154 |
| 2002/0138707 | A1 | 9/2002 | Suzuoki et al. | 711/163 |
| 2002/0156993 | A1 | 10/2002 | Suzuoki et al. | 712/30 |
| 2003/0009651 | A1 | 1/2003 | Najam et al. | 712/34 |
| 2003/0018691 | A1 | 1/2003 | Bono | 709/106 |
| 2003/0045612 | A1 | 3/2003 | Misura et al. | 523/456 |
| 2003/0055984 | A1 | 3/2003 | Shimakawa et al. | 709/316 |
| 2003/0071840 | A1 | 4/2003 | Huang et al. | 345/736 |
| 2003/0074650 | A1 | 4/2003 | Akgul et al. | 717/129 |
| 2003/0188045 | A1 | 10/2003 | Jacobson | 710/1 |
| 2004/0123188 | A1 | 6/2004 | Srinivasan et al. | 714/44 |
| 2004/0181785 | A1 | 9/2004 | Zwirner et al. | 717/140 |
| 2004/0236914 | A1 | 11/2004 | Day et al. | 711/152 |
| 2004/0260685 | A1 | 12/2004 | Pfleiger et al. | 707/3 |
| 2005/0028148 | A1 | 2/2005 | Civlin | 717/145 |
| 2005/0081187 | A1 | 4/2005 | Odinak et al. | 717/101 |
| 2005/0081202 | A1 | 4/2005 | Brokenshire et al. | 718/100 |
| 2006/0047754 | A1 | 3/2006 | Wenkata Subramanian et al. | 709/206 |

FOREIGN PATENT DOCUMENTS

| | | |
|---|---|---|
| JP | 06-044110 | 2/1994 |
| JP | 08-095757 | 4/1996 |
| JP | 08-147171 | 6/1996 |
| JP | 10-269165 | 10/1998 |
| JP | 2002-342165 | 11/2002 |
| JP | 2002-366534 | 12/2002 |
| JP | 2003-140912 | 5/2003 |

OTHER PUBLICATIONS

IBM Dictionary of Computing, George Mc Daniel, 1994, p. 692.*
The C0-Design of Virtual Machine Using Reconfigurable Hardware, Kenneth B. Kent, Submission 2003, pp. 1-185.*
Distributed Execution of Functional Programs Using JVM, Andre Rauger Du Bois, et al, EUROCAST 2001, 570-582.*
The Hyperion System: Compiling multithread Java bytecode for Distributed Execution, Antoniu G. Bouge et al, 2001, pp. 1279-1297.*
Design and Implemtation of a Distributed Virtual Machine for Networked Computers, Emin Gun Sirer et al, ACM, 1999, pp. 202-216.*
"Design and Implementaiton of a Distributed Virtual Machine for Networked Computers", E.G. Sirer et al, ACM, 1999, pp. 202-216.*
Richard M. Stallman, Using and Porting the GNU Compiler Collection for GCC 3.1, Jun. 22, 2001, Published by the Free Software Foundation, pp. 1-18, 75, and 269-275.
Oram et al., "Managing Projects with make," O'Reilly & Associates, Inc., ISBN 0-937175-90-0, Oct. 1995, pp. 78-80.
Per Bothner, "Compiling Java with GCJ," Linux Journal, Jan. 2003, http://www.linuxjournal.com/article/4860, pp. 1-7.

* cited by examiner

Key Control Table — 3302

| ID | 3306 | 3308 |
|---|---|---|
| 0 | SPU Key | Key Mask |
| 1 | SPU Key | Key Mask |
| 2 | SPU Key | Key Mask |
| ⋮ | | |
| 7 | SPU Key | Key Mask |

Memory Access Control Table

| ID | Base | Size | Access Key | Access Key Mask |
|---|---|---|---|---|
| 0 | Base | Size | Access Key | Access Key Mask |
| 1 | Base | Size | Access Key | Access Key Mask |
| 2 | Base | Size | Access Key | Access Key Mask |
| ⋮ | | | | |
| 63 | Base | Size | Access Key | Access Key Mask |

*Figure 35*

PROCESSOR DEDICATED CODE HANDLING IN A MULTI-PROCESSOR ENVIRONMENT

BACKGROUND OF THE INVENTION

1. Technical Field

The present invention relates in general to a system and method for using a plurality of processors to handle code. More particularly, the present invention relates to a system and method for using heterogeneous processors with one processor handling code requests on behalf of the other processor using a shared memory.

2. Description of the Related Art

Computer systems are becoming more and more complex. The computer industry typically doubles the performance of a computer system every 18 months, such as personal computers, PDAs, and gaming consoles. In order for the computer industry to accomplish this task, the semiconductor industry produces integrated circuits that double in performance every 18 months. A computer system uses an integrated circuit for particular functions based upon the integrated circuit's architecture. Two fundamental architectures are 1) a microprocessor-based architecture and 2) a digital signal processor-based architecture.

An integrated circuit with a microprocessor-based architecture is typically used to handle control operations whereas an integrated circuit with a digital signal processor-based architecture is typically designed to handle signal-processing functions (i.e. mathematical operations). As technology evolves, the computer industry and the semiconductor industry are using both architectures, or processor types, in a computer system design.

Software is another element in a computer system that has been evolving alongside integrated circuit evolution. A software developer writes code in a manner that corresponds to the processor type that executes the code. For example, a processor has a particular number of registers and a particular number of arithmetic logic units (ALUs) whereby the software developer designs his code to most effectively use the registers and the ALUs.

As the semiconductor industry incorporates multiple processor types onto a single device, and as software developers write code to execute on multiple processor type architectures, a challenge found is identifying which files to load on a particular processor type.

Executable files typically employ a runtime loader which loads dependent files onto memory. The runtime loader, however, assumes that the same processor that is executing the runtime loader executes the dependent files. In a multi-processor environment, however, this may not be the case. In addition, in a heterogeneous processor environment, the code for a particular file is formatted for a particular processor type and may not run if the code is loaded on a different processor type.

A notable exception to this, however, is an environment that uses a "virtual machine" (such as a Java Virtual Machine (JVM), so that the applications are compiled to operate using the virtual machine with each supported operating environment employing a different version of the virtual machine that operates on the operating environment. A challenge of virtual machines, however, is that they require system resources to manage the virtual environment (i.e., a garbage-collected heap, etc.) and, because the application code is being performed by a virtual machine rather than directly by a processor, virtual machine code is traditionally slower and less efficient than code that executes directly on a processor.

In gaming environments, large quantities of code are loaded to establish the game environment as well prepare for the various decisions that might be made by the user of the game. For example, if a game allowed the user to move a game character to various locations, different code to perform different effects is either loaded when the user makes the decision or at the beginning of the game. If the code is loaded when the user makes a decision, there is often a noticeable time lag as the computer system fetches the code corresponding to the user's decision from a hard drive or CD-ROM drive. If the code is loaded at the beginning of the game, lag time can be minimized but large a amount of memory is needed to store code that might not ever be used.

What is needed, therefore, is a system and method for loading and executing code as needed using a plurality of processors that work together to load and execute the code using a common (shared) memory. Furthermore, what is needed is a system and method that allows one processor to prepare instructions, such as script instructions or interpreted instructions, and feed the prepared instructions to another processor for execution.

SUMMARY

A system and method is provided to perform code handling, such as interpreting language instructions or performing "just-in-time" compilation using a heterogeneous processing environment that shares a common memory. In a heterogeneous processing environment that includes a plurality of processors, one of the processors is programmed to perform a dedicated code-handling task, such as perform just-in-time compilation or interpretation of interpreted language instructions, such as Java. The other processors request code handling processing that is performed by the dedicated processor. Speed is achieved using a shared memory map so that the dedicated processor can quickly retrieve data provided by one of the other processors.

The other processors, in turn, receive the generated code from the dedicated processor by reading from the shared memory. In addition, the dedicated processor can be programmed in a specialized environment, such as a gaming environment, to perform a specialized task in response to changes in the environment. For example, when a user of a video game gets to close to an object, such as a lion, that appears in the game, the dedicated processor can generate, or compile, the code that is used to make the lion "roar" or attack a character on the screen that is controlled by the user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 33 illustrates the structure of a key control table for a hardware sandbox in accordance with the present invention;

FIG. 35 illustrates the structure of a memory access control table for a hardware sandbox in accordance with the present invention;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
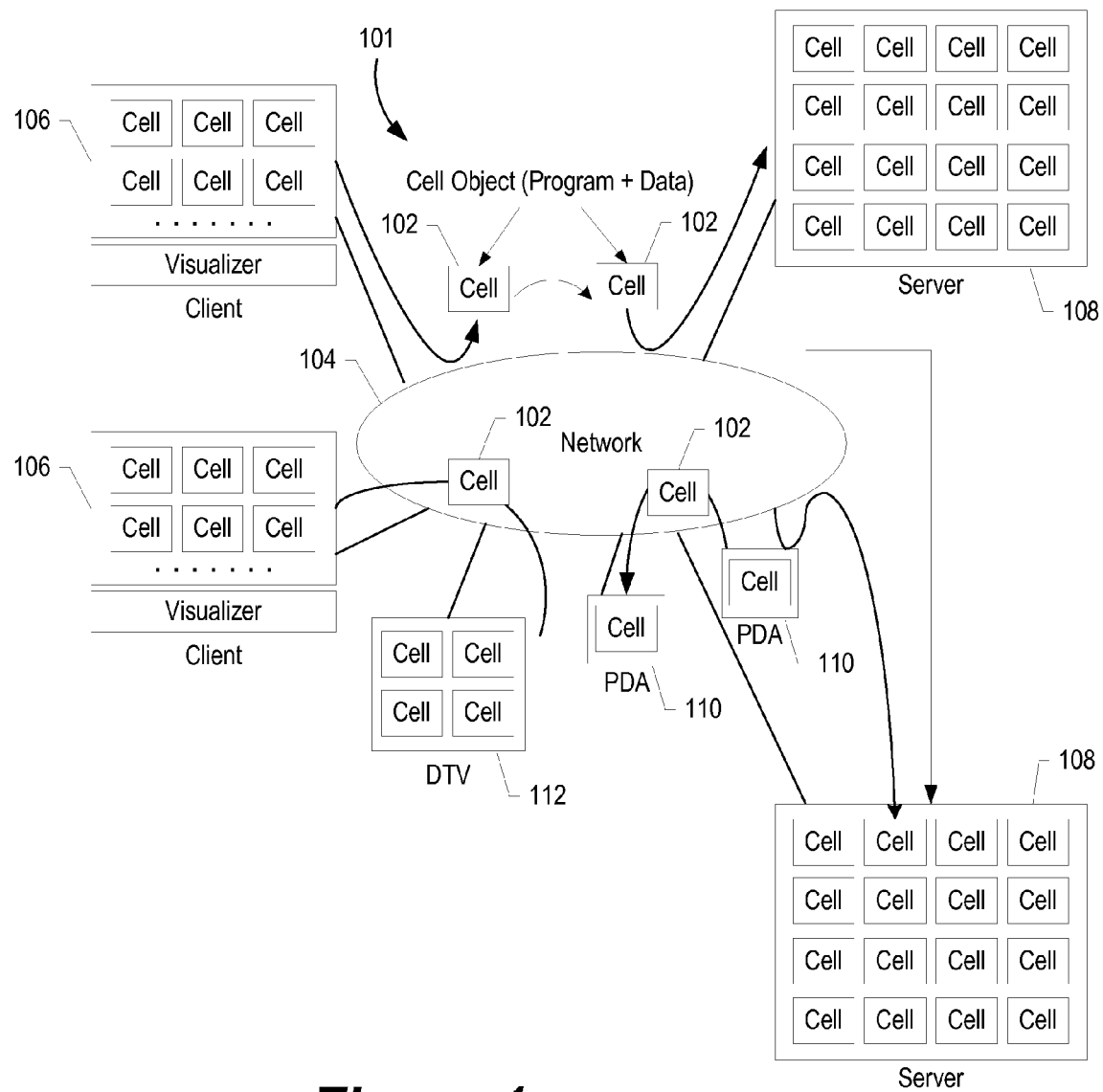
FIG. 1 illustrates—the overall architecture of a computer network in accordance with the present invention.

The overall architecture for a computer system 101 in accordance with the present invention is shown in FIG. 1.

As illustrated in this figure, system 101 includes network 104 to which is connected a plurality of computers and computing devices. Network 104 can be a LAN, a global network, such as the Internet, or any other computer network.

The computers and computing devices connected to network 104 (the network's "members") include, e.g., client computers 106, server computers 108, personal digital assistants (PDAs) 110, digital television (DTV) 112 and other wired or wireless computers and computing devices. The processors employed by the members of network 104 are constructed from the same common computing module. These processors also preferably all have the same ISA and perform processing in accordance with the same instruction set. The number of modules included within any particular processor depends upon the processing power required by that processor.

For example, since servers 108 of system 101 perform more processing of data and applications than clients 106, servers 108 contain more computing modules than clients 106. PDAs 110, on the other hand, perform the least amount of processing. PDAs 110, therefore, contain the smallest number of computing modules. DTV 112 performs a level of processing between that of clients 106 and servers 108. DTV 112, therefore, contains a number of computing modules between that of clients 106 and servers 108. As discussed below, each computing module contains a processing controller and a plurality of identical processing units for performing parallel processing of the data and applications transmitted over network 104.

This homogeneous configuration for system 101 facilitates adaptability, processing speed and processing efficiency. Because each member of system 101 performs processing using one or more (or some fraction) of the same computing module, the particular computer or computing device performing the actual processing of data and applications is unimportant. The processing of a particular application and data, moreover, can be shared among the network's members. By uniquely identifying the cells comprising the data and applications processed by system 101 throughout the system, the processing results can be transmitted to the computer or computing device requesting the processing regardless of where this processing occurred. Because the modules performing this processing have a common structure and employ a common ISA, the computational burdens of an added layer of software to achieve compatibility among the processors is avoided. This architecture and programming model facilitates the processing speed necessary to execute, e.g., real-time, multimedia applications.

To take further advantage of the processing speeds and efficiencies facilitated by system 101, the data and applications processed by this system are packaged into uniquely identified, uniformly formatted software cells 102. Each software cell 102 contains, or can contain, both applications and data. Each software cell also contains an ID to globally identify the cell throughout network 104 and system 101. This uniformity of structure for the software cells, and the software cells' unique identification throughout the network, facilitates the processing of applications and data on any computer or computing device of the network. For example, a client 106 may formulate a software cell 102 but, because of the limited processing capabilities of client 106, transmit this software cell to a server 108 for processing. Software cells can migrate, therefore, throughout network 104 for processing on the basis of the availability of processing resources on the network.

The homogeneous structure of processors and software cells of system 101 also avoids many of the problems of today's heterogeneous networks. For example, inefficient programming models which seek to permit processing of applications on any ISA using any instruction set, e.g., virtual machines such as the Java virtual machine, are avoided. System 101, therefore, can implement broadband processing far more effectively and efficiently than today's networks.

Figure 2:
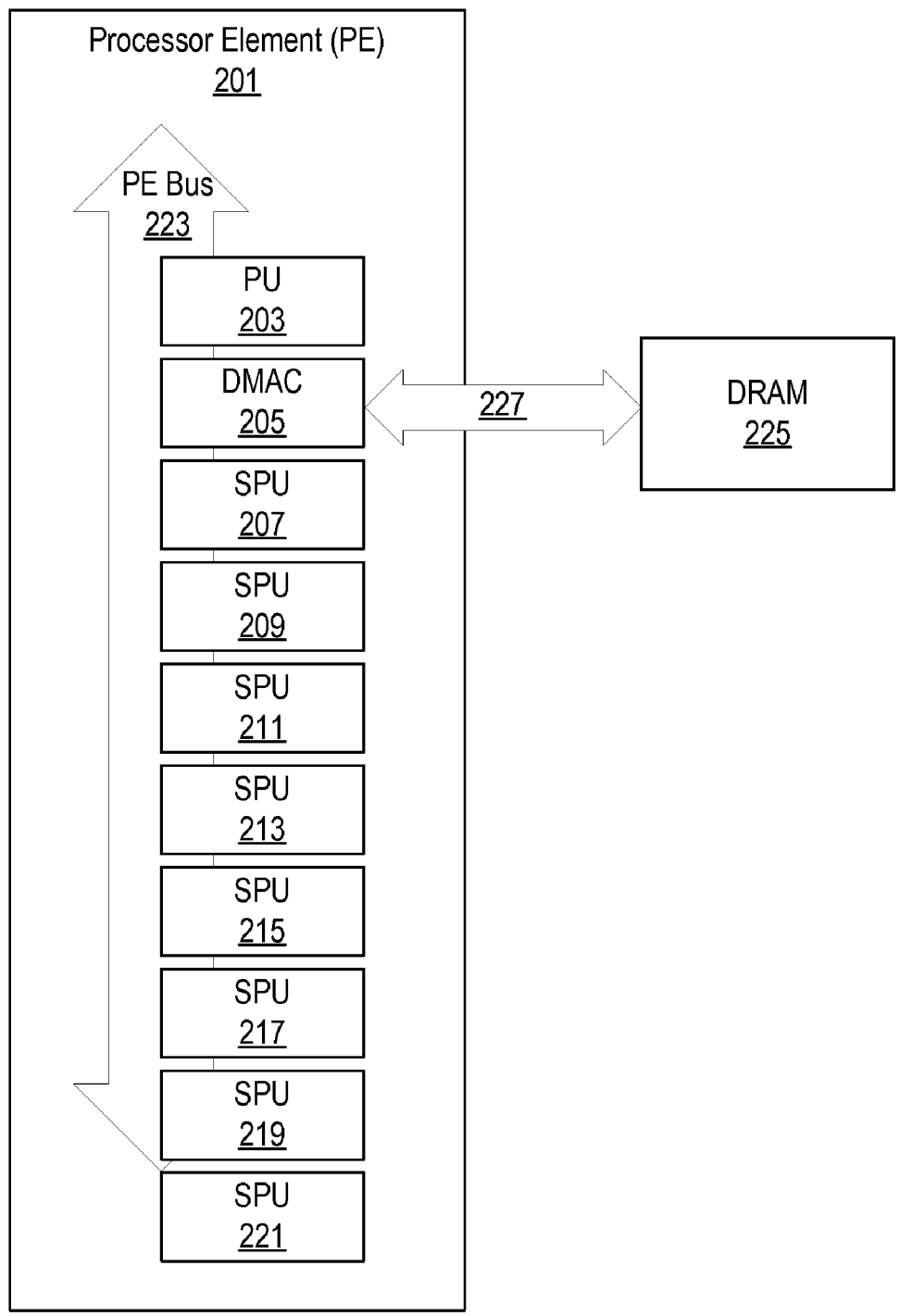
FIG. 2 is a diagram illustrating the structure of a processing unit (PU) in accordance with the present invention.

The basic processing module for all members of network 104 is the processing unit (PU). FIG. 2 illustrates the structure of a PU. As shown in this figure, PE 201 comprises a processing unit (PU) 203, a direct memory access controller (DMAC) 205 and a plurality of synergistic processing units (SPUs), namely, SPU 207, SPU 209, SPU 211, SPU 213, SPU 215, SPU 217, SPU 219 and SPU 221. A local PE bus 223 transmits data and applications among the SPUs, DMAC 205 and PU 203. Local PE bus 223 can have, e.g., a conventional architecture or be implemented as a packet switch network. Implementation as a packet switch network, while requiring more hardware, increases available bandwidth.

PE 201 can be constructed using various methods for implementing digital logic. PE 201 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. PE 201 also could be implemented using superconducting material, e.g., rapid single-flux-quantum (RSFQ) logic.

PE 201 is closely associated with a dynamic random access memory (DRAM) 225 through a high bandwidth memory connection 227. DRAM 225 functions as the main memory for PE 201. Although a DRAM 225 preferably is a dynamic random access memory, DRAM 225 could be implemented using other means, e.g., as a static random access memory (SRAM), a magnetic random access memory (MRAM), an optical memory or a holographic memory. DMAC 205 facilitates the transfer of data between DRAM 225 and the SPUs and PU of PE 201. As further discussed below, DMAC 205 designates for each SPU an exclusive area in DRAM 225 into which only the SPU can write data and from which only the SPU can read data. This exclusive area is designated a "sandbox."

PU 203 can be, e.g., a standard processor capable of stand-alone processing of data and applications. In operation, PU 203 schedules and orchestrates the processing of data and applications by the SPUs. The SPUs preferably are single instruction, multiple data (SIMD) processors. Under the control of PU 203, the SPUs perform the processing of these data and applications in a parallel and independent manner. DMAC 205 controls accesses by PU 203 and the SPUs to the data and applications stored in the shared DRAM 225. Although PE 201 preferably includes eight SPUs, a greater or lesser number of SPUs can be employed in a PU depending upon the processing power required. Also, a number of PUs, such as PE 201, may be joined or packaged together to provide enhanced processing power.

Figure 3:
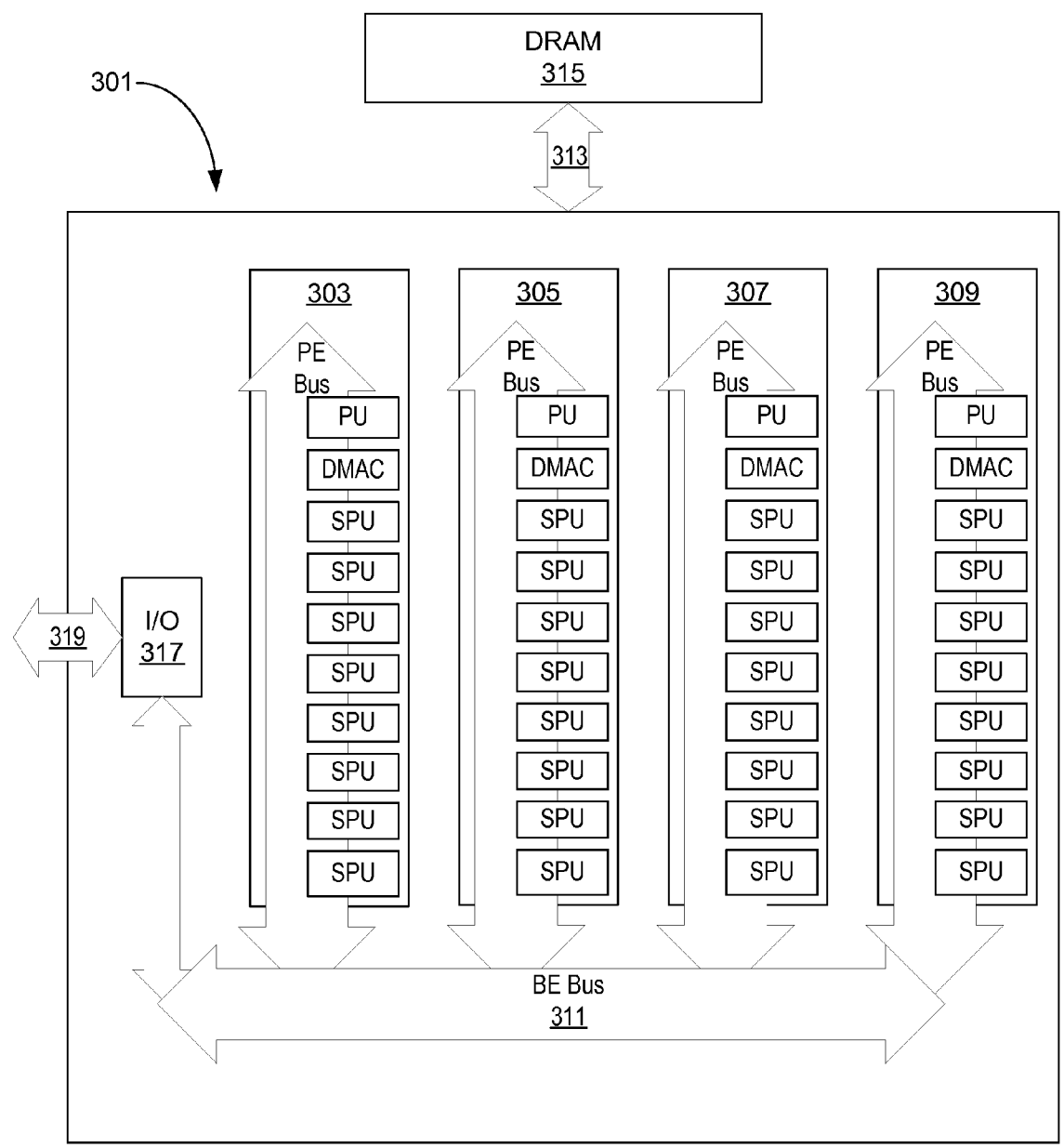
FIG. 3 is a diagram illustrating the structure of a broadband engine (BE) in accordance with the present invention.

For example, as shown in FIG. 3, four PUs may be packaged or joined together, e.g., within one or more chip packages, to form a single processor for a member of network 104. This configuration is designated a broadband engine (BE). As shown in FIG. 3, BE 301 contains four PUs, namely, PE 303, PE 305, PE 307 and PE 309. Communications among these PUs are over BE bus 311. Broad bandwidth memory connection 313 provides communication between shared DRAM 315 and these PUs. In lieu of BE bus 311, communications among the PUs of BE 301 can occur through DRAM 315 and this memory connection.

Input/output (I/O) interface 317 and external bus 319 provide communications between broadband engine 301 and the other members of network 104. Each PU of BE 301 performs processing of data and applications in a parallel and independent manner analogous to the parallel and independent processing of applications and data performed by the SPUs of a PU.

Figure 4:
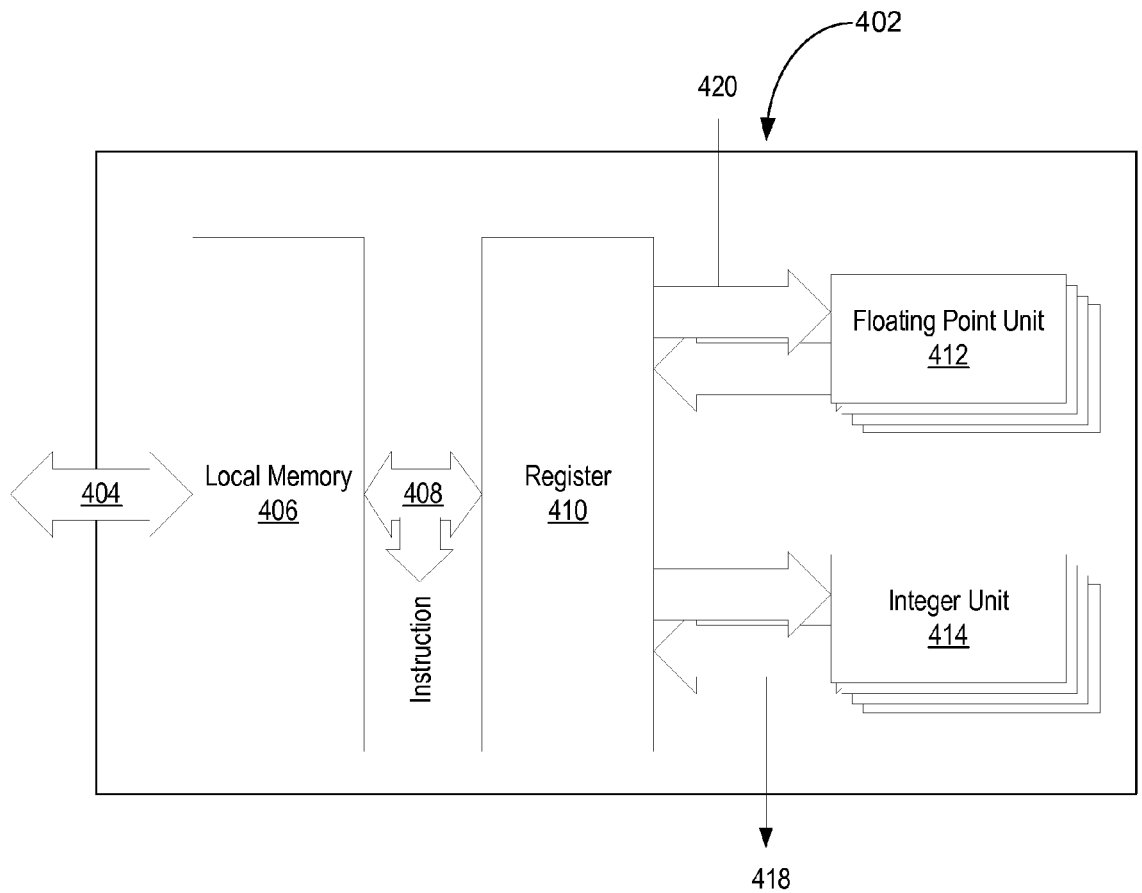
FIG. 4 is a diagram illustrating the structure of an synergistic processing unit (SPU) in accordance with the present invention.

FIG. 4 illustrates the structure of an SPU. SPU 402 includes local memory 406, registers 410, four floating point units 412 and four integer units 414. Again, however, depending upon the processing power required, a greater or lesser number of floating points units 412 and integer units 414 can be employed. In a preferred embodiment, local memory 406 contains 128 kilobytes of storage, and the capacity of registers 410 is 128.times.128 bits. Floating point units 412 preferably operate at a speed of 32 billion floating point operations per second (32 GFLOPS), and integer units 414 preferably operate at a speed of 32 billion operations per second (32 GOPS).

Local memory 406 is not a cache memory. Local memory 406 is preferably constructed as an SRAM. Cache coherency support for an SPU is unnecessary. A PU may require cache coherency support for direct memory accesses initiated by the PU. Cache coherency support is not required, however, for direct memory accesses initiated by an SPU or for accesses from and to external devices.

SPU 402 further includes bus 404 for transmitting applications and data to and from the SPU. In a preferred embodiment, this bus is 1,024 bits wide. SPU 402 further includes internal busses 408, 420 and 418. In a preferred embodiment, bus 408 has a width of 256 bits and provides communications between local memory 406 and registers 410. Busses 420 and 418 provide communications between, respectively, registers 410 and floating point units 412, and registers 410 and integer units 414. In a preferred embodiment, the width of busses 418 and 420 from registers 410 to the floating point or integer units is 384 bits, and the width of busses 418 and 420 from the floating point or integer units to registers 410 is 128 bits. The larger width of these busses from registers 410 to the floating point or integer units than from these units to registers 410 accommodates the larger data flow from registers 410 during processing. A maximum of three words are needed for each calculation. The result of each calculation, however, normally is only one word.

Figure 5:
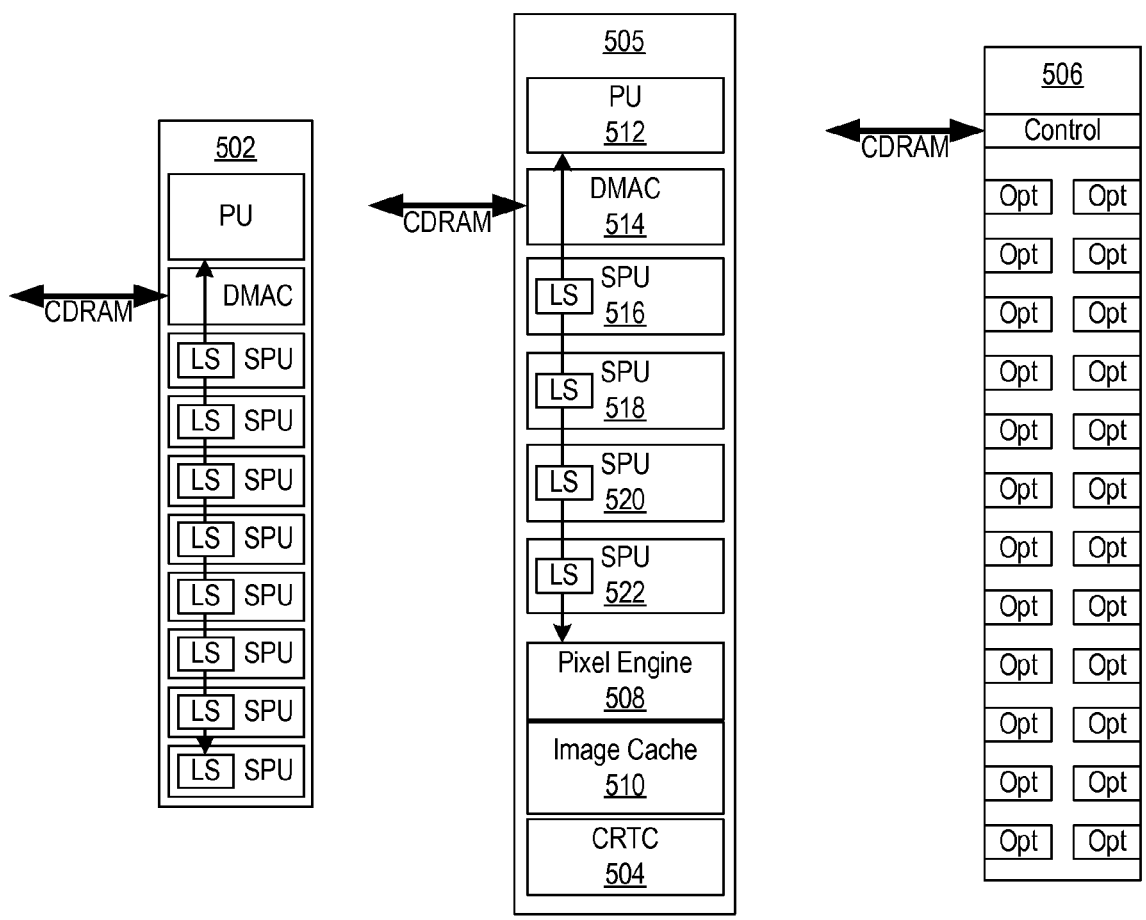
FIG. 5 is a diagram illustrating the structure of a processing unit, visualizer (VS) and an optical interface in accordance with the present invention.
Figure 6:
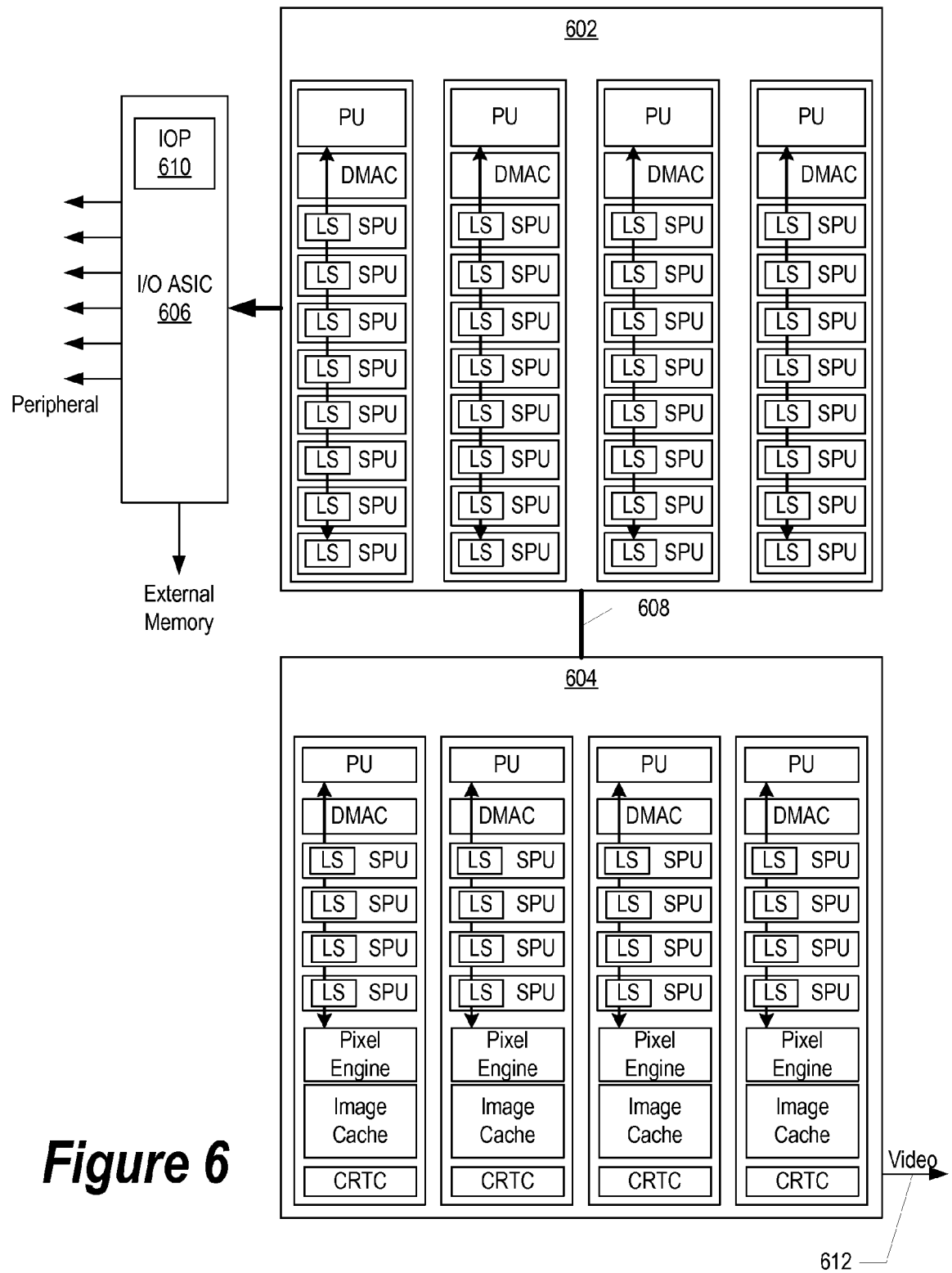
FIG. 6 is a diagram illustrating one combination of processing units in accordance with the present invention.

FIGS. 5-10 further illustrate the modular structure of the processors of the members of network 104. For example, as shown in FIG. 5, a processor may comprise a single PU 502. As discussed above, this PU typically comprises a PU, DMAC and eight SPUs. Each SPU includes local storage (LS). On the other hand, a processor may comprise the structure of visualizer (VS) 505. As shown in FIG. 5, VS 505 comprises PU 512, DMAC 514 and four SPUs, namely, SPU 516, SPU 518, SPU 520 and SPU 522. The space within the chip package normally occupied by the other four SPUs of a PU is occupied in this case by pixel engine 508, image cache 510 and cathode ray tube controller (CRTC) 504. Depending upon the speed of communications required for PU 502 or VS 505, optical interface 506 also may be included on the chip package.

Using this standardized, modular structure, numerous other variations of processors can be constructed easily and efficiently. For example, the processor shown in FIG. 6 comprises two chip packages, namely, chip package 602 comprising a BE and chip package 604 comprising four VSs. Input/output (I/O) 606 provides an interface between the BE of chip package 602 and network 104. Bus 608 provides communications between chip package 602 and chip package 604. Input output processor (IOP) 610 controls the flow of data into and out of I/O 606. I/O 606 may be fabricated as an application specific integrated circuit (ASIC). The output from the VSs is video signal 612.

Figure 7:
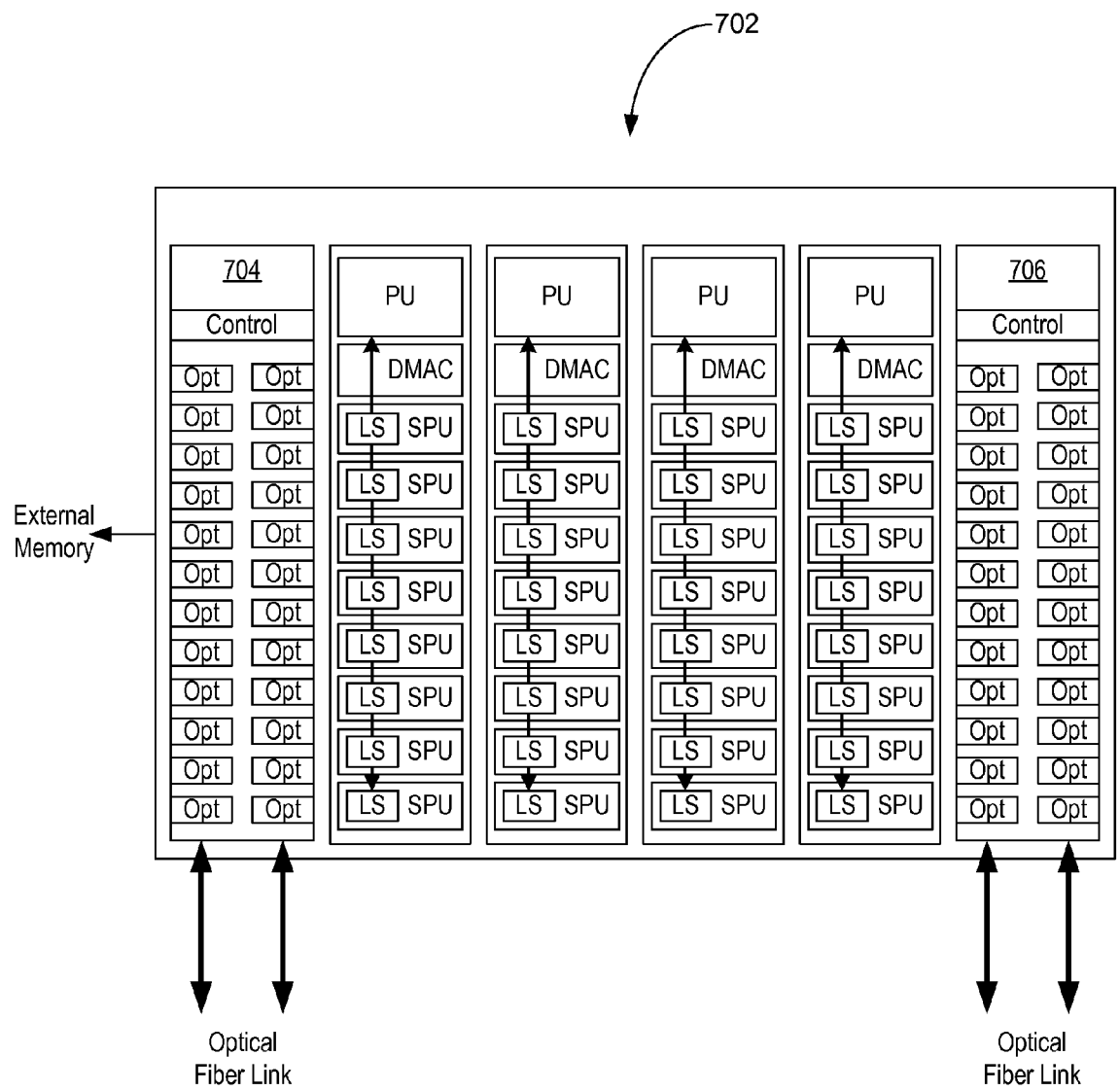
FIG. 7 illustrates another combination of processing units in accordance with the present invention.

FIG. 7 illustrates a chip package for a BE 702 with two optical interfaces 704 and 706 for providing ultra high speed communications to the other members of network 104 (or other chip packages locally connected). BE 702 can function as, e.g., a server on network 104.

Figure 8:
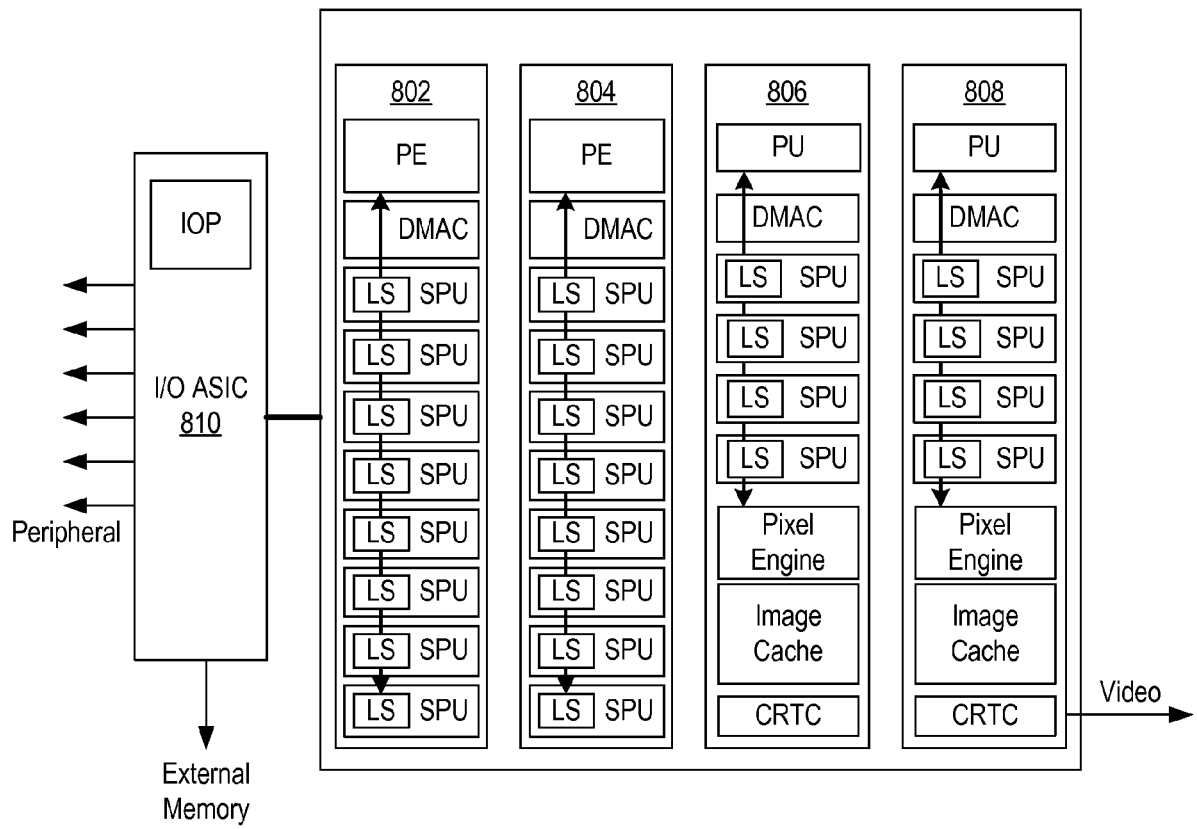
FIG. 8 illustrates yet another combination of processing units in accordance with the present invention.

The chip package of FIG. 8 comprises two PEs 802 and 804 and two VSs 806 and 808. An I/O 810 provides an interface between the chip package and network 104. The output from the chip package is a video signal. This configuration may function as, e.g., a graphics work station.

Figure 9:
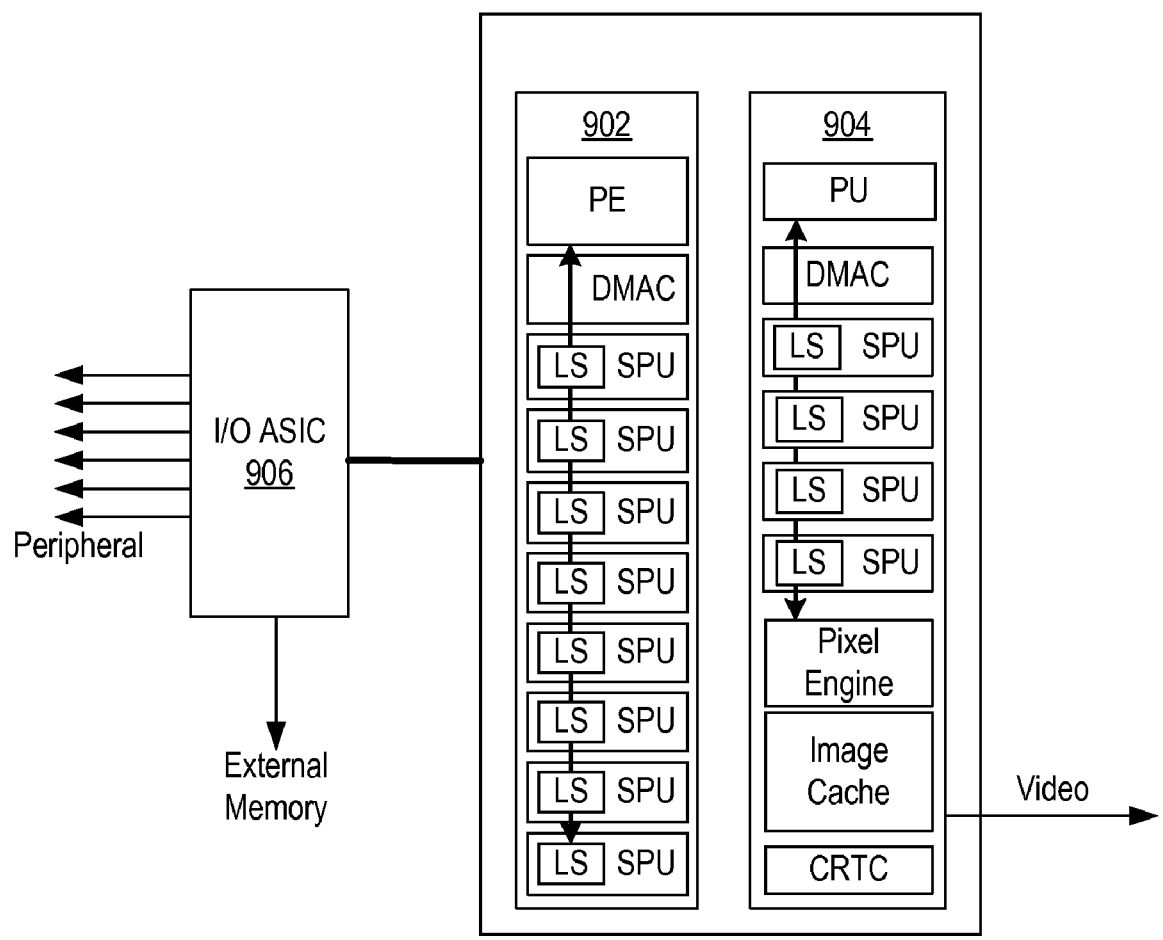
FIG. 9 illustrates yet another combination of processing units in accordance with the present invention.

FIG. 9 illustrates yet another configuration. This configuration contains one-half of the processing power of the configuration illustrated in FIG. 8. Instead of two PUs, one PE 902 is provided, and instead of two VSs, one VS 904 is provided. I/O 906 has one-half the bandwidth of the I/O illustrated in FIG. 8. Such a processor also may function, however, as a graphics work station.

Figure 10:
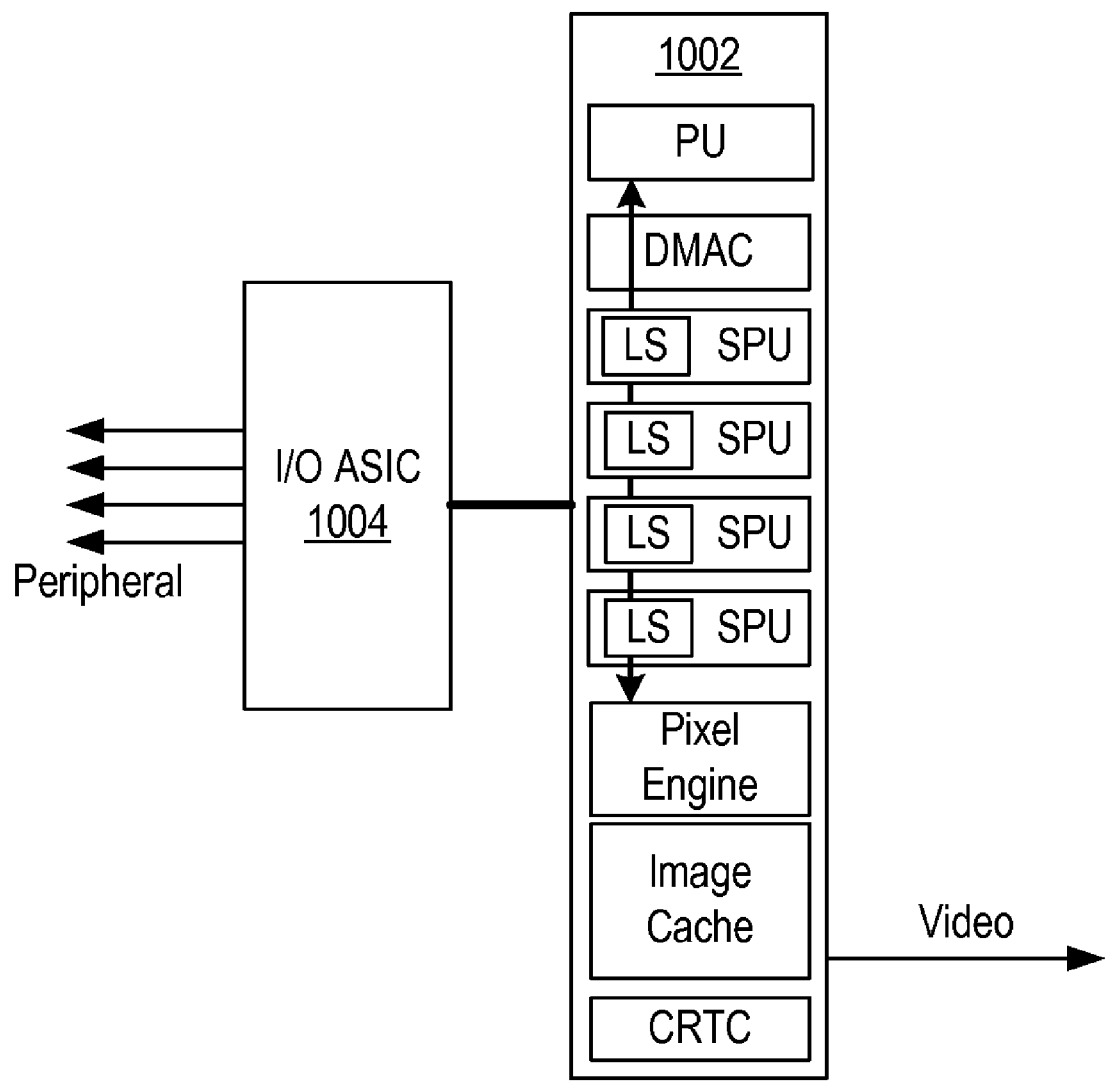
FIG. 10 illustrates yet another combination of processing units in accordance with the present invention.

A final configuration is shown in FIG. 10. This processor consists of only a single VS 1002 and an I/O 1004. This configuration may function as, e.g., a PDA.

Figure 11A:
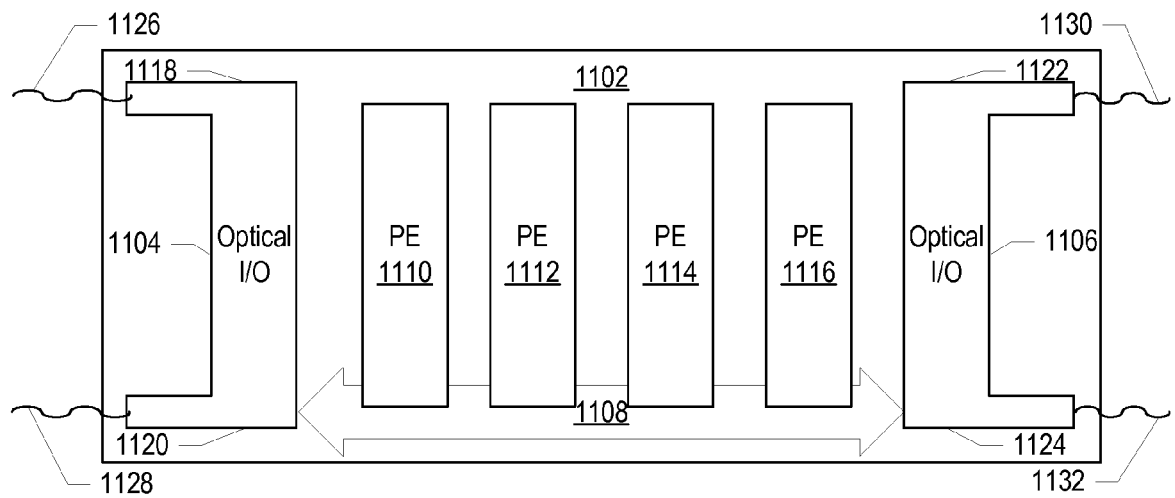
FIG. 11A illustrates the integration of optical interfaces within a chip package in accordance with the present invention.
Figure 11B:
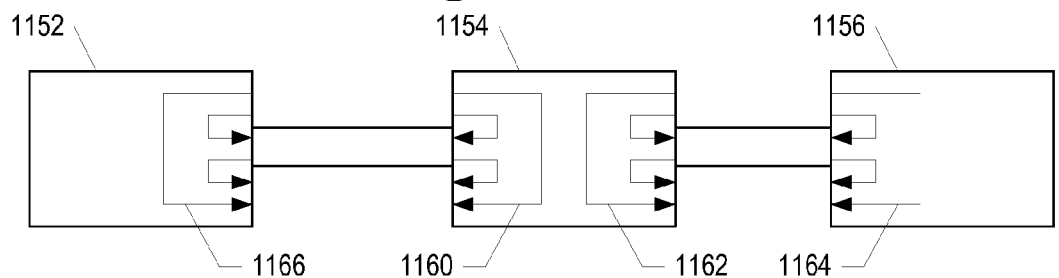
FIG. 11B is a diagram of one configuration of processors using the optical interfaces of FIG. 11A.

FIG. 11A illustrates the integration of optical interfaces into a chip package of a processor of network 104. These optical interfaces convert optical signals to electrical signals and electrical signals to optical signals and can be constructed from a variety of materials including, e.g., gallium arsinide, aluminum gallium arsinide, germanium and other elements or compounds. As shown in this figure, optical interfaces 1104 and 1106 are fabricated on the chip package of BE 1102. BE bus 1108 provides communication among the PUs of BE 1102, namely, PE 1110, PE 1112, PE 1114, PE 1116, and these optical interfaces. Optical interface 1104 includes two ports, namely, port 1118 and port 1120, and optical interface 1106 also includes two ports, namely, port 1122 and port 1124. Ports 1118, 1120, 1122 and 1124 are connected to, respectively, optical wave guides 1126, 1128, 1130 and 1132. Optical signals are transmitted to and from BE 1102 through these optical wave guides via the ports of optical interfaces 1104 and 1106.

plurality of BEs can be connected together in various configurations using such optical wave guides and the four optical ports of each BE. For example, as shown in FIG. 11B, two or more BEs, e.g., BE 1152, BE 1154 and BE 1156, can be connected serially through such optical ports. In this example, optical interface 1166 of BE 1152 is connected through its optical ports to the optical ports of optical interface 1160 of BE 1154. In a similar manner, the optical ports of optical interface 1162 on BE 1154 are connected to the optical ports of optical interface 1164 of BE 1156.

Figure 11C:
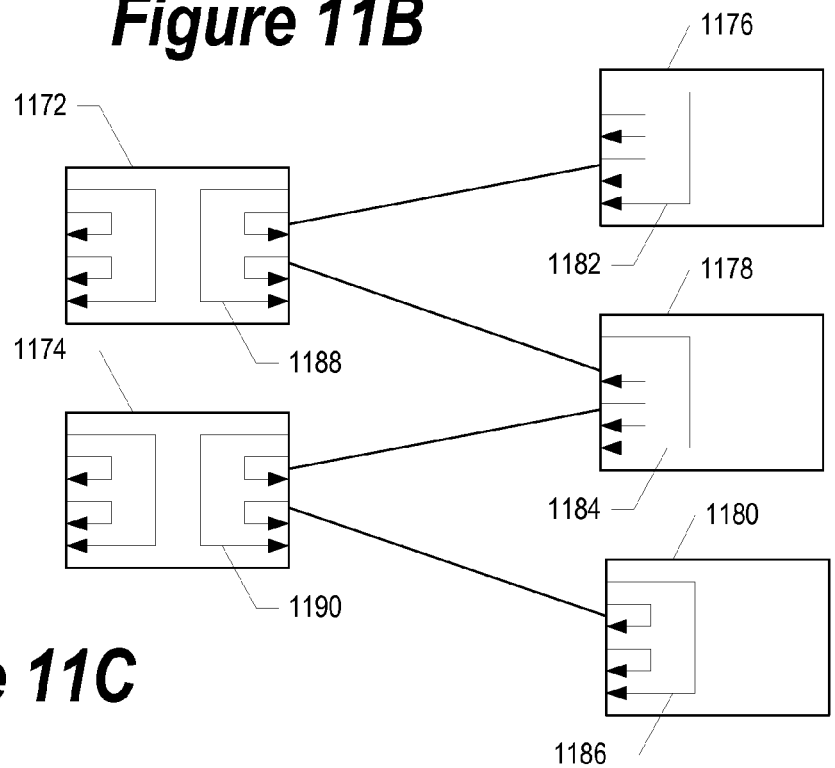
FIG. 11C is a diagram of another configuration of processors using the optical interfaces of FIG. 11A.

A matrix configuration is illustrated in FIG. 11C. In this configuration, the optical interface of each BE is connected to two other BEs. As shown in this figure, one of the optical ports of optical interface 1188 of BE 1172 is connected to an optical port of optical interface 1182 of BE 1176. The other optical port of optical interface 1188 is connected to an optical port of optical interface 1184 of BE 1178. In a similar manner, one optical port of optical interface 1190 of BE 1174 is connected to the other optical port of optical interface 1184 of BE 1178. The other optical port of optical interface 1190 is connected to an optical port of optical interface 1186 of BE 1180. This matrix configuration can be extended in a similar manner to other BEs.

Using either a serial configuration or a matrix configuration, a processor for network 104 can be constructed of any desired size and power. Of course, additional ports can be added to the optical interfaces of the BEs, or to processors having a greater or lesser number of PUs than a BE, to form other configurations.

Figure 12A:
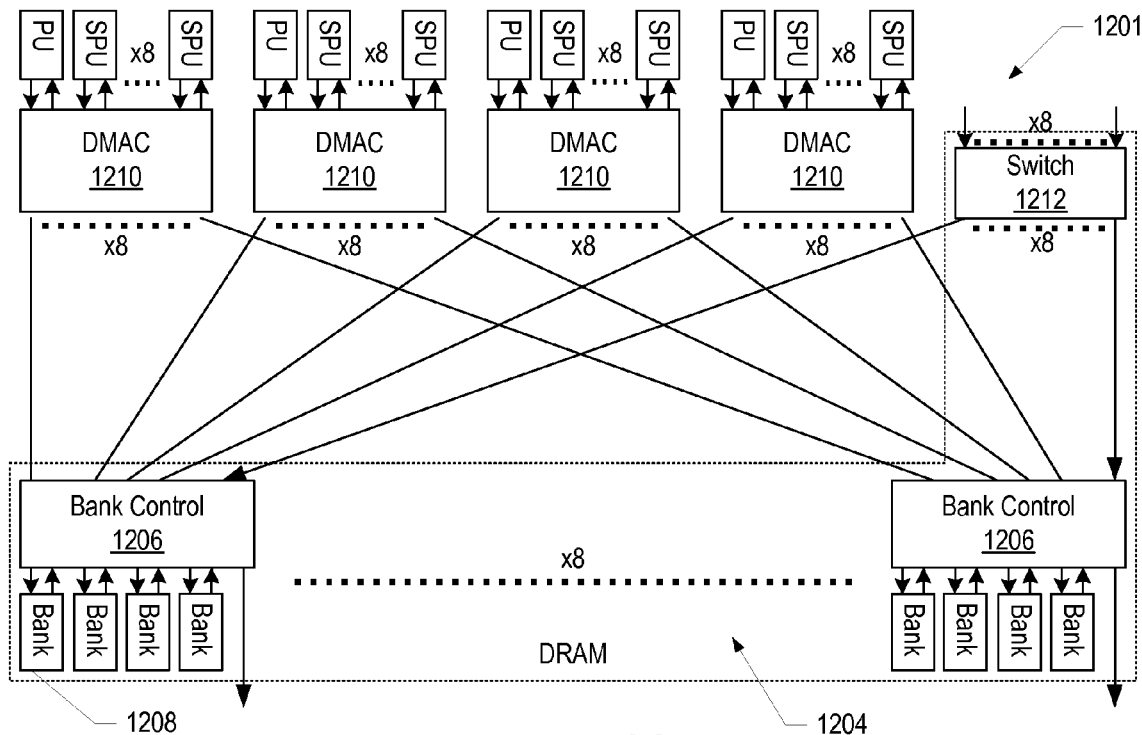
FIG. 12A illustrates the structure of a memory system in accordance with the present invention.

FIG. 12A illustrates the control system and structure for the DRAM of a BE. A similar control system and structure is employed in processors having other sizes and containing more or less PUs. As shown in this figure, a cross-bar switch connects each DMAC 1210 of the four PUs comprising BE 1201 to eight bank controls 1206. Each bank control 1206 controls eight banks 1208 (only four are shown in the figure) of DRAM 1204. DRAM 1204, therefore, comprises a total of sixty-four banks. In a preferred embodiment, DRAM 1204 has a capacity of 64 megabytes, and each bank has a capacity of 1 megabyte. The smallest addressable unit within each bank, in this preferred embodiment, is a block of 1024 bits.

BE 1201 also includes switch unit 1212. Switch unit 1212 enables other SPUs on BEs closely coupled to BE 1201 to access DRAM 1204. A second BE, therefore, can be closely coupled to a first BE, and each SPU of each BE can address twice the number of memory locations normally accessible to an SPU. The direct reading or writing of data from or to the DRAM of a first BE from or to the DRAM of a second BE can occur through a switch unit such as switch unit 1212.

Figure 12B:
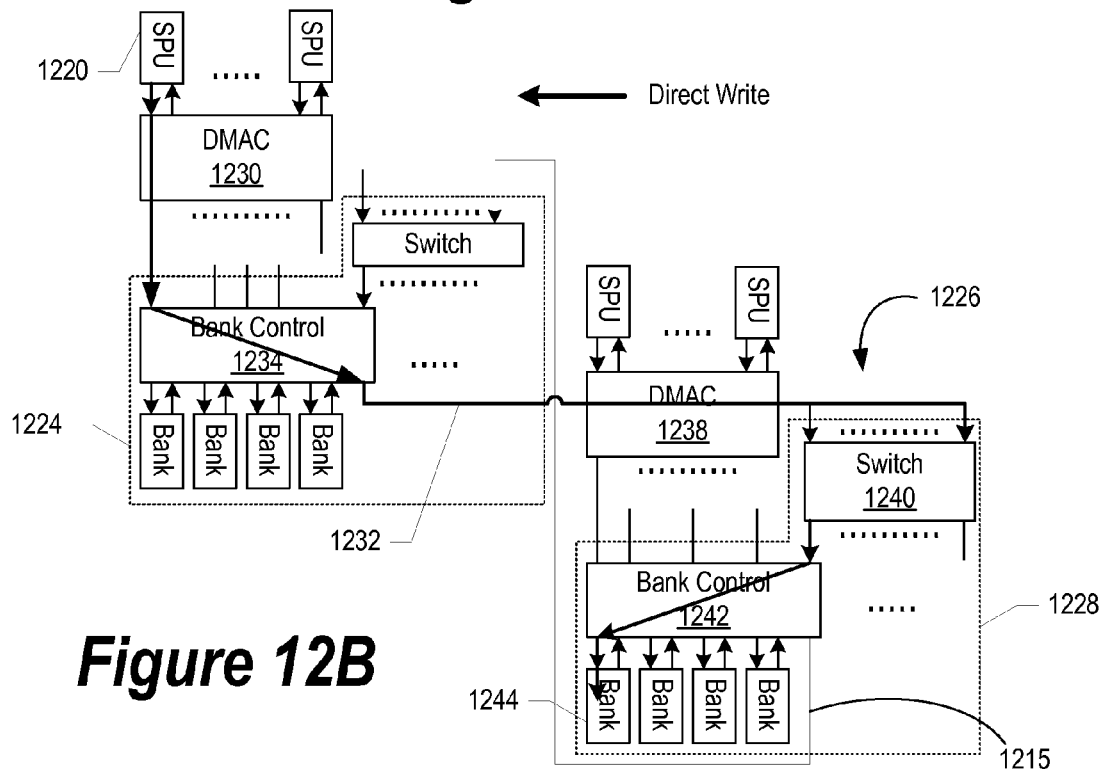
FIG. 12B illustrates the writing of data from a first broadband engine to a second broadband engine in accordance with the present invention.

For example, as shown in FIG. 12B, to accomplish such writing, the SPU of a first BE, e.g., SPU 1220 of BE 1222, issues a write command to a memory location of a DRAM of a second BE, e.g., DRAM 1228 of BE 1226 (rather than, as in the usual case, to DRAM 1224 of BE 1222). DMAC 1230 of BE 1222 sends the write command through cross-bar switch 1221 to bank control 1234, and bank control 1234 transmits the command to an external port 1232 connected to bank control 1234. DMAC 1238 of BE 1226 receives the write command and transfers this command to switch unit 1240 of BE 1226. Switch unit 1240 identifies the DRAM address contained in the write command and sends the data for storage in this address through bank control 1242 of BE 1226 to bank 1244 of DRAM 1228. Switch unit 1240, therefore, enables both DRAM 1224 and DRAM 1228 to function as a single memory space for the SPUs of BE 1226.

Figure 13:
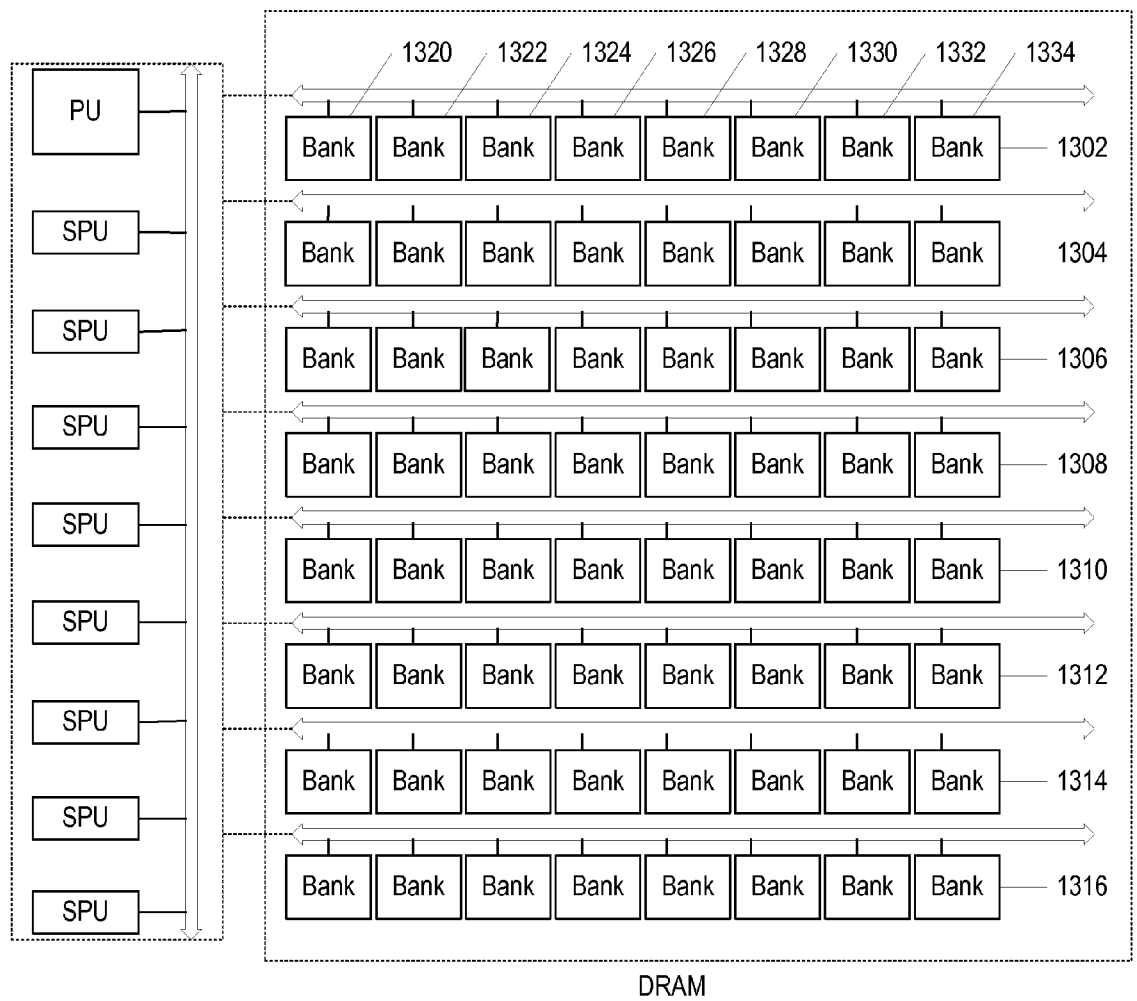
FIG. 13 is a diagram of the structure of a shared memory for a processing unit in accordance with the present invention.

FIG. 13 shows the configuration of the sixty-four banks of a DRAM. These banks are arranged into eight rows, namely, rows 1302, 1304, 1306, 1308, 1310, 1312, 1314 and 1316 and eight columns, namely, columns 1320, 1322, 1324, 1326, 1328, 1330, 1332 and 1334. Each row is controlled by a bank controller. Each bank controller, therefore, controls eight megabytes of memory.

Figure 14A:
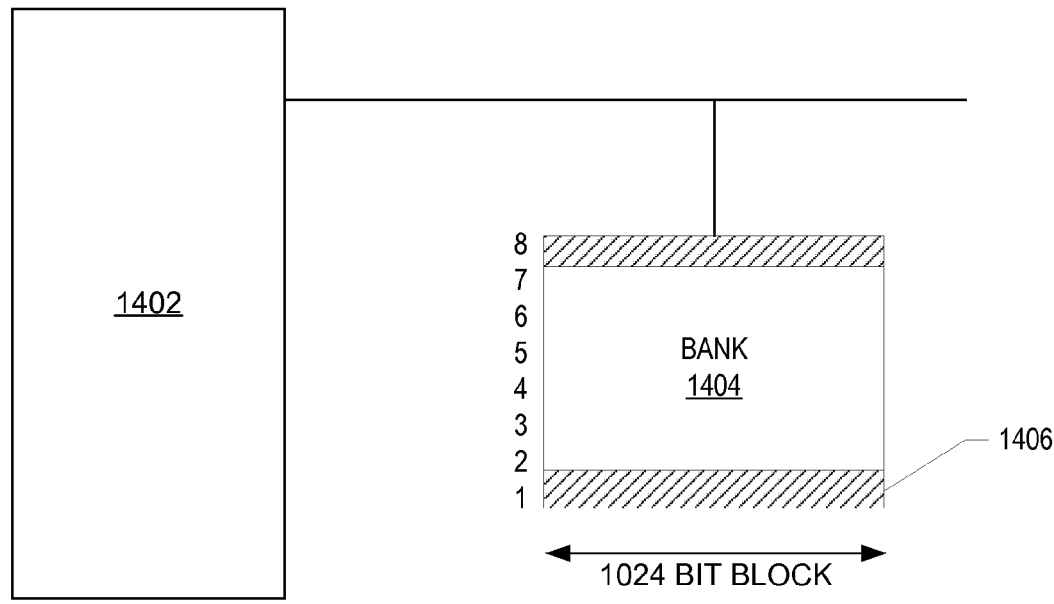
FIG. 14A illustrates one structure for a bank of the memory shown in FIG. 13.
Figure 14B:
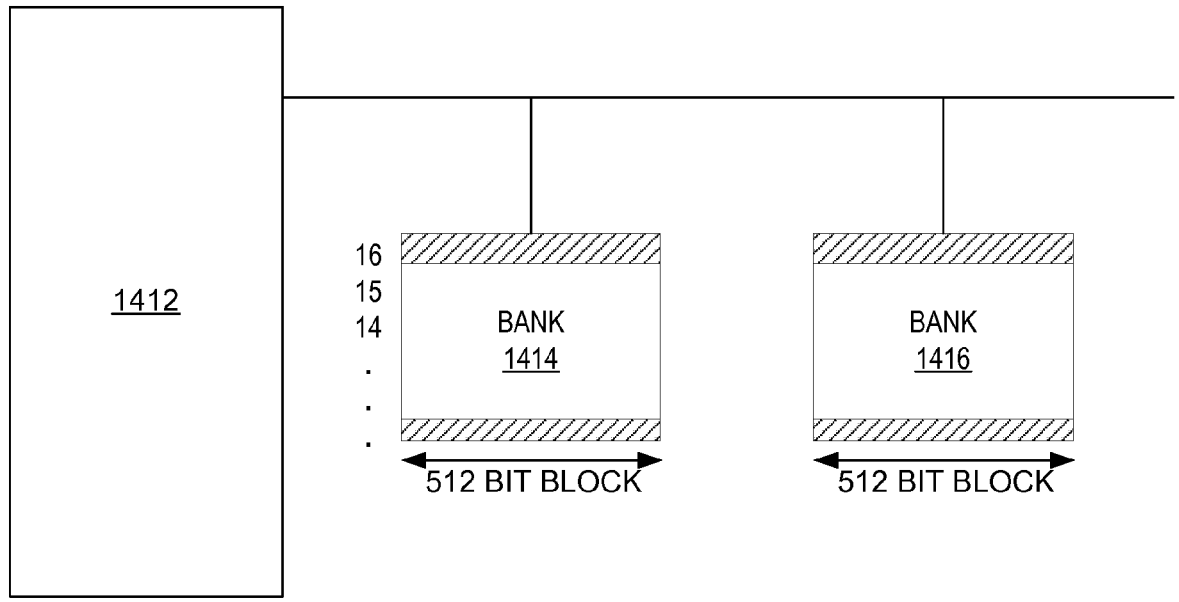
FIG. 14B illustrates another structure for a bank of the memory shown in FIG. 13.

FIGS. 14A and 14B illustrate different configurations for storing and accessing the smallest addressable memory unit of a DRAM, e.g., a block of 1024 bits. In FIG. 14A, DMAC 1402 stores in a single bank 1404 eight 1024 bit blocks 1406. In FIG. 14B, on the other hand, while DMAC 1412 reads and writes blocks of data containing 1024 bits, these blocks are interleaved between two banks, namely, bank 1414 and bank 1416. Each of these banks, therefore, contains sixteen blocks of data, and each block of data contains 512 bits. This interleaving can facilitate faster accessing of the DRAM and is useful in the processing of certain applications.

Figure 15:
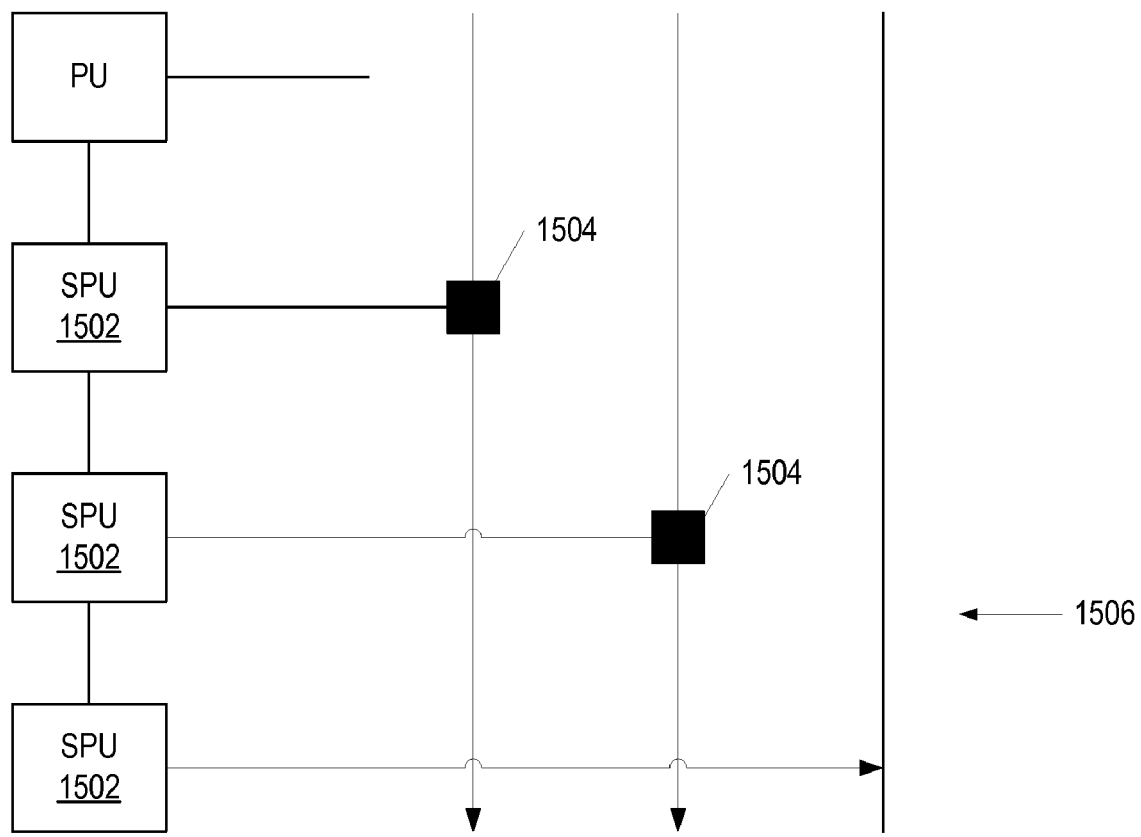
FIG. 15 illustrates a structure for a direct memory access controller in accordance with the present invention.

FIG. 15 illustrates the architecture for a DMAC 1504 within a PE. As illustrated in this figure, the structural hardware comprising DMAC 1506 is distributed throughout the PE such that each SPU 1502 has direct access to a structural node 1504 of DMAC 1506. Each node executes the logic appropriate for memory accesses by the SPU to which the node has direct access.

Figure 16:
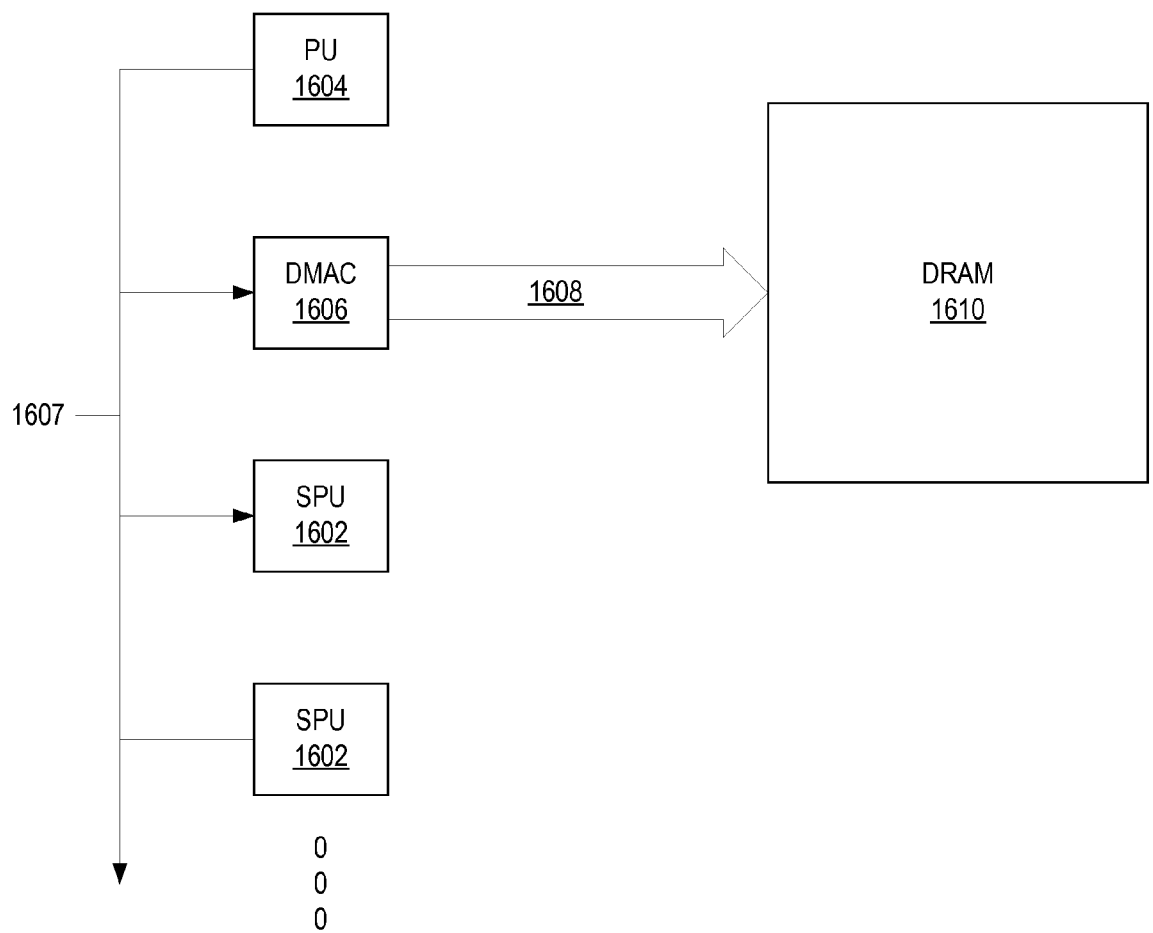
FIG. 16 illustrates an alternative structure for a direct memory access controller in accordance with the present invention.

FIG. 16 shows an alternative embodiment of the DMAC, namely, a non-distributed architecture. In this case, the structural hardware of DMAC 1606 is centralized. SPUs 1602 and PU 1604 communicate with DMAC 1606 via local PE bus 1607. DMAC 1606 is connected through a cross-bar switch to a bus 1608. Bus 1608 is connected to DRAM 1610.

As discussed above, all of the multiple SPUs of a PU can independently access data in the shared DRAM. As a result, a first SPU could be operating upon particular data in its local storage at a time during which a second SPU requests these data. If the data were provided to the second SPU at that time from the shared DRAM, the data could be invalid because of the first SPU's ongoing processing which could change the data's value. If the second processor received the data from the shared DRAM at that time, therefore, the second processor could generate an erroneous result. For example, the data could be a specific value for a global variable. If the first processor changed that value during its processing, the second processor would receive an outdated value. A scheme is necessary, therefore, to synchronize the SPUs' reading and writing of data from and to memory locations within the shared DRAM. This scheme must prevent the reading of data from a memory location upon which another SPU currently is operating in its local storage and, therefore, which are not current, and the writing of data into a memory location storing current data.

To overcome these problems, for each addressable memory location of the DRAM, an additional segment of memory is allocated in the DRAM for storing status information relating to the data stored in the memory location. This status information includes a full/empty (F/E) bit, the identification of an SPU (SPU ID) requesting data from the memory location and the address of the SPU's local storage (LS address) to which the requested data should be read. An addressable memory location of the DRAM can be of any size. In a preferred embodiment, this size is 1024 bits.

The setting of the F/E bit to 1 indicates that the data stored in the associated memory location are current. The setting of the F/E bit to 0, on the other hand, indicates that the data stored in the associated memory location are not current. If an SPU requests the data when this bit is set to 0, the SPU is prevented from immediately reading the data. In this case, an SPU ID identifying the SPU requesting the data, and an LS address identifying the memory location within the local storage of this SPU to which the data are to be read when the data become current, are entered into the additional memory segment.

An additional memory segment also is allocated for each memory location within the local storage of the SPUs. This additional memory segment stores one bit, designated the "busy bit." The busy bit is used to reserve the associated LS memory location for the storage of specific data to be retrieved from the DRAM. If the busy bit is set to 1 for a particular memory location in local storage, the SPU can use this memory location only for the writing of these specific data. On the other hand, if the busy bit is set to 0 for a particular memory location in local storage, the SPU can use this memory location for the writing of any data.

Examples of the manner in which the F/E bit, the SPU ID, the LS address and the busy bit are used to synchronize the reading and writing of data from and to the shared DRAM of a PU are illustrated in FIGS. 17-31.

Figure 17:
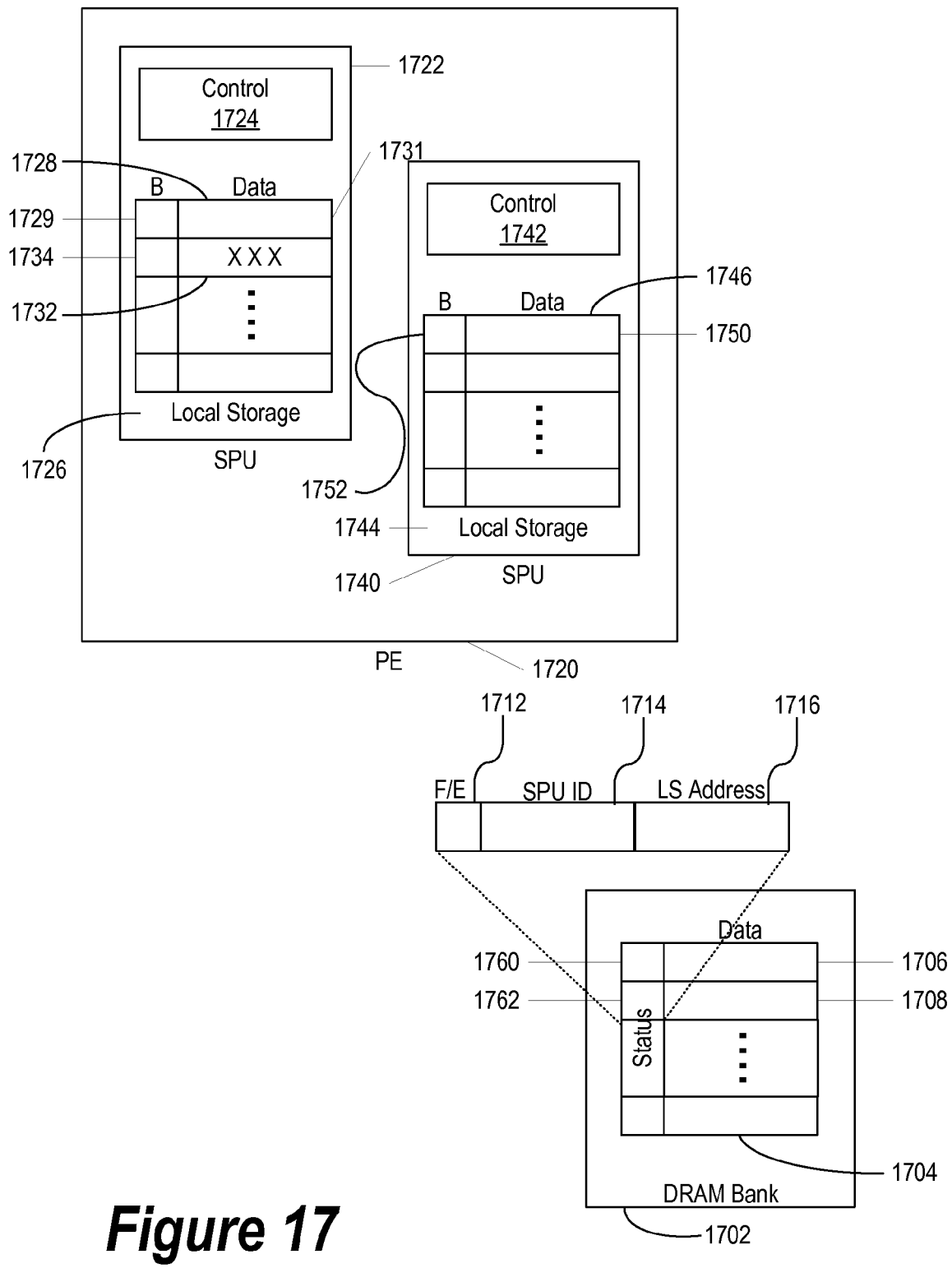
FIGS. 17-31 illustrate the operation of data synchronization in accordance with the present invention.

As shown in FIG. 17, one or more PUs, e.g., PE 1720, interact with DRAM 1702. PE 1720 includes SPU 1722 and SPU 1740. SPU 1722 includes control logic 1724, and SPU 1740 includes control logic 1742. SPU 1722 also includes local storage 1726. This local storage includes a plurality of addressable memory locations 1728. SPU 1740 includes local storage 1744, and this local storage also includes a plurality of addressable memory locations 1746. All of these addressable memory locations preferably are 1024 bits in size.

An additional segment of memory is associated with each LS addressable memory location. For example, memory segments 1729 and 1734 are associated with, respectively, local memory locations 1731 and 1732, and memory segment 1752 is associated with local memory location 1750. A "busy bit," as discussed above, is stored in each of these additional memory segments. Local memory location 1732 is shown with several Xs to indicate that this location contains data.

DRAM 1702 contains a plurality of addressable memory locations 1704, including memory locations 1706 and 1708. These memory locations preferably also are 1024 bits in size. An additional segment of memory also is associated with each of these memory locations. For example, additional memory segment 1760 is associated with memory location 1706, and additional memory segment 1762 is associated with memory location 1708. Status information relating to the data stored in each memory location is stored in the memory segment associated with the memory location. This status information includes, as discussed above, the F/E bit, the SPU ID and the LS address. For example, for memory location 1708, this status information includes F/E bit 1712, SPU ID 1714 and LS address 1716.

Using the status information and the busy bit, the synchronized reading and writing of data from and to the shared DRAM among the SPUs of a PU, or a group of PUs, can be achieved.

Figure 18:
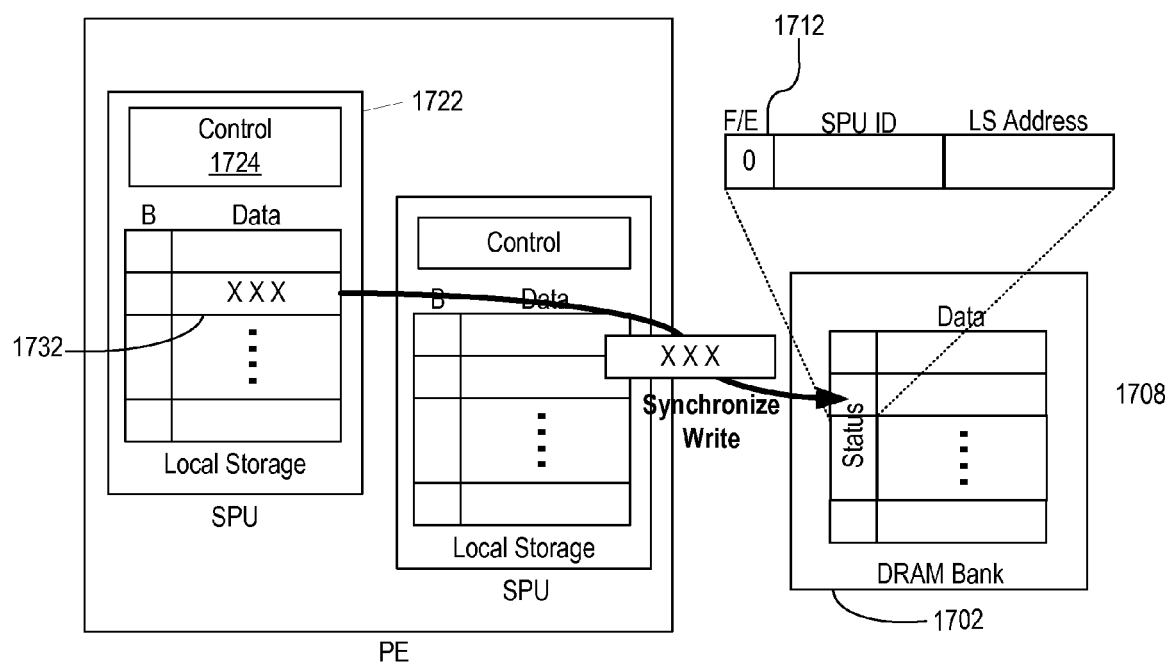

FIG. 18 illustrates the initiation of the synchronized writing of data from LS memory location 1732 of SPU 1722 to memory location 1708 of DRAM 1702. Control 1724 of SPU 1722 initiates the synchronized writing of these data. Since memory location 1708 is empty, F/E bit 1712 is set to 0. As a result, the data in LS location 1732 can be written into memory location 1708. If this bit were set to 1 to indicate that memory location 1708 is full and contains current, valid data, on the other hand, control 1722 would receive an error message and be prohibited from writing data into this memory location.

Figure 19:
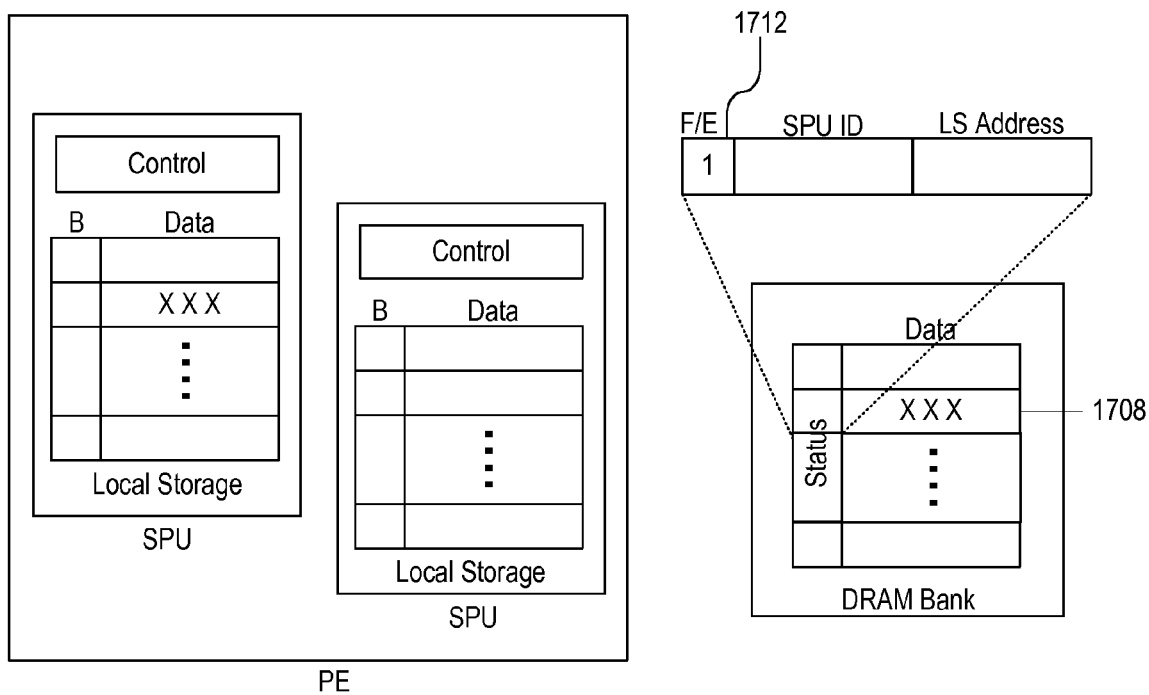

The result of the successful synchronized writing of the data into memory location 1708 is shown in FIG. 19. The written data are stored in memory location 1708, and F/E bit 1712 is set to 1. This setting indicates that memory location 1708 is full and that the data in this memory location are current and valid.

Figure 20:
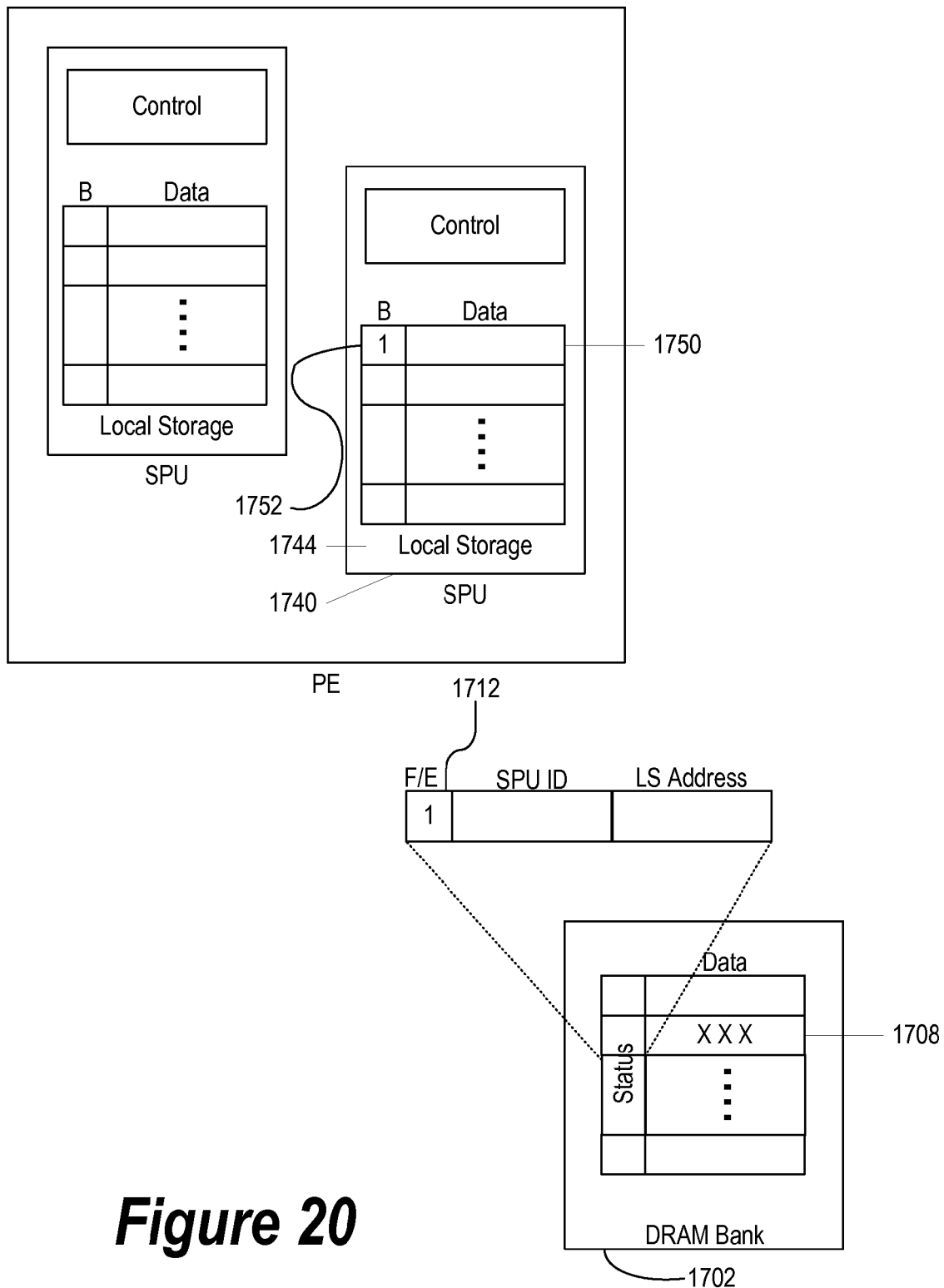

FIG. 20 illustrates the initiation of the synchronized reading of data from memory location 1708 of DRAM 1702 to LS memory location 1750 of local storage 1744. To initiate this reading, the busy bit in memory segment 1752 of LS memory location 1750 is set to 1 to reserve this memory location for these data. The setting of this busy bit to 1 prevents SPU 1740 from storing other data in this memory location.

Figure 21:
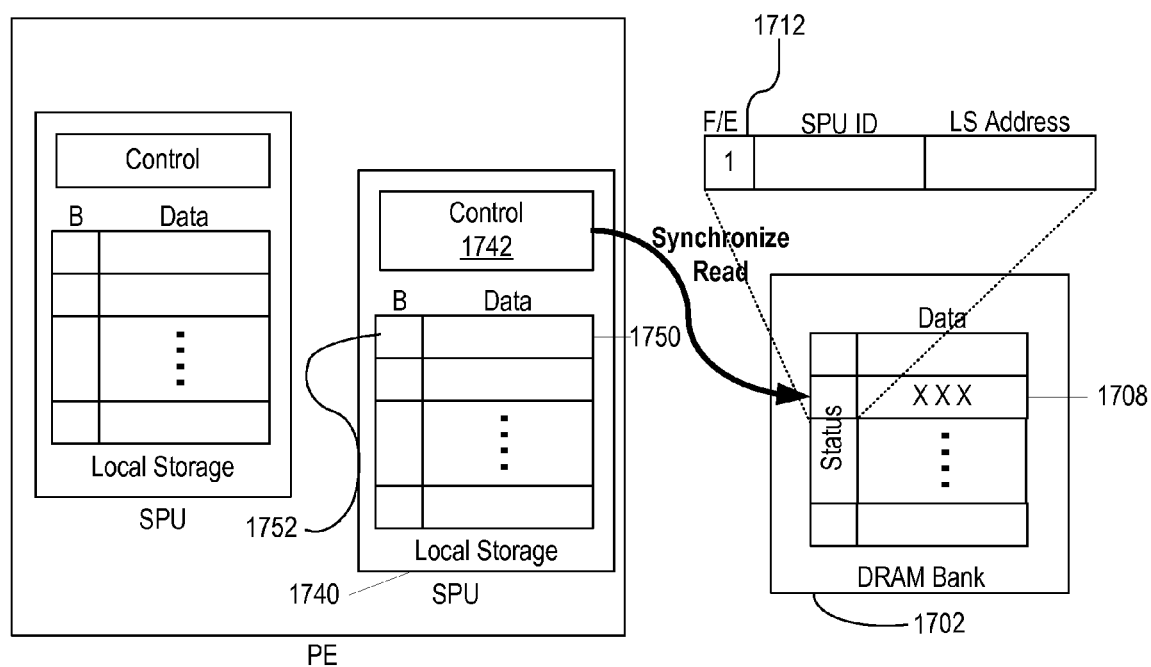
Figure 22:
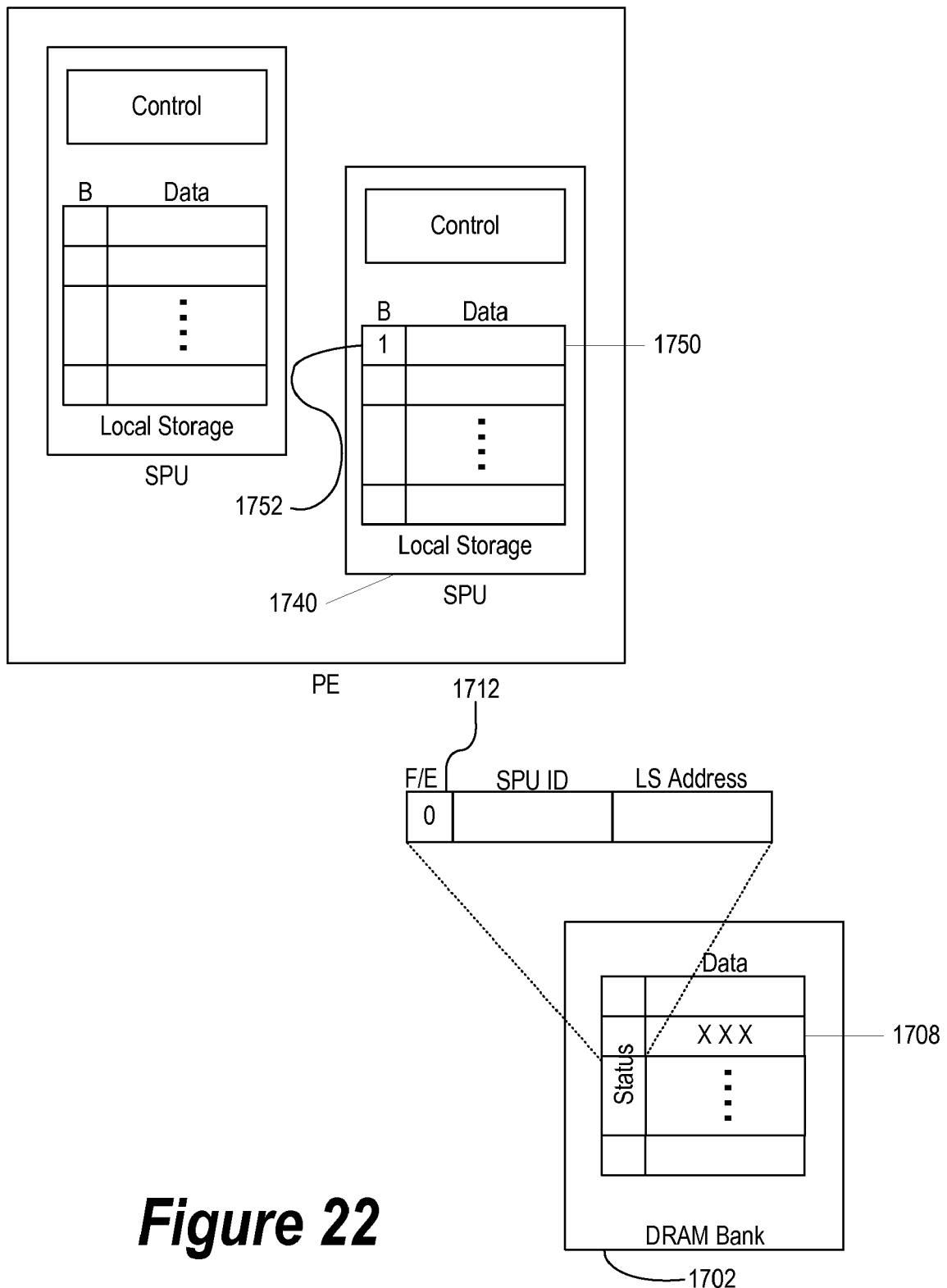

As shown in FIG. 21, control logic 1742 next issues a synchronize read command for memory location 1708 of DRAM 1702. Since F/E bit 1712 associated with this memory location is set to 1, the data stored in memory location 1708 are considered current and valid. As a result, in preparation for transferring the data from memory location 1708 to LS memory location 1750, F/E bit 1712 is set to 0. This setting is shown in FIG. 22. The setting of this bit to 0 indicates that, following the reading of these data, the data in memory location 1708 will be invalid.

Figure 23:
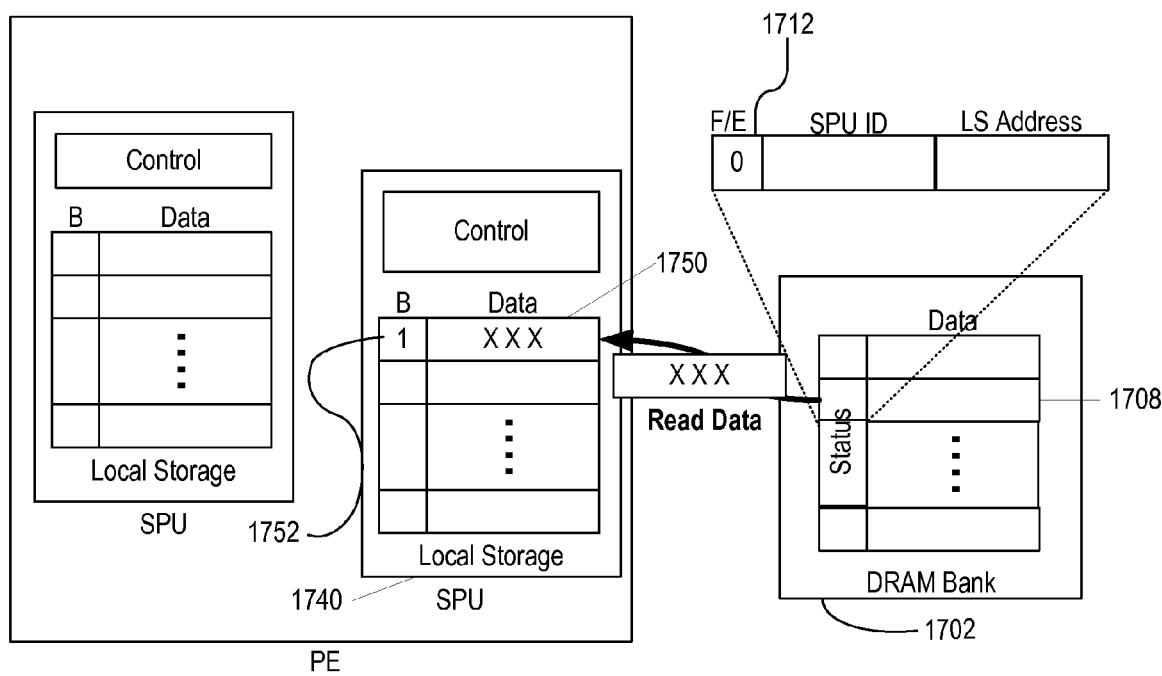
Figure 24:
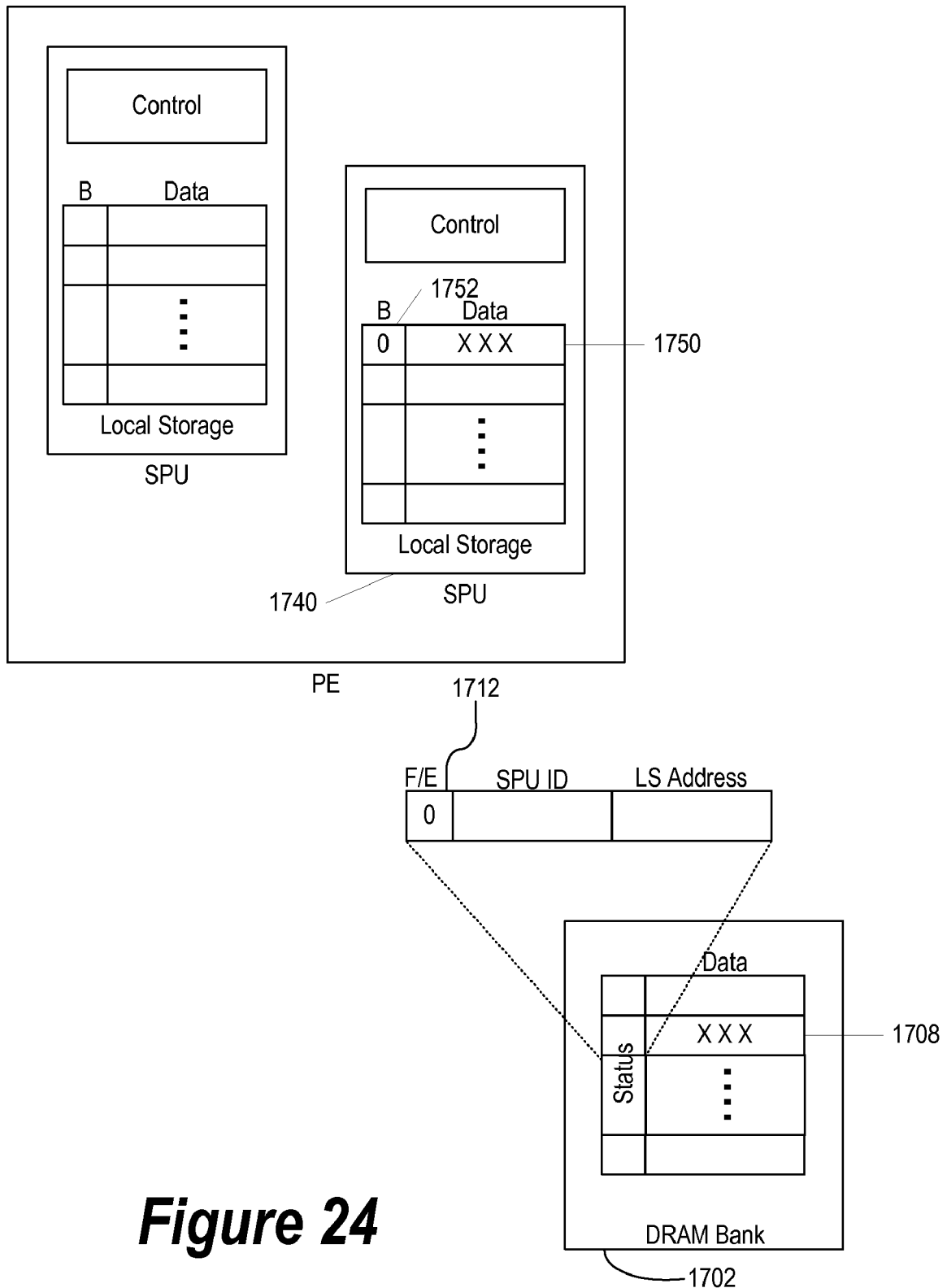

As shown in FIG. 23, the data within memory location 1708 next are read from memory location 1708 to LS memory location 1750. FIG. 24 shows the final state. A copy of the data in memory location 1708 is stored in LS memory location 1750. F/E bit 1712 is set to 0 to indicate that the data in memory location 1708 are invalid. This invalidity is the result of alterations to these data to be made by SPU 1740. The busy bit in memory segment 1752 also is set to 0. This setting indicates that LS memory location 1750 now is available to SPU 1740 for any purpose, i.e., this LS memory location no longer is in a reserved state waiting for the receipt of specific data. LS memory location 1750, therefore, now can be accessed by SPU 1740 for any purpose.

Figure 25:
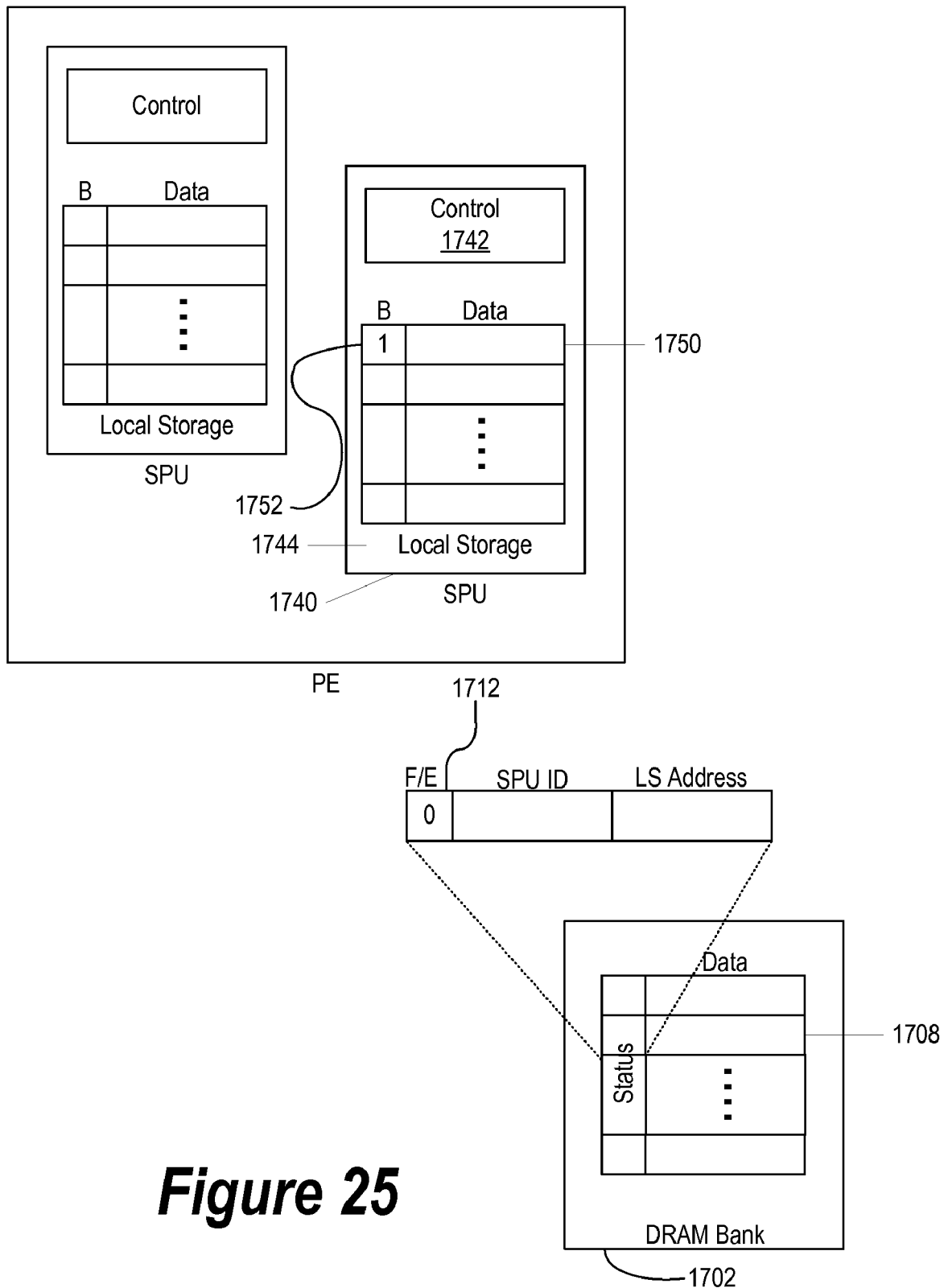
Figure 26:
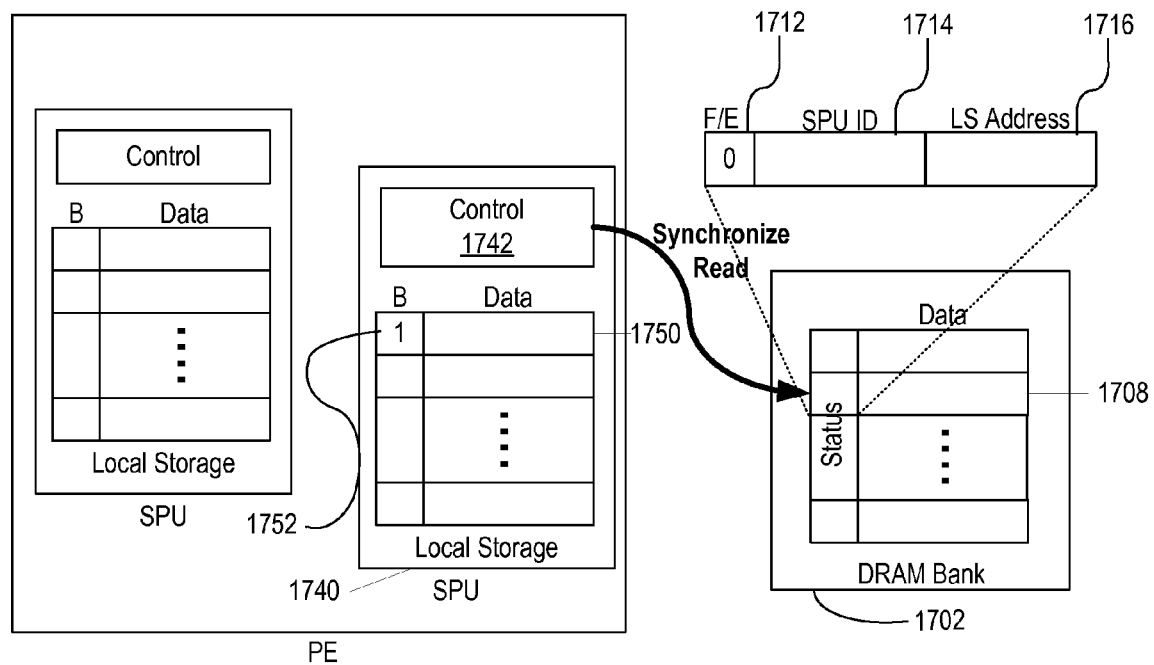

FIGS. 25-31 illustrate the synchronized reading of data from a memory location of DRAM 1702, e.g., memory location 1708, to an LS memory location of an SPU's local storage, e.g., LS memory location 1752 of local storage 1744, when the F/E bit for the memory location of DRAM 1702 is set to 0 to indicate that the data in this memory location are not current or valid. As shown in FIG. 25, to initiate this transfer, the busy bit in memory segment 1752 of LS memory location 1750 is set to 1 to reserve this LS memory location for this transfer of data. As shown in FIG. 26, control logic 1742 next issues a synchronize read command for memory location 1708 of DRAM 1702. Since the F/E bit associated with this memory location, F/E bit 1712, is set to 0, the data stored in memory location 1708 are invalid. As a result, a signal is transmitted to control logic 1742 to block the immediate reading of data from this memory location.

Figure 27:
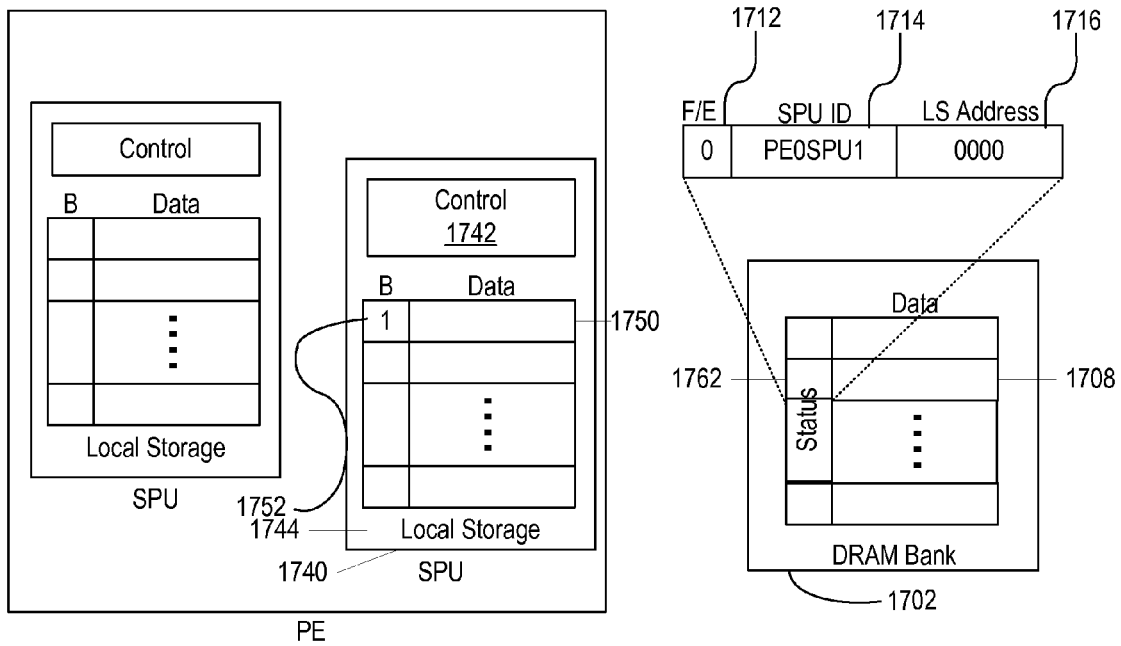

As shown in FIG. 27, the SPU ID 1714 and LS address 1716 for this read command next are written into memory segment 1762. In this case, the SPU ID for SPU 1740 and the LS memory location for LS memory location 1750 are written into memory segment 1762. When the data within memory location 1708 become current, therefore, this SPU ID and LS memory location are used for determining the location to which the current data are to be transmitted.

Figure 28:
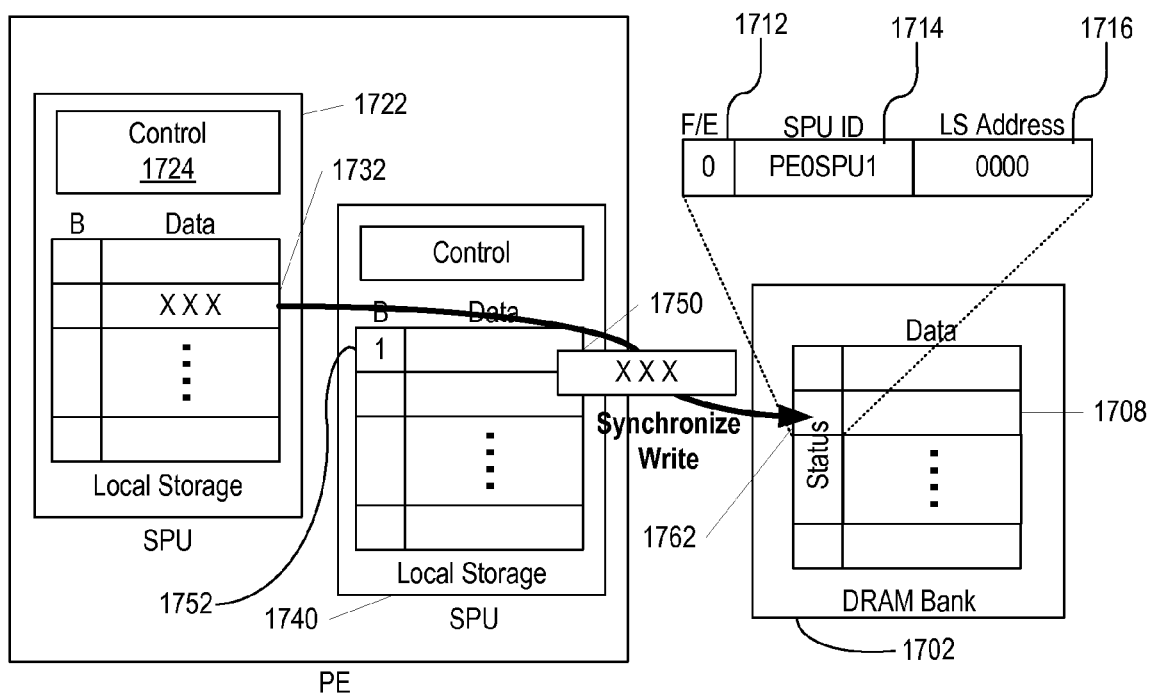

The data in memory location 1708 become valid and current when an SPU writes data into this memory location. The synchronized writing of data into memory location 1708 from, e.g., memory location 1732 of SPU 1722, is illustrated in FIG. 28. This synchronized writing of these data is permitted because F/E bit 1712 for this memory location is set to 0.

Figure 29:
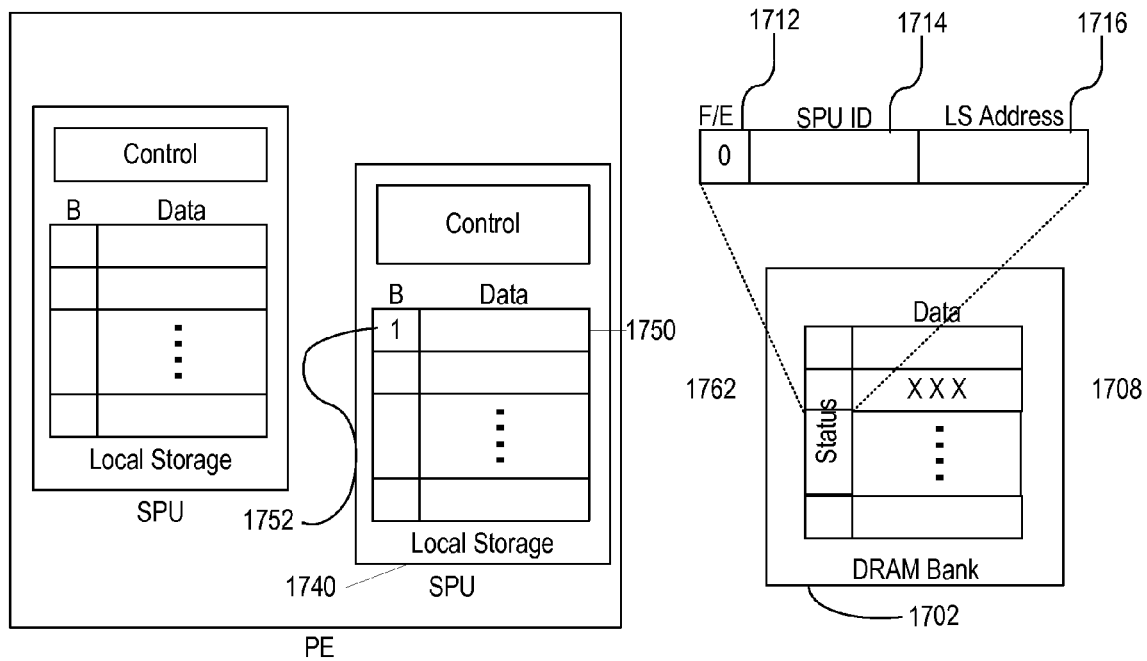
Figure 30:
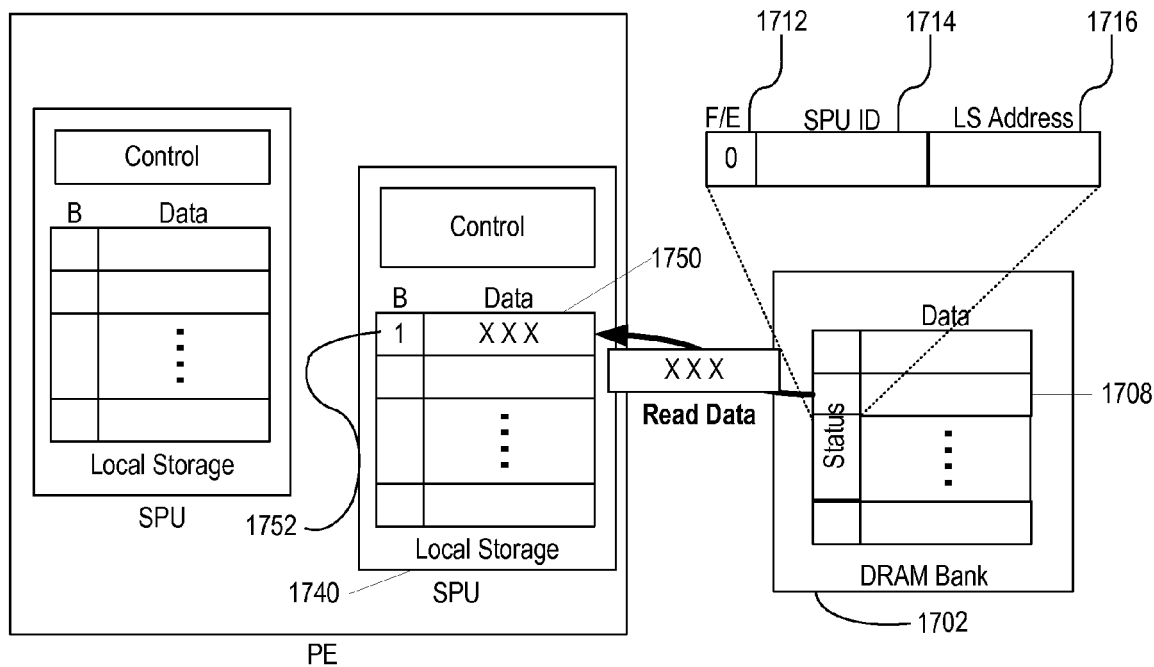
Figure 31:
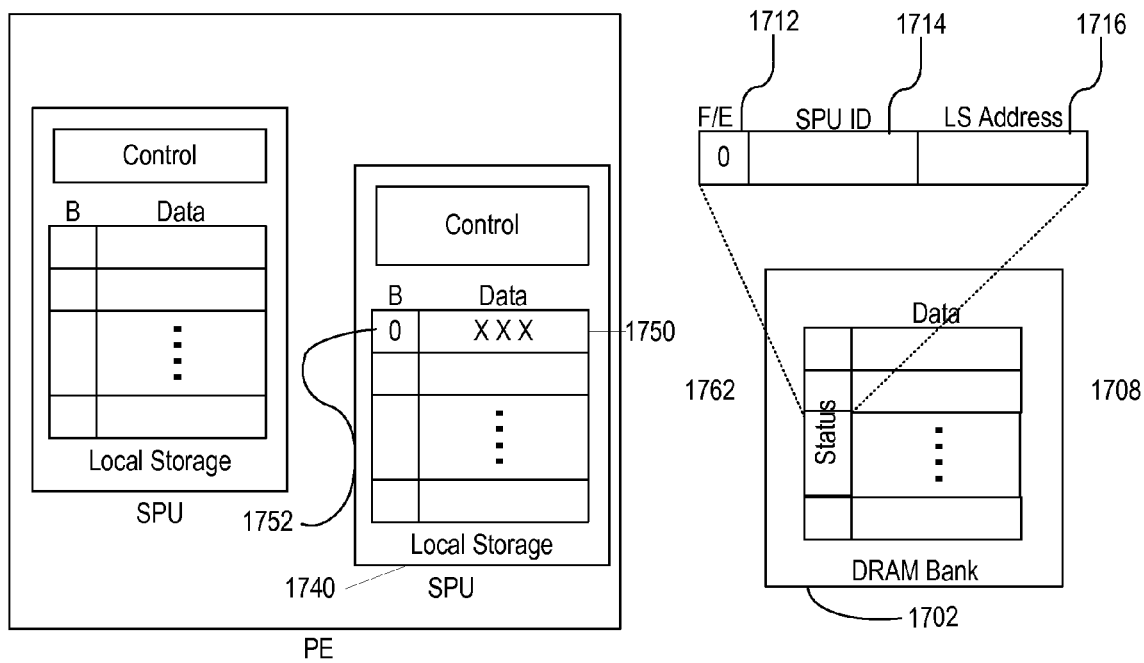

As shown in FIG. 29, following this writing, the data in memory location 1708 become current and valid. SPU ID 1714 and LS address 1716 from memory segment 1762, therefore, immediately are read from memory segment 1762, and this information then is deleted from this segment. F/E bit 1712 also is set to 0 in anticipation of the immediate reading of the data in memory location 1708. As shown in FIG. 30, upon reading SPU ID 1714 and LS address 1716, this information immediately is used for reading the valid data in memory location 1708 to LS memory location 1750 of SPU 1740. The final state is shown in FIG. 31. This figure shows the valid data from memory location 1708 copied to memory location 1750, the busy bit in memory segment 1752 set to 0 and F/E bit 1712 in memory segment 1762 set to 0. The setting of this busy bit to 0 enables LS memory location 1750 now to be accessed by SPU 1740 for any purpose. The setting of this F/E bit to 0 indicates that the data in memory location 1708 no longer are current and valid.

Figure 32:
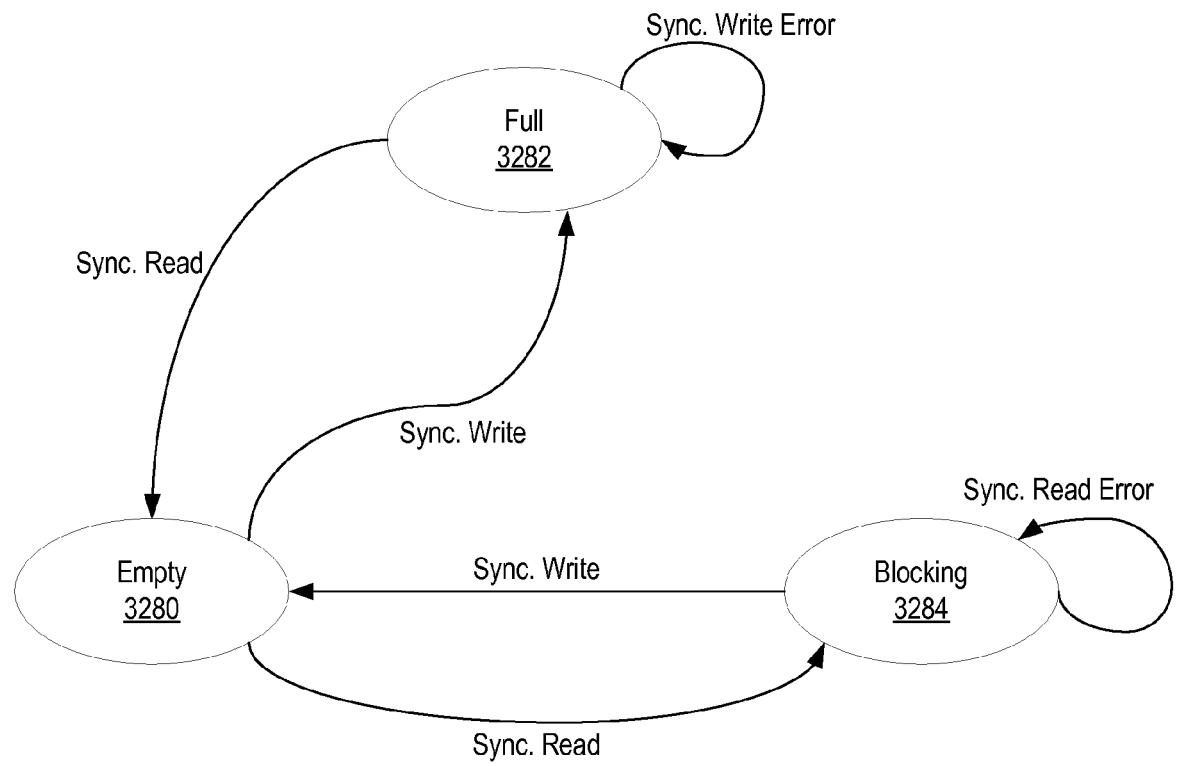
FIG. 32 is a three-state memory diagram illustrating the various states of a memory location in accordance with the data synchronization scheme of the-present invention.

FIG. 32 summarizes the operations described above and the various states of a memory location of the DRAM based upon the states of the F/E bit, the SPU ID and the LS address stored in the memory segment corresponding to the memory location. The memory location can have three states. These three states are an empty state 3280 in which the F/E bit is set to 0 and no information is provided for the SPU ID or the LS address, a full state 3282 in which the F/E bit is set to 1 and no information is provided for the SPU ID or LS address and a blocking state 3284 in which the F/E bit is set to 0 and information is provided for the SPU ID and LS address.

As shown in this figure, in empty state 3280, a synchronized writing operation is permitted and results in a transition to full state 3282. A synchronized reading operation, however, results in a transition to the blocking state 3284 because the data in the memory location, when the memory location is in the empty state, are not current.

In full state 3282, a synchronized reading operation is permitted and results in a transition to empty state 3280. On the other hand, a synchronized writing operation in full state 3282 is prohibited to prevent overwriting of valid data. If such a writing operation is attempted in this state, no state change occurs and an error message is transmitted to the SPU's corresponding control logic.

In blocking state 3284, the synchronized writing of data into the memory location is permitted and results in a transition to empty state 3280. On the other hand, a synchronized reading operation in blocking state 3284 is prohibited to prevent a conflict with the earlier synchronized reading operation which resulted in this state. If a synchronized reading operation is attempted in blocking state 3284, no state change occurs and an error message is transmitted to the SPU's corresponding control logic.

The scheme described above for the synchronized reading and writing of data from and to the shared DRAM also can be used for eliminating the computational resources normally dedicated by a processor for reading data from, and writing data to, external devices. This input/output (I/O) function could be performed by a PU. However, using a modification of this synchronization scheme, an SPU running an appropriate program can perform this function. For example, using this scheme, a PU receiving an interrupt request for the transmission of data from an I/O interface initiated by an external device can delegate the handling of this request to this SPU. The SPU then issues a synchronize write command to the I/O interface. This interface in turn signals the external device that data now can be written into the DRAM. The SPU next issues a synchronize read command to the DRAM to set the DRAM's relevant memory space into a blocking state. The SPU also sets to 1 the busy bits for the memory locations of the SPU's local storage needed to receive the data. In the blocking state, the additional memory segments associated with the DRAM's relevant memory space contain the SPU's ID and the address of the relevant memory locations of the SPU's local storage. The external device next issues a synchronize write command to write the data directly to the DRAM's relevant memory space. Since this memory space is in the blocking state, the data are immediately read out of this space into the memory locations of the SPU's local storage identified in the additional memory segments. The busy bits for these memory locations then are set to 0. When the external device completes writing of the data, the SPU issues a signal to the PU that the transmission is complete.

Using this scheme, therefore, data transfers from external devices can be processed with minimal computational load on the PU. The SPU delegated this function, however, should be able to issue an interrupt request to the PU, and the external device should have direct access to the DRAM.

The DRAM of each PU includes a plurality of "sandboxes." A sandbox defines an area of the shared DRAM beyond which a particular SPU, or set of SPUs, cannot read or write data. These sandboxes provide security against the corruption of data being processed by one SPU by data being processed by another SPU. These sandboxes also permit the downloading of software cells from network 104 into a particular sandbox without the possibility of the software cell corrupting data throughout the DRAM. In the present invention, the sandboxes are implemented in the hardware of the DRAMs and DMACs. By implementing these sandboxes in this hardware rather than in software, advantages in speed and security are obtained.

The PU of a PU controls the sandboxes assigned to the SPUs. Since the PU normally operates only trusted programs, such as an operating system, this scheme does not jeopardize security. In accordance with this scheme, the PU builds and maintains a key control table. This key control table is illustrated in FIG. 33. As shown in this figure, each entry in key control table 3302 contains an identification (ID) 3304 for an SPU, an SPU key 3306 for that SPU and a key mask 3308. The use of this key mask is explained below. Key control table 3302 preferably is stored in a relatively fast memory, such as a static random access memory (SRAM), and is associated with the DMAC. The entries in key control table 3302 are controlled by the PU. When an SPU requests the writing of data to, or the reading of data from, a particular storage location of the DRAM, the DMAC evaluates the SPU key 3306 assigned to that SPU in key control table 3302 against a memory access key associated with that storage location.

Figure 34:
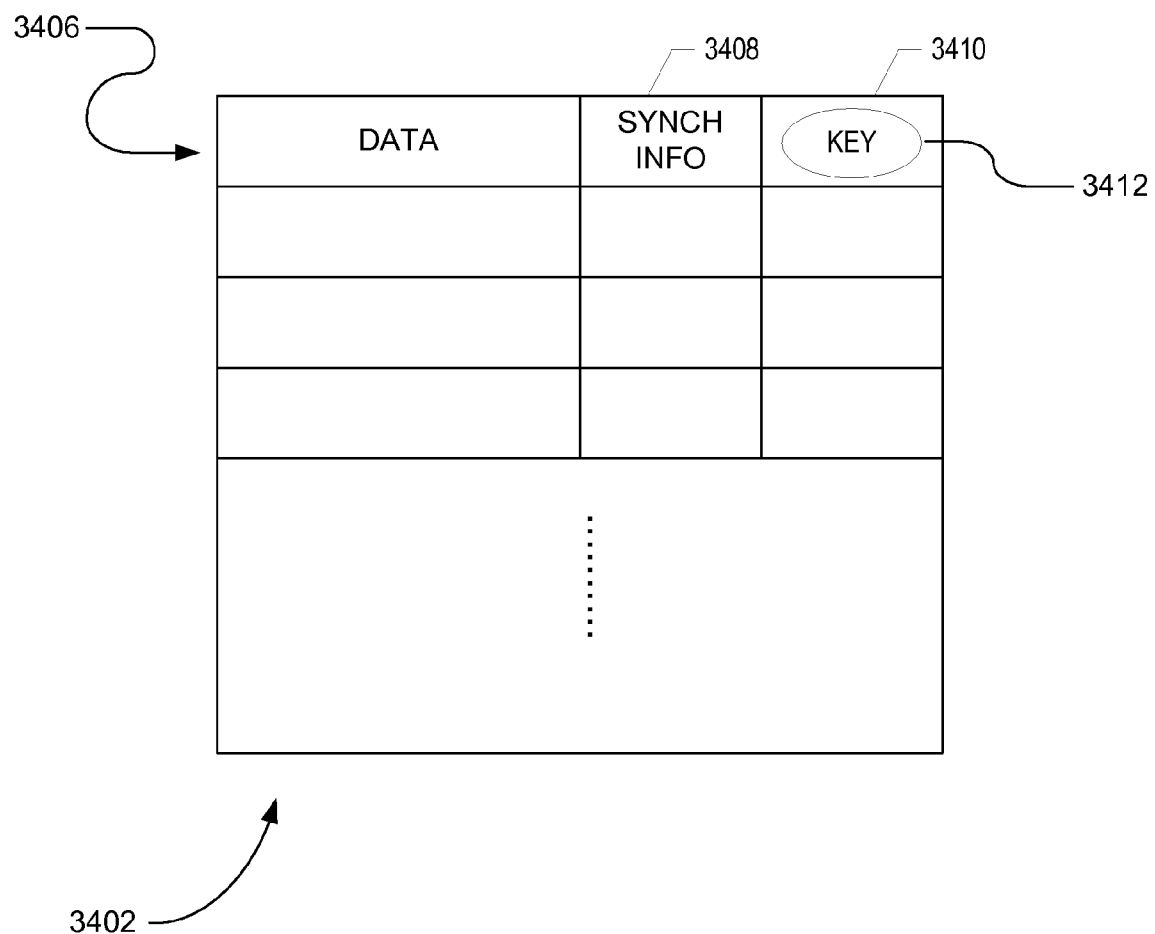
FIG. 34 illustrates a scheme for storing memory access keys for a hardware sandbox in accordance with the present invention.

As shown in FIG. 34, a dedicated memory segment 3410 is assigned to each addressable storage location 3406 of a DRAM 3402. A memory access key 3412 for the storage location is stored in this dedicated memory segment. As discussed above, a further additional dedicated memory segment 3408, also associated with each addressable storage location 3406, stores synchronization information for writing data to, and reading data from, the storage-location.

In operation, an SPU issues a DMA command to the DMAC. This command includes the address of a storage location 3406 of DRAM 3402. Before executing this command, the DMAC looks up the requesting SPU's key 3306 in key control table 3302 using the SPU's ID 3304. The DMAC then compares the SPU key 3306 of the requesting SPU to the memory access key 3412 stored in the dedicated memory segment 3410 associated with the storage location of the DRAM to which the SPU seeks access. If the two keys do not match, the DMA command is not executed. On the other hand, if the two keys match, the DMA command proceeds and the requested memory access is executed.

An alternative embodiment is illustrated in FIG. 35. In this embodiment, the PU also maintains a memory access control table 3502. Memory access control table 3502 contains an entry for each sandbox within the DRAM. In the particular example of FIG. 35, the DRAM contains 64 sandboxes. Each entry in memory access control table 3502 contains an identification (ID) 3504 for a sandbox, a base memory address 3506, a sandbox size 3508, a memory access key 3510 and an access key mask 3512. Base memory address 3506 provides the address in the DRAM which starts a particular memory sandbox. Sandbox size 3508 provides the size of the sandbox and, therefore, the endpoint of the particular sandbox.

Figure 36:
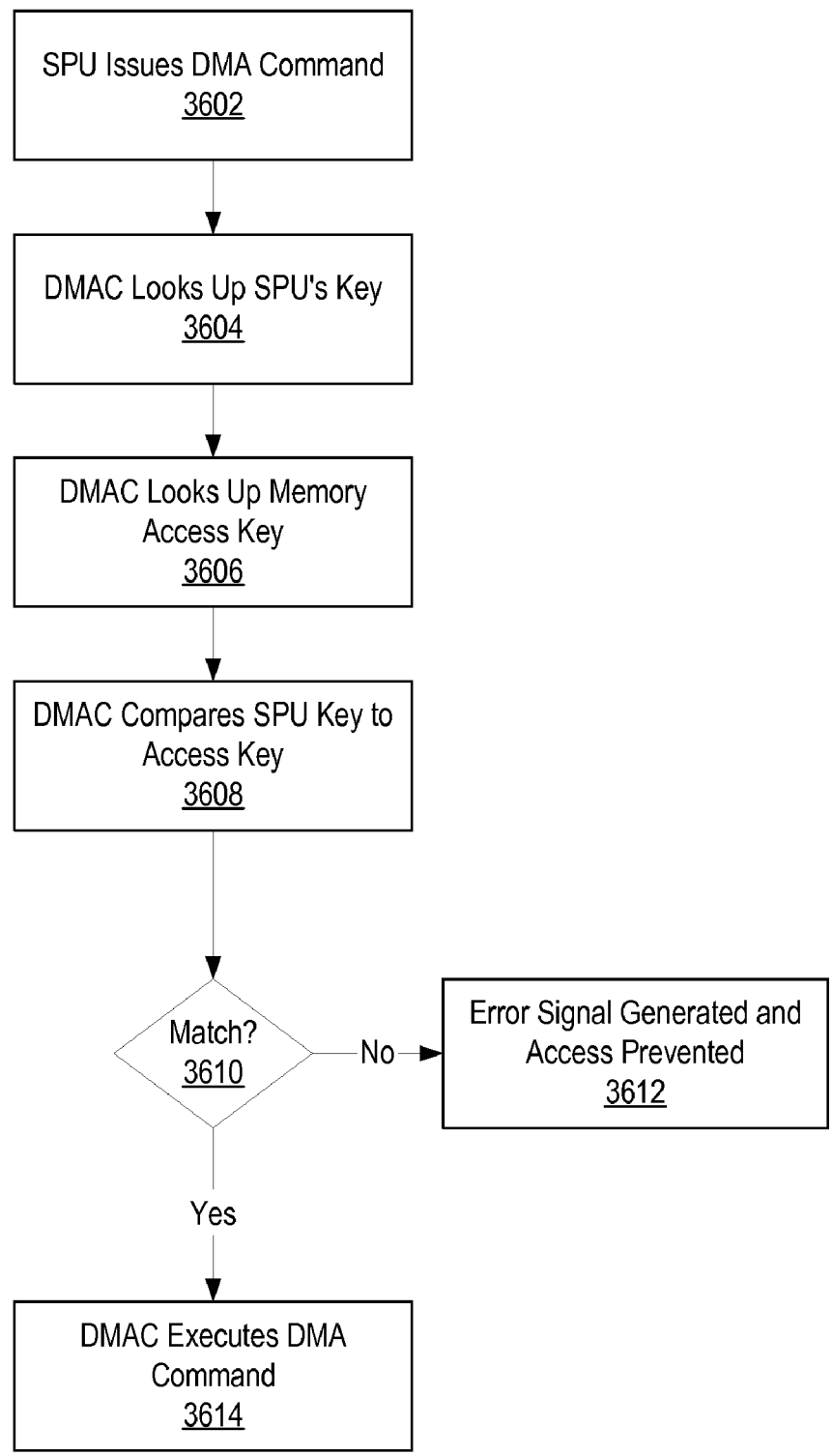
FIG. 36 is a flow diagram of the steps for accessing a memory sandbox using the key control table of FIG. 33 and the memory access control table of FIG. 35.

FIG. 36 is a flow diagram of the steps for executing a DMA command using key control table 3302 and memory access control table 3502. In step 3602, an SPU issues a DMA command to the DMAC for access to a particular memory location or locations within a sandbox. This command includes a sandbox ID 3504 identifying the particular sandbox for which access is requested. In step 3604, the DMAC looks up the requesting SPU's key 3306 in key control table 3302 using the SPU's ID 3304. In step 3606, the DMAC uses the sandbox ID 3504 in the command to look up in memory access control table 3502 the memory access key 3510 associated with that sandbox. In step 3608, the DMAC compares the SPU key 3306 assigned to the requesting SPU to the access key 3510 associated with the sandbox. In step 3610, a determination is made of whether the two keys match. If the two keys do not match, the process moves to step 3612 where the DMA command does not proceed and an error message is sent to either the requesting SPU, the PU or both. On the other hand, if at step 3610 the two keys are found to match, the process proceeds to step 3614 where the DMAC executes the DMA command.

The key masks for the SPU keys and the memory access keys provide greater flexibility to this system. A key mask for a key converts a masked bit into a wildcard. For example, if the key mask 3308 associated with an SPU key 3306 has its last two bits set to "mask," designated by, e.g., setting these bits in key mask 3308 to 1, the SPU key can be either a 1 or a 0 and still match the memory access key. For example, the SPU key might be 1010. This SPU key normally allows access only to a sandbox having an access key of 1010. If the SPU key mask for this SPU key is set to 0001, however, then this SPU key can be used to gain access to sandboxes having an access key of either 1010 or 1011. Similarly, an access key 1010 with a mask set to 0001 can be accessed by an SPU with an SPU key of either 1010 or 1011. Since both the SPU key mask and the memory key mask can be used simultaneously, numerous variations of accessibility by the SPUs to the sandboxes can be established.

The present invention also provides a new programming model for the processors of system 101. This programming model employs software cells 102. These cells can be transmitted to any processor on network 104 for processing. This new programming model also utilizes the unique modular architecture of system 101 and the processors of system 101.

Software cells are processed directly by the SPUs from the SPU's local storage. The SPUs do not directly operate on any data or programs in the DRAM. Data and programs in the DRAM are read into the SPU's local storage before the SPU processes these data and programs. The SPU's local storage, therefore, includes a program counter, stack and other software elements for executing these programs. The PU controls the SPUs by issuing direct memory access (DMA) commands to the DMAC.

Figure 37:
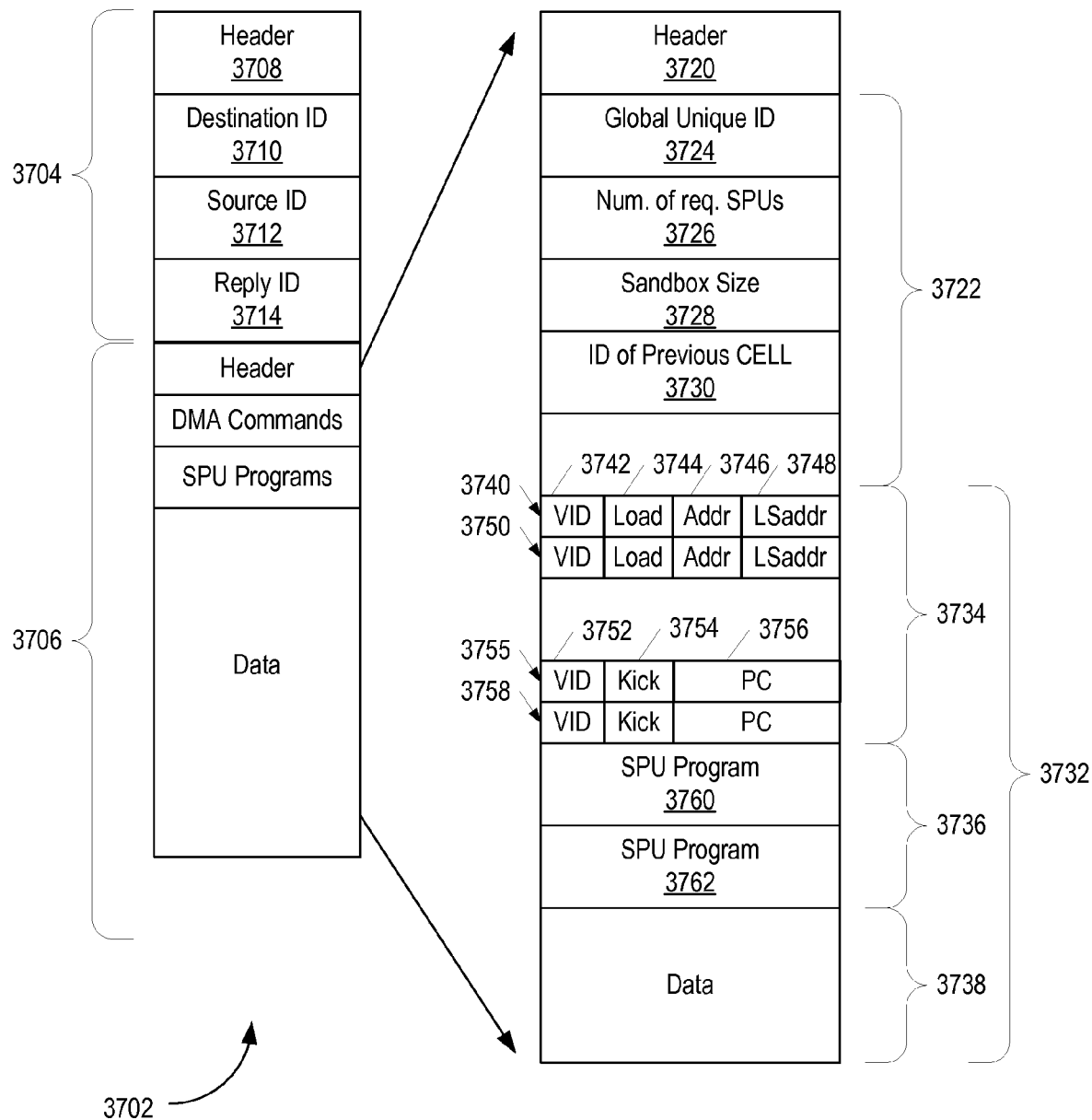
FIG. 37 illustrates the structure of a software cell in accordance with the present invention.

The structure of software cells 102 is illustrated in FIG. 37. As shown in this figure, a software cell, e.g., software cell 3702, contains routing information section 3704 and body 3706. The information contained in routing information section 3704 is dependent upon the protocol of network 104. Routing information section 3704 contains header 3708, destination ID 3710, source ID 3712 and reply ID 3714. The destination ID includes a network address. Under the TCP/IP protocol, e.g., the network address is an Internet protocol (IP) address. Destination ID 3710 further includes the identity of the PU and SPU to which the cell should be transmitted for processing. Source ID 3712 contains a network address and identifies the PU and SPU from which the cell originated to enable the destination PU and SPU to obtain additional information regarding the cell if necessary. Reply ID 3714 contains a network address and identifies the PU and SPU to which queries regarding the cell, and the result of processing of the cell, should be directed.

Cell body 3706 contains information independent of the network's protocol. The exploded portion of FIG. 37 shows the details of cell body 3706. Header 3720 of cell body 3706 identifies the start of the cell body. Cell interface 3722 contains information necessary for the cell's utilization. This information includes global unique ID 3724, required SPUs 3726, sandbox size 3728 and previous cell ID 3730.

Global unique ID 3724 uniquely identifies software cell 3702 throughout network 104. Global unique ID 3724 is generated on the basis of source ID 3712, e.g. the unique identification of a PU or SPU within source ID 3712, and the time and date of generation or transmission of software cell 3702. Required SPUs 3726 provides the minimum number of SPUs required to execute the cell. Sandbox size 3728 provides the amount of protected memory in the required SPUs' associated DRAM necessary to execute the cell. Previous cell ID 3730 provides the identity of a previous cell in a group of cells requiring sequential execution, e.g., streaming data.

Implementation section 3732 contains the cell's core information. This information includes DMA command list 3734, programs 3736 and data 3738. Programs 3736 contain the programs to be run by the SPUs (called "spulets"), e.g., SPU programs 3760 and 3762, and data 3738 contain the data to be processed with these programs. DMA command list 3734 contains a series of DMA commands needed to start the programs. These DMA commands include DMA commands 3740, 3750, 3755 and 3758. The PU issues these DMA commands to the DMAC.

DMA command 3740 includes VID 3742. VID 3742 is the virtual ID of an SPU which is mapped to a physical ID when the DMA commands are issued. DMA command 3740 also includes load command 3744 and address 3746. Load command 3744 directs the SPU to read particular information from the DRAM into local storage. Address 3746 provides the virtual address in the DRAM containing this information. The information can be, e.g., programs from programs section 3736, data from data section 3738 or other data. Finally, DMA command 3740 includes local storage address 3748. This address identifies the address in local storage where the information should be loaded. DMA commands 3750 contain similar information. Other DMA commands are also possible.

DMA command list 3734 also includes a series of kick commands, e.g., kick commands 3755 and 3758. Kick commands are commands issued by a PU to an SPU to initiate the processing of a cell. DMA kick command 3755 includes virtual SPU ID 3752, kick command 3754 and program counter 3756. Virtual SPU ID 3752 identifies the SPU to be kicked, kick command 3754 provides the relevant kick command and program counter 3756 provides the address for the program counter for executing the program. DMA kick command 3758 provides similar information for the same SPU or another SPU.

As noted, the PUs treat the SPUs as independent processors, not co-processors. To control processing by the SPUs, therefore, the PU uses commands analogous to remote procedure calls. These commands are designated "SPU Remote Procedure Calls" (SRPCs). A PU implements an SRPC by issuing a series of DMA commands to the DMAC. The DMAC loads the SPU program and its associated stack frame into the local storage of an SPU. The PU then issues an initial kick to the SPU to execute the SPU Program.

Figure 38:
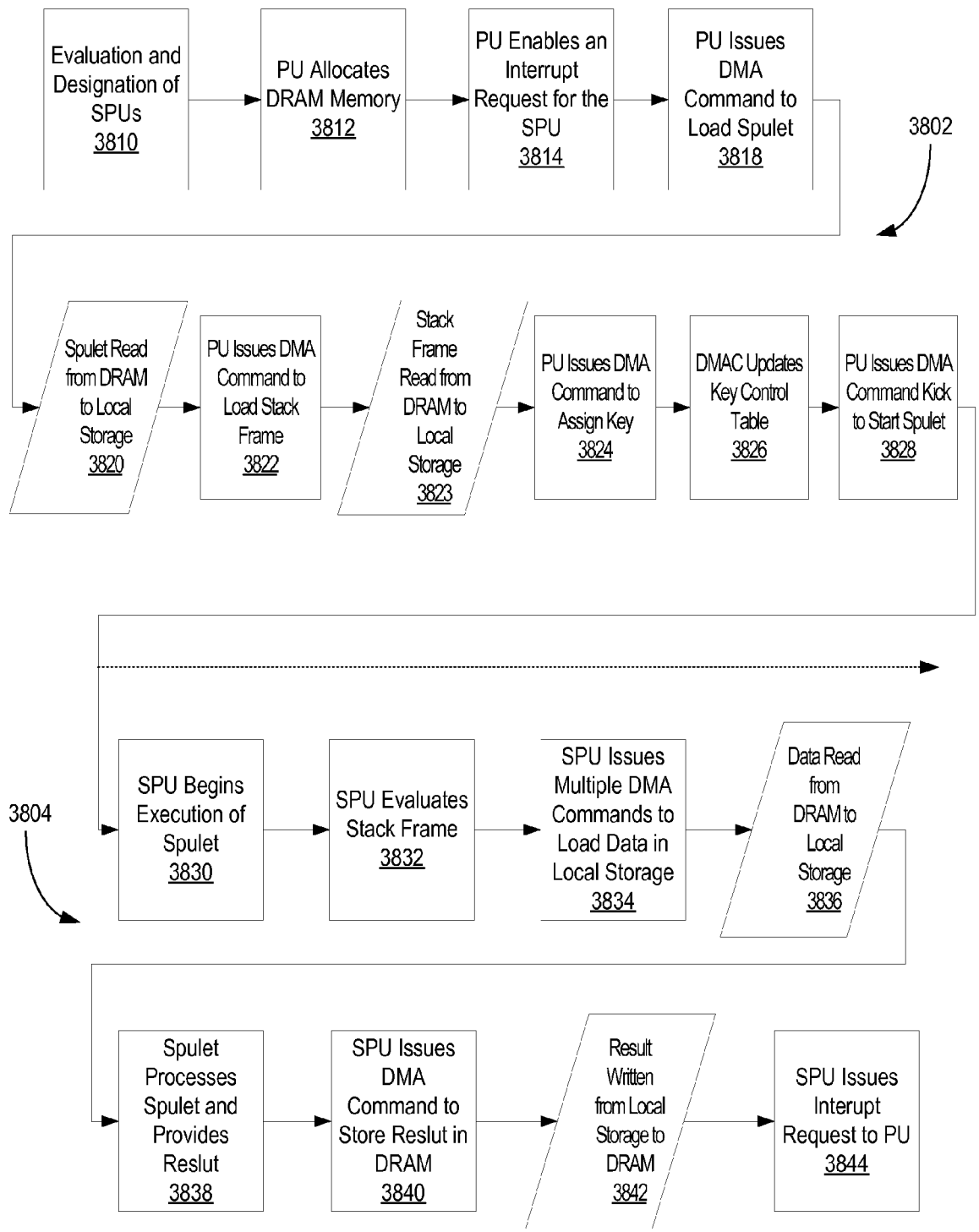
FIG. 38 is a flow diagram of the steps for issuing remote procedure calls to SPUs in accordance with the present invention.

FIG. 38 illustrates the steps of an SRPC for executing an spulet. The steps performed by the PU in initiating processing of the spulet by a designated SPU are shown in the first portion 3802 of FIG. 38, and the steps performed by the designated SPU in processing the spulet are shown in the second portion 3804 of FIG. 38.

In step 3810, the PU evaluates the spulet and then designates an SPU for processing the spulet. In step 3812, the PU allocates space in the DRAM for executing the spulet by issuing a DMA command to the DMAC to set memory access keys for the necessary sandbox or sandboxes. In step 3814, the PU enables an interrupt request for the designated SPU to signal completion of the spulet. In step 3818, the PU issues a DMA command to the DMAC to load the spulet from the DRAM to the local storage of the SPU. In step 3820, the DMA command is executed, and the spulet is read from the DRAM to the SPU's local storage. In step 3822, the PU issues a DMA command to the DMAC to load the stack frame associated with the spulet from the DRAM to the SPU's local storage. In step 3823, the DMA command is executed, and the stack frame is read from the DRAM to the SPU's local storage. In step 3824, the PU issues a DMA command for the DMAC to assign a key to the SPU to allow the SPU to read and write data from and to the hardware sandbox or sandboxes designated in step 3812. In step 3826, the DMAC updates the key control table (KTAB) with the key assigned to the SPU. In step 3828, the PU issues a DMA command "kick" to the SPU to start processing of the program. Other DMA commands may be issued by the PU in the execution of a particular SRPC depending upon the particular spulet.

As indicated above, second portion 3804 of FIG. 38 illustrates the steps performed by the SPU in executing the spulet. In step 3830, the SPU begins to execute the spulet in response to the kick command issued at step 3828. In step 3832, the SPU, at the direction of the spulet, evaluates the spulet's associated stack frame. In step 3834, the SPU issues multiple DMA commands to the DMAC to load data designated as needed by the stack frame from the DRAM to the SPU's local storage. In step 3836, these DMA commands are executed, and the data are read from the DRAM to the SPU's local storage. In step 3838, the SPU executes the spulet and generates a result. In step 3840, the SPU issues a DMA command to the DMAC to store the result in the DRAM. In step 3842, the DMA command is executed and the result of the spulet is written from the SPU's local storage to the DRAM. In step 3844, the SPU issues an interrupt request to the PU to signal that the SRPC has been completed.

The ability of SPUs to perform tasks independently under the direction of a PU enables a PU to dedicate a group of SPUs, and the memory resources associated with a group of SPUs, to performing extended tasks. For example, a PU can dedicate one or more SPUs, and a group of memory sandboxes associated with these one or more SPUs, to receiving data transmitted over network 104 over an extended period and to directing the data received during this period to one or more other SPUs and their associated memory sandboxes for further processing. This ability is particularly advantageous to processing streaming data transmitted over network 104, e.g., streaming MPEG or streaming ATRAC audio or video data. A PU can dedicate one or more SPUs and their associated memory sandboxes to receiving these data and one or more other SPUs and their associated memory sandboxes to decompressing and further processing these data. In other words, the PU can establish a dedicated pipeline relationship among a group of SPUs and their associated memory sandboxes for processing such data.

In order for such processing to be performed efficiently, however, the pipeline's dedicated SPUs and memory sandboxes should remain dedicated to the pipeline during periods in which processing of spulets comprising the data stream does not occur. In other words, the dedicated SPUs and their associated sandboxes should be placed in a reserved state during these periods. The reservation of an SPU and its associated memory sandbox or sandboxes upon completion of processing of an spulet is called a "resident termination." A resident termination occurs in response to an instruction from a PU.

Figure 39:
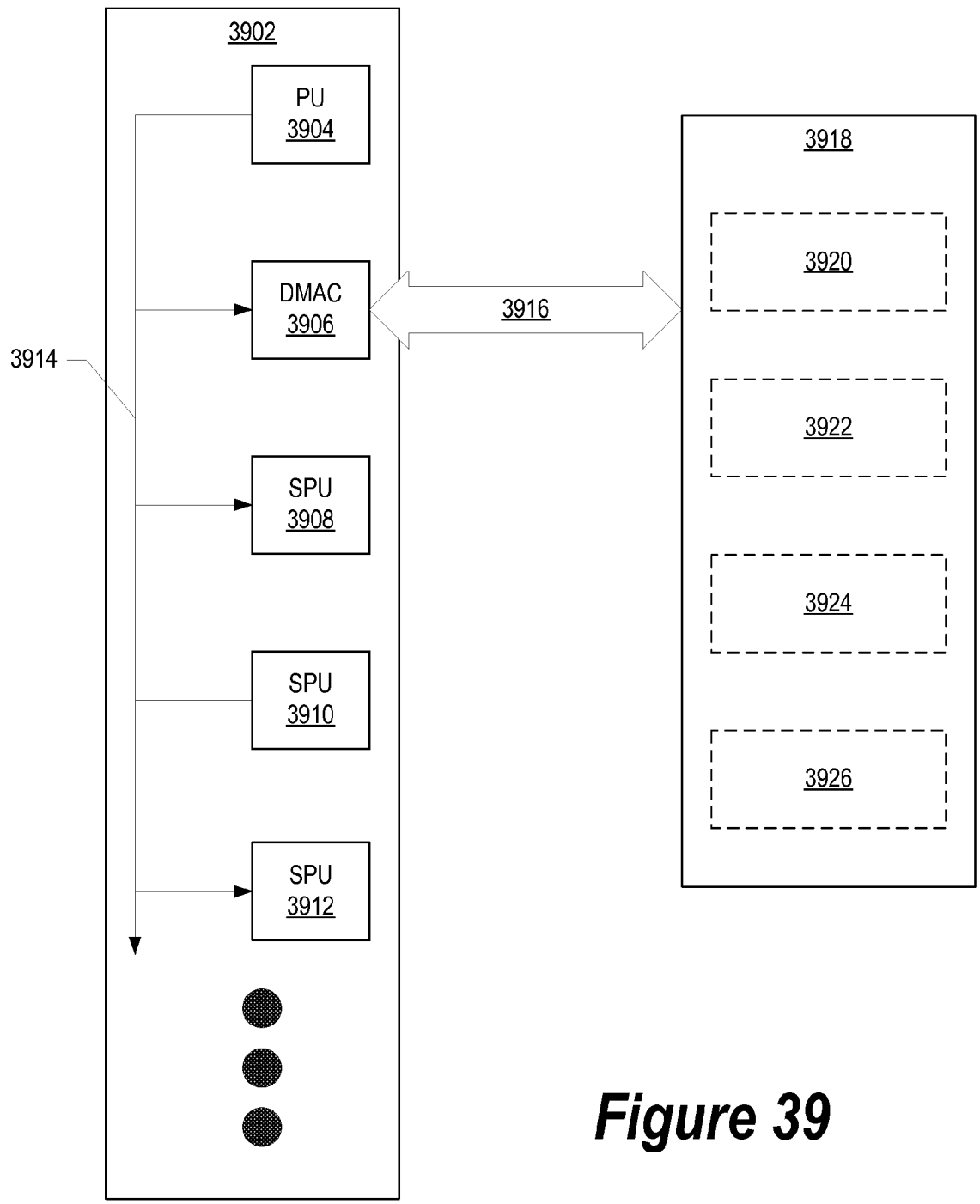
FIG. 39 illustrates the structure of a dedicated pipeline for processing streaming data in accordance with the present invention.
Figure 40A:
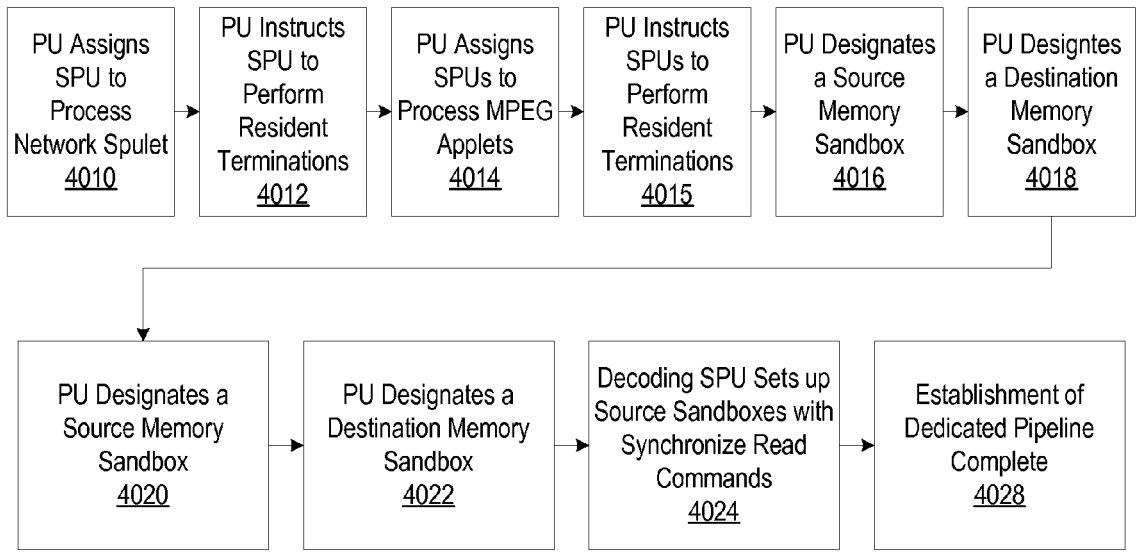
FIG. 40 is a flow diagram of the steps performed by the dedicated pipeline of FIG. 39 in the processing of streaming data in accordance with the present invention.
Figure 40B:
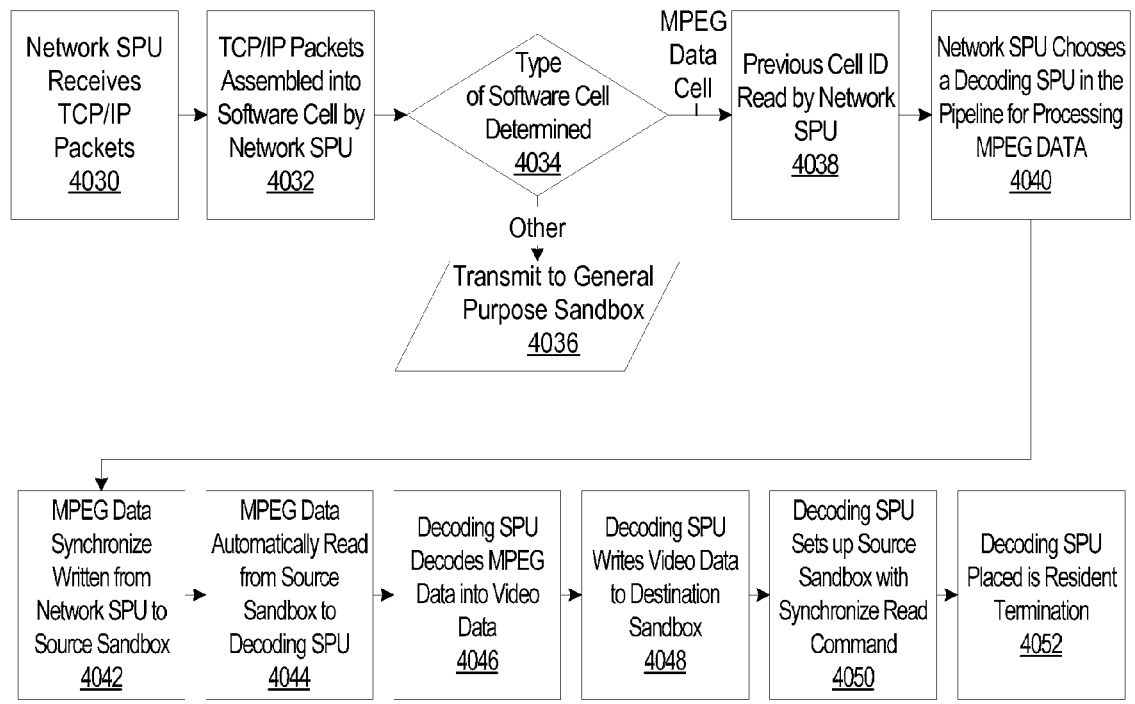

FIGS. 39, 40A and 40B illustrate the establishment of a dedicated pipeline structure comprising a group of SPUs and their associated sandboxes for the processing of streaming data, e.g., streaming MPEG data. As shown in FIG. 39, the components of this pipeline structure include PE 3902 and DRAM 3918. PE 3902 includes PU 3904, DMAC 3906 and a plurality of SPUs, including SPU 3908, SPU 3910 and SPU 3912. Communications among PU 3904, DMAC 3906 and these SPUs occur through PE bus 3914. Wide bandwidth bus 3916 connects DMAC 3906 to DRAM 3918. DRAM 3918 includes a plurality of sandboxes, e.g., sandbox 3920, sandbox 3922, sandbox 3924 and sandbox 3926.

FIG. 40A illustrates the steps for establishing the dedicated pipeline. In step 4010, PU 3904 assigns SPU 3908 to process a network spulet. A network spulet comprises a program for processing the network protocol of network 104. In this case, this protocol is the Transmission Control Protocol/Internet Protocol (TCP/IP). TCP/IP data packets conforming to this protocol are transmitted over network 104. Upon receipt, SPU 3908 processes these packets and assembles the data in the packets into software cells 102. In step 4012, PU 3904 instructs SPU 3908 to perform resident terminations upon the completion of the processing of the network spulet. In step 4014, PU 3904 assigns PUs 3910 and 3912 to process MPEG spulets. In step 4015, PU 3904 instructs SPUs 3910 and 3912 also to perform resident terminations upon the completion of the processing of the MPEG spulets. In step 4016, PU 3904 designates sandbox 3920 as a source sandbox for access by SPU 3908 and SPU 3910. In step 4018, PU 3904 designates sandbox 3922 as a destination sandbox for access by SPU 3910. In step 4020, PU 3904 designates sandbox 3924 as a source sandbox for access by SPU 3908 and SPU 3912. In step 4022, PU 3904 designates sandbox 3926 as a destination sandbox for access by SPU 3912. In step 4024, SPU 3910 and SPU 3912 send synchronize read commands to blocks of memory within, respectively, source sandbox 3920 and source sandbox 3924 to set these blocks of memory into the blocking state. The process finally moves to step 4028 where establishment of the dedicated pipeline is complete and the resources dedicated to the pipeline are reserved. SPUs 3908, 3910 and 3912 and their associated sandboxes 3920, 3922, 3924 and 3926, therefore, enter the reserved state.

FIG. 40B illustrates the steps for processing streaming MPEG data by this dedicated pipeline. In step 4030, SPU 3908, which processes the network spulet, receives in its local storage TCP/IP data packets from network 104. In step 4032, SPU 3908 processes these TCP/IP data packets and assembles the data within these packets into software cells 102. In step 4034, SPU 3908 examines header 3720 (FIG. 37) of the software cells to determine whether the cells contain MPEG data. If a cell does not contain MPEG data, then, in step 4036, SPU 3908 transmits the cell to a general purpose sandbox designated within DRAM 3918 for processing other data by other SPUs not included within the dedicated pipeline. SPU 3908 also notifies PU 3904 of this transmission.

On the other hand, if a software cell contains MPEG data, then, in step 4038, SPU 3908 examines previous cell ID 3730 (FIG. 37) of the cell to identify the MPEG data stream to which the cell belongs. In step 4040, SPU 3908 chooses an SPU of the dedicated pipeline for processing of the cell. In this case, SPU 3908 chooses SPU 3910 to process these data. This choice is based upon previous cell ID 3730 and load balancing factors. For example, if previous cell ID 3730 indicates that the previous software cell of the MPEG data stream to which the software cell belongs was sent to SPU 3910 for processing, then the present software cell normally also will be sent to SPU 3910 for processing. In step 4042, SPU 3908 issues a synchronize write command to write the MPEG data to sandbox 3920. Since this sandbox previously was set to the blocking state, the MPEG data, in step 4044, automatically is read from sandbox 3920 to the local storage of SPU 3910. In step 4046, SPU 3910 processes the MPEG data in its local storage to generate video data. In step 4048, SPU 3910 writes the video data to sandbox 3922. In step 4050, SPU 3910 issues a synchronize read command to sandbox 3920 to prepare this sandbox to receive additional MPEG data. In step 4052, SPU 3910 processes a resident termination. This processing causes this SPU to enter the reserved state during which the SPU waits to process additional MPEG data in the MPEG data stream.

Figure 41:
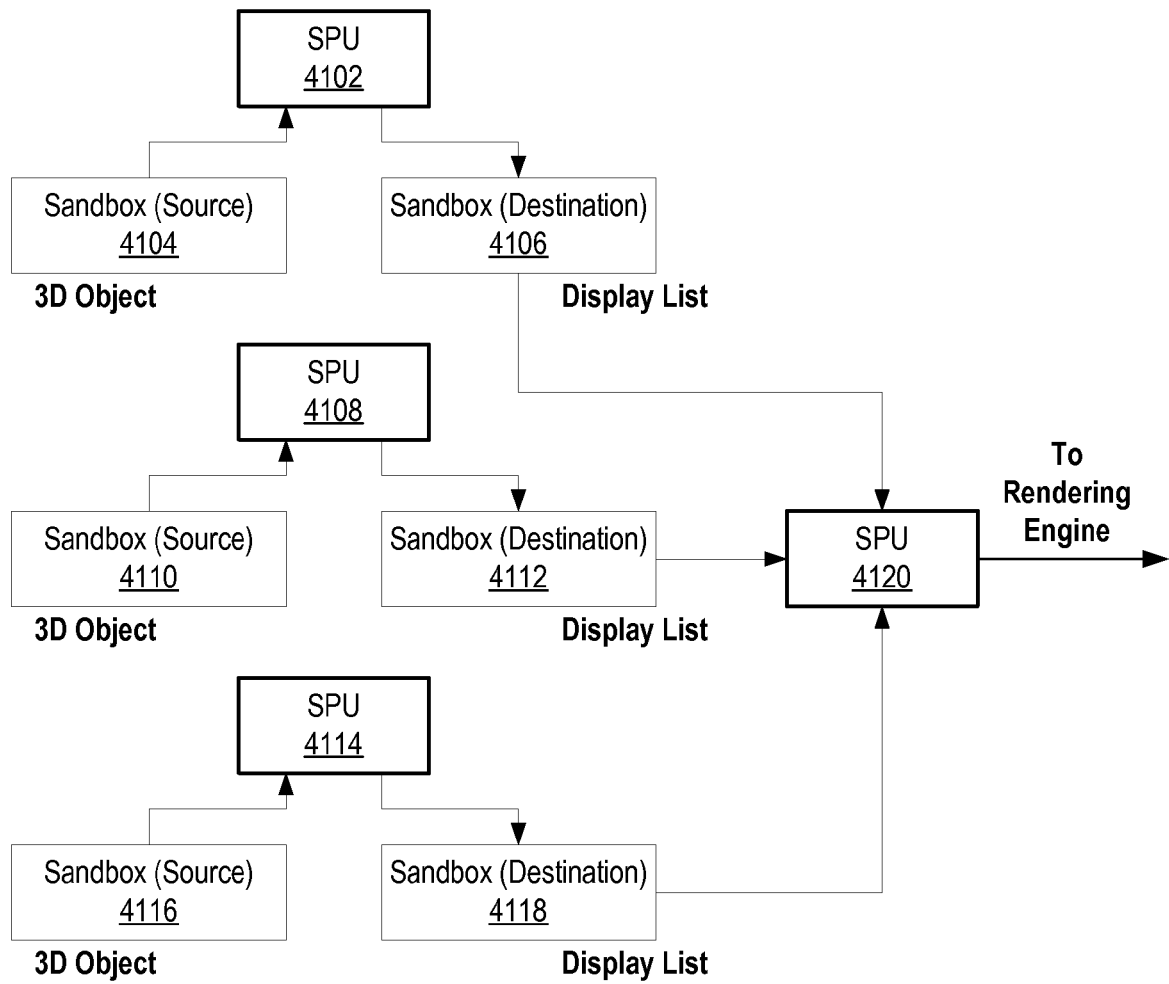
FIG. 41 illustrates an alternative structure for a dedicated pipeline for the processing of streaming data in accordance with the present invention.

Other dedicated structures can be established among a group of SPUs and their associated sandboxes for processing other types of data. For example, as shown in FIG. 41, a dedicated group of SPUs, e.g., SPUs 4102, 4108 and 4114, can be established for performing geometric transformations upon three dimensional objects to generate two dimensional display lists. These two dimensional display lists can be further processed (rendered) by other SPUs to generate pixel data. To perform this processing, sandboxes are dedicated to SPUs 4102, 4108 and 4114 for storing the three dimensional objects and the display lists resulting from the processing of these objects. For example, source sandboxes 4104, 4110 and 4116 are dedicated to storing the three dimensional objects processed by, respectively, SPU 4102, SPU 4108 and SPU 4114. In a similar manner, destination sandboxes 4106, 4112 and 4118 are dedicated to storing the display lists resulting from the processing of these three dimensional objects by, respectively, SPU 4102, SPU 4108 and SPU 4114.

Coordinating SPU 4120 is dedicated to receiving in its local storage the display lists from destination sandboxes 4106, 4112 and 4118. SPU 4120 arbitrates among these display lists and sends them to other SPUs for the rendering of pixel data.

Figure 42:
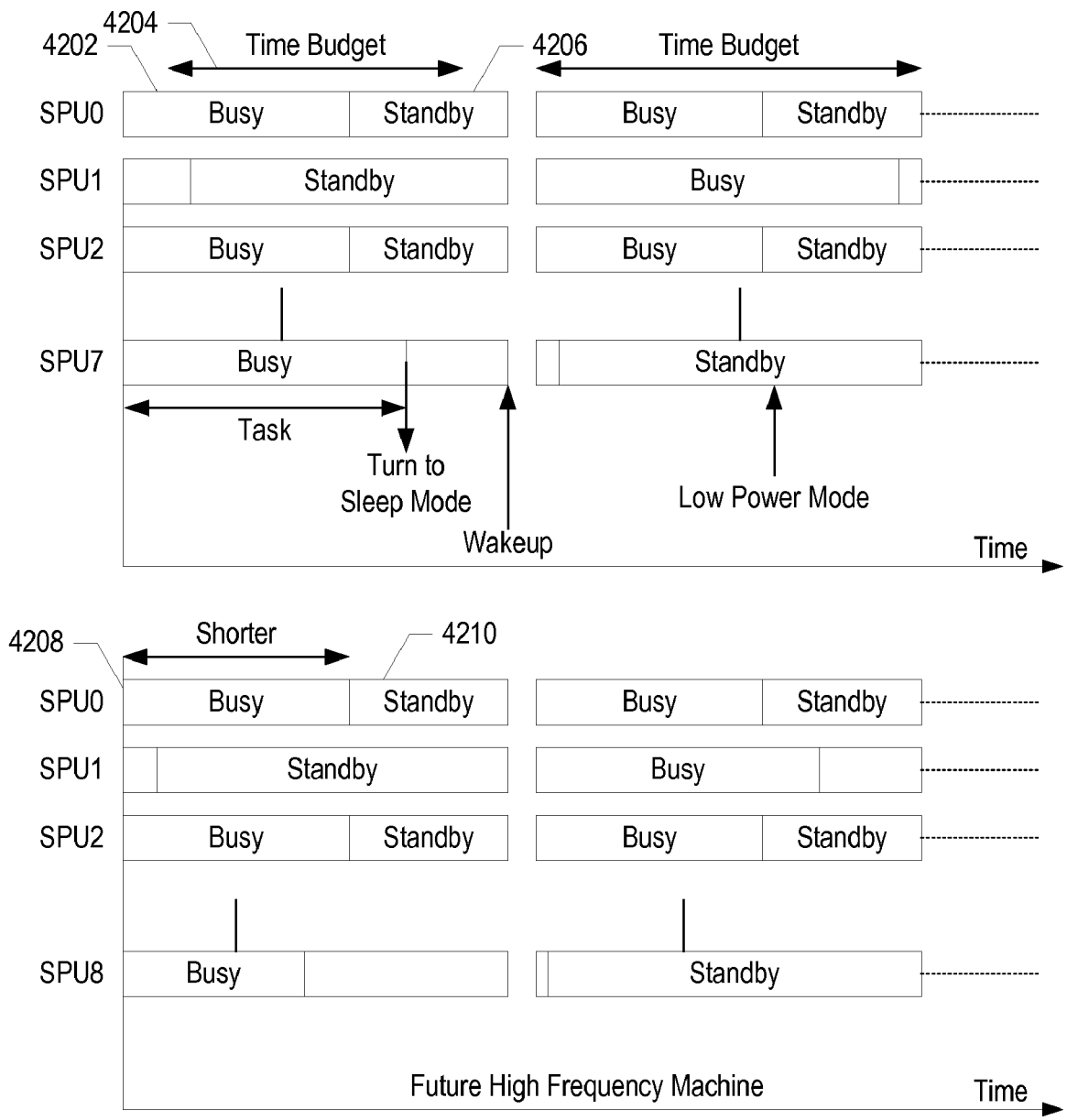
FIG. 42 illustrates a scheme for an absolute timer for coordinating the parallel processing of applications and data by SPUs in accordance with the present invention.

The processors of system 101 also employ an absolute timer. The absolute timer provides a clock signal to the SPUs and other elements of a PU which is both independent of, and faster than, the clock signal driving these elements. The use of this absolute timer is illustrated in FIG. 42.

As shown in this figure, the absolute timer establishes a time budget for the performance of tasks by the SPUs. This time budget provides a time for completing these tasks which is longer than that necessary for the SPUs' processing of the tasks. As a result, for each task, there is, within the time budget, a busy period and a standby period. All spulets are written for processing on the basis of this time budget regardless of the SPUs' actual processing time or speed.

For example, for a particular SPU of a PU, a particular task may be performed during busy period 4202 of time budget 4204. Since busy period 4202 is less than time budget 4204, a standby period 4206 occurs during the time budget. During this standby period, the SPU goes into a sleep mode during which less power is consumed by the SPU.

The results of processing a task are not expected by other SPUs, or other elements of a PU, until a time budget 4204 expires. Using the time budget established by the absolute timer, therefore, the results of the SPUs' processing always are coordinated regardless of the SPUs' actual processing speeds.

In the future, the speed of processing by the SPUs will become faster. The time budget established by the absolute timer, however, will remain the same. For example, as shown in FIG. 42, an SPU in the future will execute a task in a shorter period and, therefore, will have a longer standby period. Busy period 4208, therefore, is shorter than busy period 4202, and standby period 4210 is longer than standby period 4206. However, since programs are written for processing on the basis of the same time budget established by the absolute timer, coordination of the results of processing among the SPUs is maintained. As a result, faster SPUs can process programs written for slower SPUs without causing conflicts in the times at which the results of this processing are expected.

In lieu of an absolute timer to establish coordination among the SPUs, the PU, or one or more designated SPUs, can analyze the particular instructions or microcode being executed by an SPU in processing an spulet for problems in the coordination of the SPUs' parallel processing created by enhanced or different operating speeds. "No operation" ("NOOP") instructions can be inserted into the instructions and executed by some of the SPUs to maintain the proper sequential completion of processing by the SPUs expected by the spulet. By inserting these NOOPs into the instructions, the correct timing for the SPUs' execution of all instructions can be maintained.

Figure 43A:
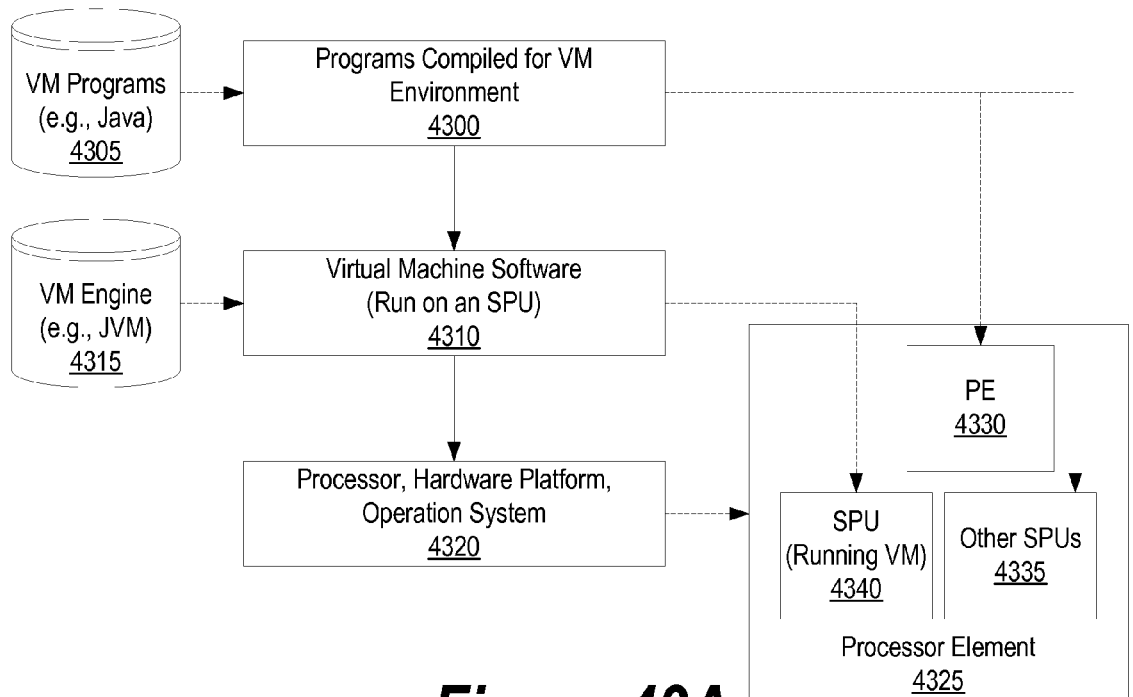
FIG. 43A is a system diagram showing a virtual machine program running in an SPU and executing virtual machine programs running in other processors.

FIG. 43A is a system diagram showing a virtual machine program running in an SPU and executing virtual machine programs running in other processors. At step 4300, virtual machine programs (4305) that have been compiled for a virtual machine environment, such as a Java Virtual Machine (JVM) environment are loaded into one of the processors, such as PU processor 4330 or one of the SPUs 4335 that are within processor element 4325 and share a common memory.

At step 4310, virtual machine engine (4315), such as a Java Virtual Machine (JVM) engine is loaded and executed in SPU 4340 which is also within processor element 4325 and shares a common memory with PU processor 4330 and other SPU processors 4335. The virtual machine engine (4315) is designed and written for the processors (PE 4325), hardware platform, and the operating system that is running the computer system (4320). In this manner, the virtual machine engine is written to take advantage of the processing capabilities of the SPU processors working in conjunction with one or more PU processors using a shared common memory space.

Figure 43B:
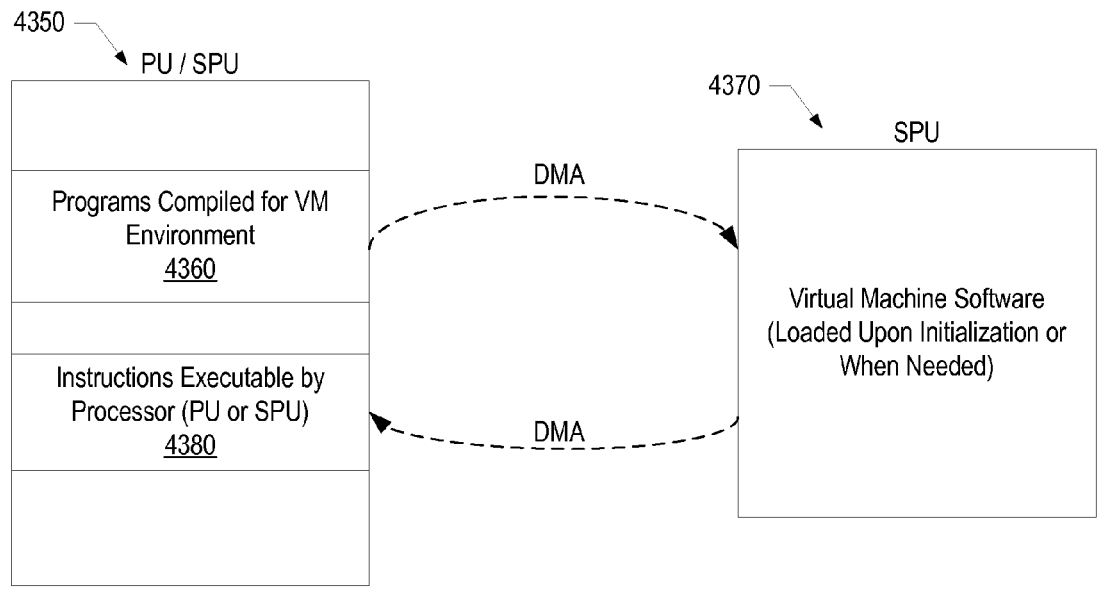
FIG. 43B is a diagram showing data being retrieved from common memory to the virtual machine SPU and resulting instructions being written back to the common memory.

FIG. 43B is a diagram showing data being retrieved from common memory to the virtual machine SPU and resulting instructions being written back to the common memory. Processor 4350 may be either a PU or SPU processor and loads program 4360 that has been compiled for a virtual machine environment in shared memory. SPU 4370 runs a virtual machine engine and reads program 4360 to its local memory using DMA commands that are performed by a DMA controller. In one embodiment, a DMA controller is included with each of SPUs and PU processors to read data from the common shared memory area and write data back to the common shared memory area. SPU 4370, upon generating instructions executable by processor 4350, writes the executable instructions back to output buffer 4380. Output buffer 4380 is accessible from processor 4350, either as shared memory from which processor 4350 retrieves the executable instructions or is local memory to processor 4350 so that processor 4350 can directly execute the instructions.

Figure 44:
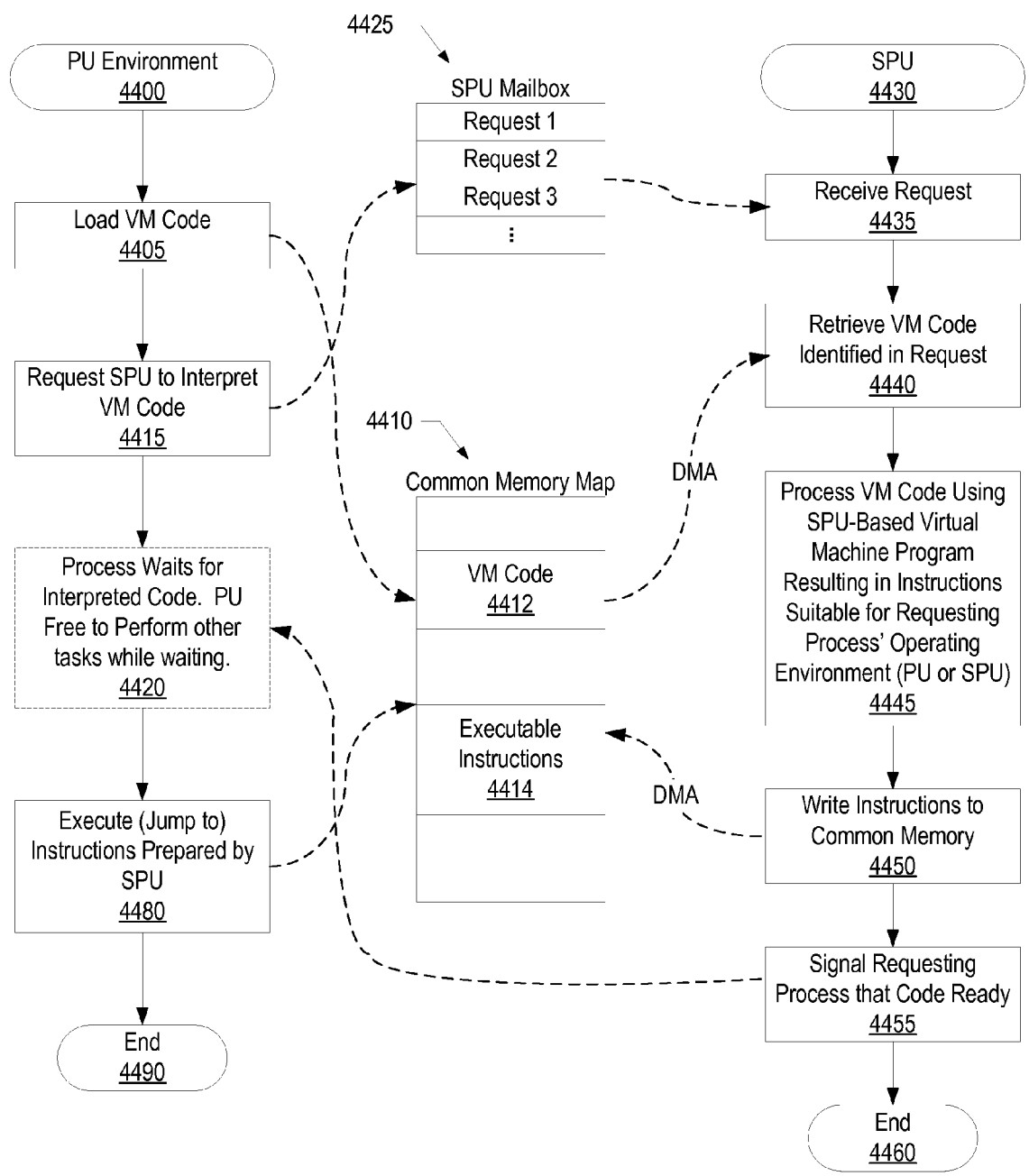
FIG. 44 is a flowchart showing a PU process running virtual machine code that is interpreted into executable instructions by an SPU process.

FIG. 44 is a flowchart showing a PU process running virtual machine code that is interpreted into executable instructions by an SPU process. Processing commences at 4400 whereupon, at step 4405, the PU (or SPU) process loads a virtual machine program into common (shared) memory 4410 as virtual machine code 4412. At step 4415, process 4400 requests the SPU that is running the virtual machine engine to process the code by writing a request, such as the address of virtual machine code 4412, into the SPU's mailbox (4425). At step 4420, process 4400 waits for the SPU to interpret the code. During the "wait" time, process 4400 is free to perform other commands that are not dependent upon the data being processed by the SPU.

SPU virtual machine engine processing commences at 4430 whereupon, at step 4435, the SPU receives the request written to the SPU's mailbox (4425). At step 4440, the virtual machine code (4412) that was written to the shared memory is retrieved using a DMA command. At step 4445, the retrieved virtual machine code is processed using a virtual machine engine that is adapted to create instructions that can be executed in the environment of the requesting process (i.e., if the requesting process is a PU process, then the resulting instructions are executable on the PU processor, if the requesting process is an SPU process, then the resulting instructions are executable on an SPU processor). At step 4450, the resulting executable instructions are written back to common (shared) memory (memory 4414) that is accessible by process 4400. At step 4455, the SPU running the virtual machine engine signals the requesting process that the request has completed and SPU processing ends at 4460 (SPU processing commences once again when another request arrives in the SPU's mailbox).

Returning to process 4400, the process is notified that the virtual machine engine has completed the request and, at step 4480, the instructions written to memory 4414 are executed. If the instructions were written to memory local to the processor running process 4400, then the process can jump to the instructions. Otherwise, process 4400 first uses a DMA command to read the executable instructions to its local memory and executes the instructions once the instructions have been read. Process 4400 thereafter ends at 4490.

Figure 45:
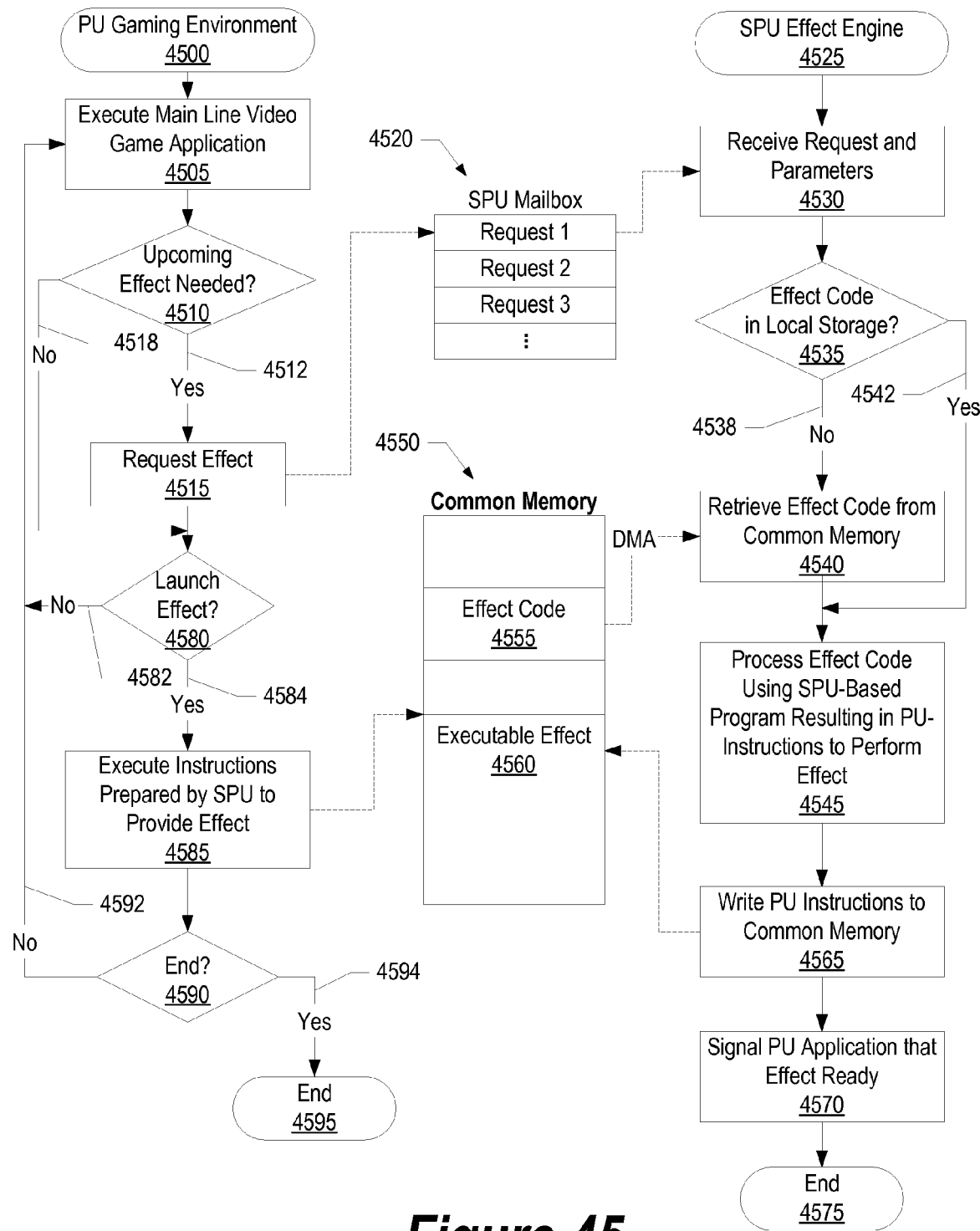
FIG. 45 is a flowchart showing a PU process running a game program and an SPU process being used to prepare effects executable by the PU game program.

FIG. 45 is a flowchart showing a PU process running a game program and an SPU process being used to prepare effects executable by the PU game program. In a gaming environment, a process running on one processor, such as the PU processor, runs a game program that uses the SPU to prepare effects that may be needed based upon current characteristics of the game being played by the user. Depending upon the choices made by the user, different effects are prepared in anticipation of the user triggering the effects by performing a particular game function.

The PU gaming environment commences at 4500 whereupon the main video game application is executed (step 4505). During execution of the game, determinations are made as to whether effects are needed based on the current characteristics of the game (decision 4510). If an effect is needed, decision 4510 branches to "yes" branch 4512 whereupon the effect is requested (step 4515) to be prepared by an effect engine running on one or more of the SPUs. The request is made by writing a value, such as an address, corresponding to the effect to SPU mailbox 4520 that corresponds with the SPU that is running the effect engine.

SPU processing commences at 4525 whereupon the SPU receives the request for the effect along with any parameters that may be needed from the SPU's mailbox 4520. Additional parameter data can be provided to the SPU through the use of an instruction block that is written by the gaming environment to common memory and retrieved by the SPU. The SPU effect engine process determines whether the software code being requested to perform the request is already in the SPU's local storage (decision 4535). If the software code is not in local storage, decision 4535 branches to "no" branch 4538 whereupon, at step 4540, the software code used to perform the effect is loaded into the SPU's local memory from common (shared) memory 4550 using a DMA command. On the other hand, if the software code was already in the SPU's local memory, decision 4535 branches to "yes" branch 4542 bypassing step 4540.

The software code used to create the effect is processed at step 4545. In one embodiment, the result of the processing are PU-instructions that are executable by the PU gaming process running on the PU processor. In another embodiment, the software code is actually performed (executed) on the SPU creating the special visual or audio effect for the user. If the result of the processing are PU-instructions that are executable by the PU gaming process running on the PU processor, the PU instructions are written back to common memory 4550 at step 4565 and the PU gaming application is signaled indicating that the requested effect code is ready (step 4570). SPU effect engine thereafter ends at 4575 (SPU processing commences once again when another request arrives in the SPU's mailbox).

Returning to PU gaming process 4500, a determination is made as to whether to execute an effect that was requested (decision 4580). If the effect is not being executed (i.e., the choices made by the user did not cause the effect to actually occur), then decision 4580 branches to "no" branch 4582 and the game program continues to execute (the executable effect code is still stored in memory 4550 for execution if needed later on). On the other hand, if the effect is being executed, decision 4580 branches to "yes" branch 4584 whereupon the instructions prepared by the SPU effects engine (stored in memory 4550 in memory area 4560) are executed at step 4585. A determination is made as to whether the game program is finished (decision 4590). If the game program is not finished, decision 4590 branches to "no" branch 4592 whereupon the game program continues until the game is over, at which point decision 4590 branches to "yes" branch 4594 and processing ends at 4595.

Figure 46:
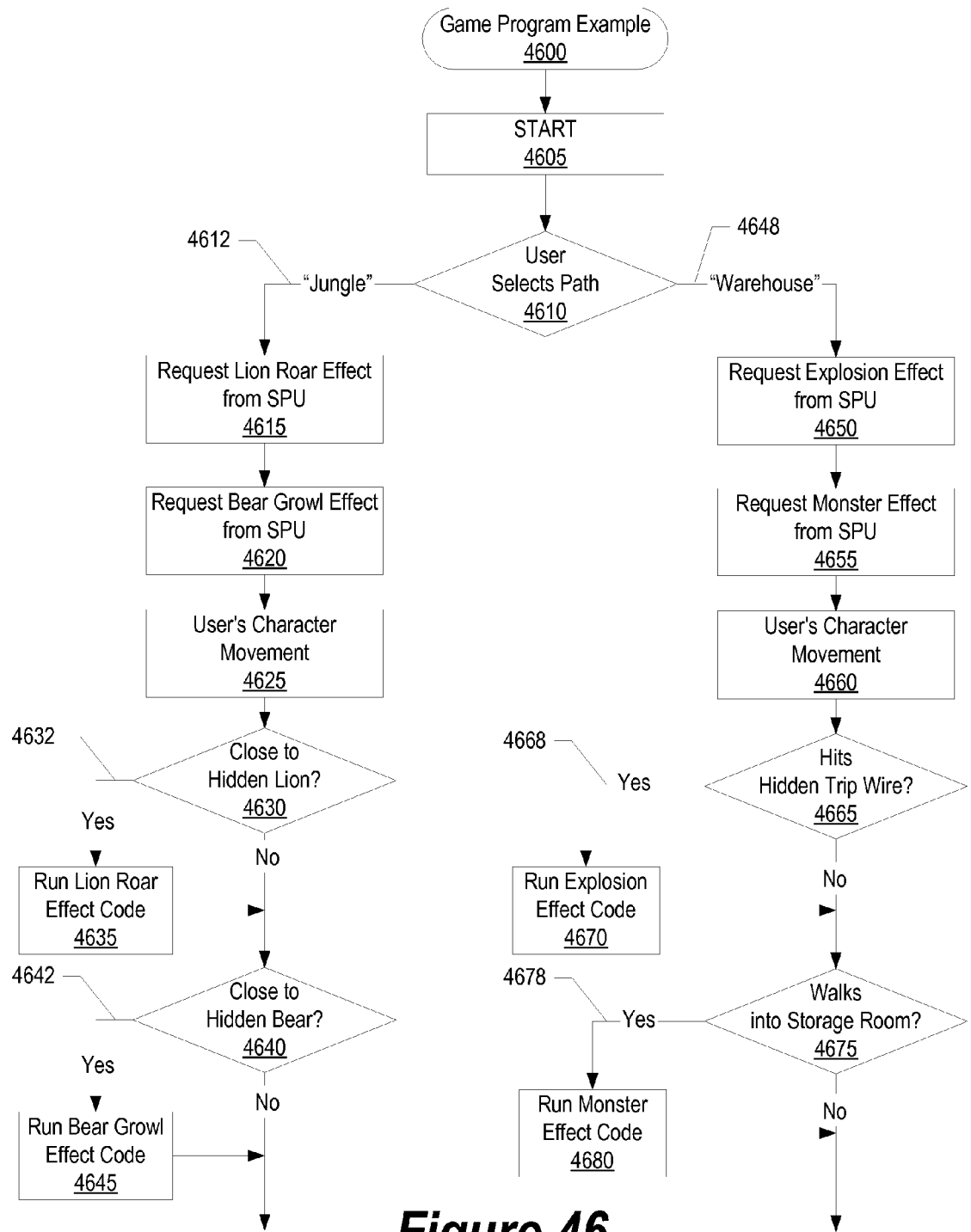
FIG. 46 is a flowchart showing a game example of effects being prepared by an SPU and subsequently launched by the PU game program.

FIG. 46 is a flowchart showing a game example of effects being prepared by an SPU and subsequently launched by the PU game program. The flow shown in FIG. 46 is a simplistic example of code being prepared by an SPU effects engine in anticipation of the effects being needed by the game program so that, when the effects are actually needed, time needed to load the effects is eliminated or minimized and the visual flow of the game is uninterrupted.

The example game commences at 4600 with a user starting a game at 4605. The user selects a path in the game by choosing a path being displayed on the video screen (decision 4610). One path leads to a "jungle" (path 4612), while the other path leads to a "warehouse" (path 4648).

If the user chooses to go to the "jungle" path, a couple special effects are requested from the SPU effects engine. At step 4615 a "lion roar" effect is requested and at step 4620 a bear growl is requested. At step 4625, the user continues to move a character through paths displayed on the screen. If the user's character is close to the lion's hidden location, decision 4630 branches to "yes" branch 4632 causing the lion "roar" code (requested in step 4615) to execute without having to wait to load and prepare the lion roar code as the SPU effects engine already prepared the code. Likewise, if the user gets too close to the bear's hidden location, decision 4640 branches to "yes" branch 4642 whereupon the bear growling code is executed (step 4645).

Returning to decision 4610, if the user selected to go into the "warehouse", decision 4610 branches to path 4648 whereupon a couple effects are requested—an explosion effect is requested at step 4650 and a monster effect is requested at step 4655. These effects are prepared and loaded in memory by the SPU effects engine. At step 4660 the user continues to move the character through the warehouse being displayed on the screen. If the user's character hits a hidden tripwire, decision 4665 branches to "yes" branch 4668 whereupon the explosion code that was prepared by the SPU is executed at step 4670. Likewise, if the user enters a storage room in the warehouse, the monster effect code is executed at step 4680. In the manner described above, code that may be needed to perform an effect is preloaded by an SPU processor without causing the PU processor to load the code and make the user wait while the code is loaded.

Figure 47:
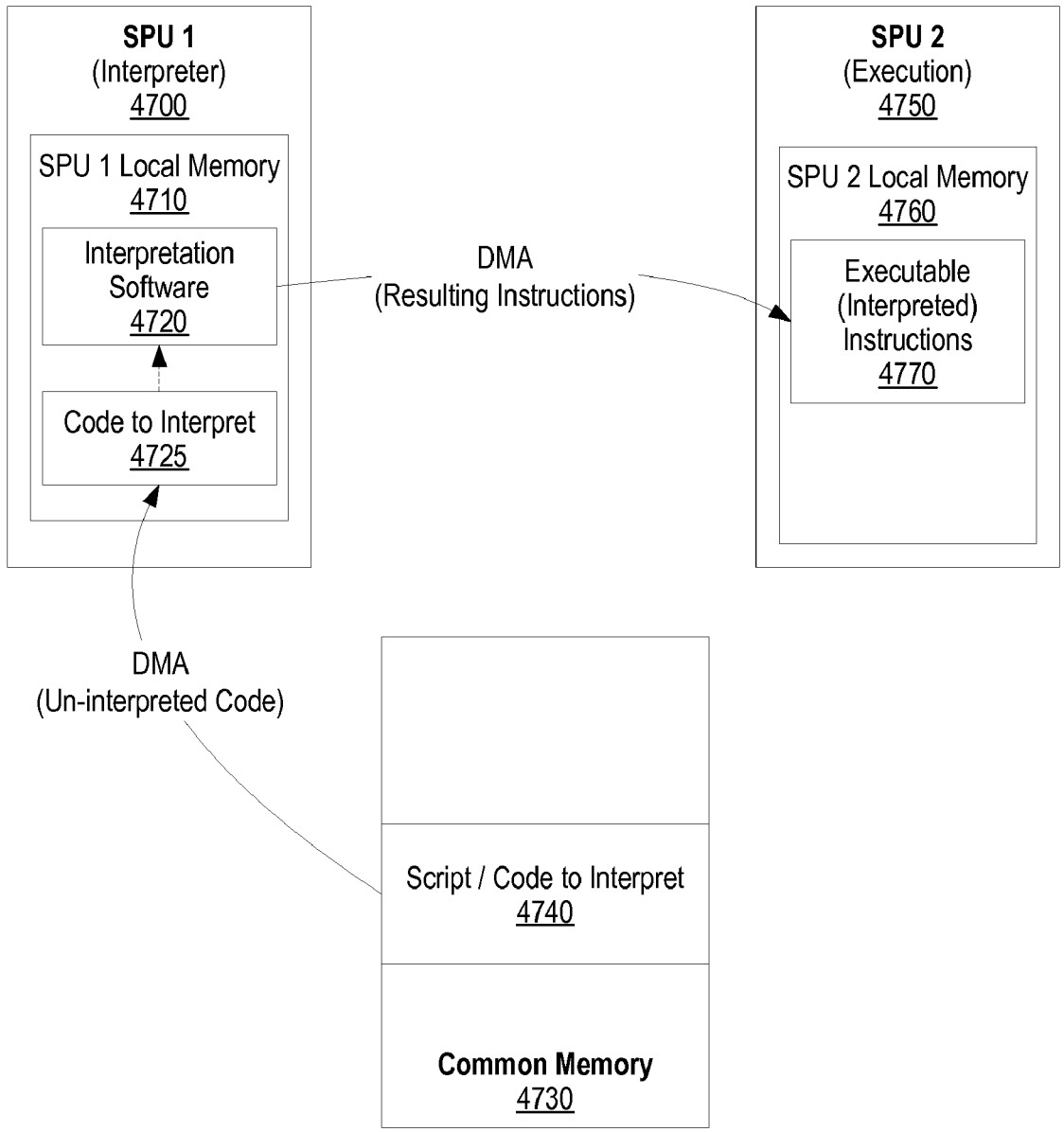
FIG. 47 is a diagram showing one SPU interpreting code and feeding the resulting executable instructions to a second SPU for execution.

FIG. 47 is a diagram showing one SPU interpreting code and feeding the resulting executable instructions to a second SPU for execution. SPU 4700 is acting as an interpreter for interpreted software and feeds the resulting executable instructions to SPU 4750 for execution. Each SPU has its own local memory (local memory 4710 corresponding to SPU 4700 and local memory 4760 corresponding to SPU 4750).

SPU 4700 acts as an interpreter and includes interpretation software 4720 in its local memory. SPU 4700 performs DMA commands to read scripted code or code that needs to be interpreted (4740) from common memory 4730. Common memory is shared memory that can be accessed by a plurality of processors, including SPUs 4700 and 4750. In addition, the SPUs' local memory (4710 and 4760) can be shared amongst other processors so that one processor can use DMA operations to write and read and data directly to and from another SPU's local memory. In this manner, SPU 4700 retrieves code 4740 from common memory 4730 and stores the code in SPU 4700's local memory (code to interpret 4725). When SPU 4700 is finished interpreting the code into instructions that can be executed, the resulting code is written to SPU 4750's local memory (executable instructions 4770) where it is executed by SPU 4750.

SPU 4700, therefore, works in tandem with SPU 4750 to execute a script or software code that needs to be interpreted. SPU 4700 prepares the code by reading it from shared memory and interpreting the code into executable instructions that are written directly to SPU 4750's local memory. SPU 4750 executes the executable instructions that have been written to its local memory. Other systems can be envisioned using additional SPUs. For example, an additional SPU could be used to read the data to the interpreter SPU's local memory alleviating the task of reading data from common memory from the SPU.

Figure 48:
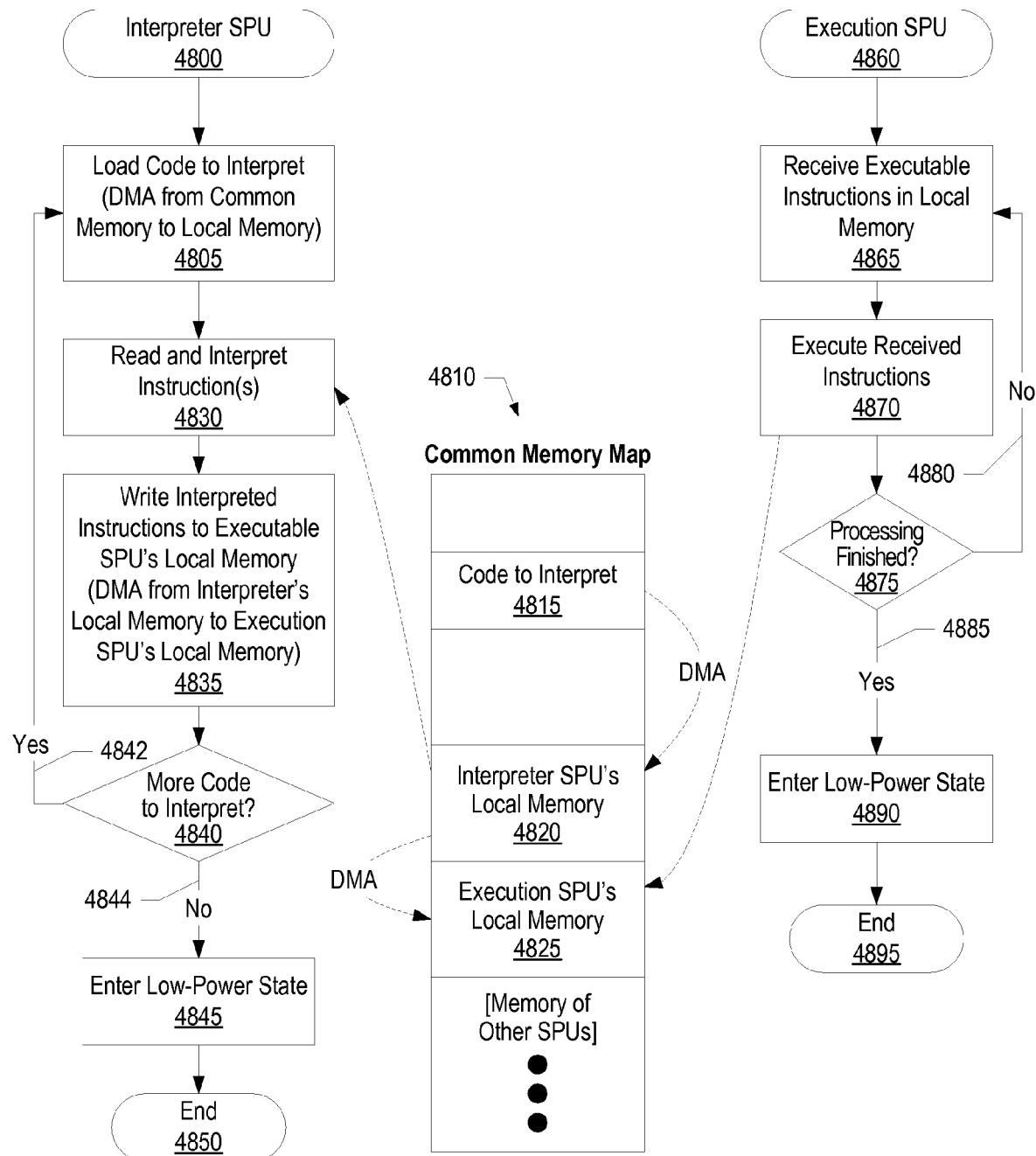
FIG. 48 is a flowchart showing the steps involved in one SPU interpreting code and feeding the resulting executable instructions to a second SPU for execution.

FIG. 48 is a flowchart showing the steps involved in one SPU interpreting code and feeding the resulting executable instructions to a second SPU for execution, as depicted in FIG. 47.

The interpreter SPU's processing commences at 4800 whereupon, at step 4805, the interpreter SPU loads the code to be interpreted from common (shared) memory 4810 using a DMA command. In one embodiment, a separate DMA controller is associated with each processor (SPUs and PUs) so that the DMA operations are performed efficiently (i.e., the interpreter SPU does not have to wait for access to a common DMA controller).

Common memory 4810 is shared amongst processors. Much of the common memory is local to the PU processor. This is where code to interpret 4815 is located within the common memory. The local memory of the interpreter SPU is mapped as shared memory (memory block 4820). In addition, the local memory of the execution SPU is mapped as shared memory (memory block 4825). Local memory of other SPUs is also mapped to the common (shared) memory map. Mapping local memory to the common memory map enables one SPU to write and read data to and from the common memory that is local to the PU processor as well as write and read data to and from the common memory that is local to other SPUs.

As the diagram depicts, data is read from one location in the common memory map, acted upon, and written to another location in the common memory map using DMA commands. In step 4805, data is read from memory block 4815 and written to memory block 4820 so that the interpreter SPU, at step 4830, can efficiently read and interpret the instructions. At step 4835, the resulting interpreted instructions (i.e., executable instructions) are written to the execution SPU's local memory 4825, again using a DMA operation. The interpreter SPU makes a determination as to whether there is more code to interpret (decision 4840). If there is more code left to interpret, decision 4840 branches to "yes" branch 4842 which loops back to load the next block of code from shared memory and process (interpret) the code. This looping continues until there is no more code to interpret, at which point decision 4840 branches to "no" branch 4844. If there are no additional code interpretation requests for the interpreter SPU to process, the interpreter SPU, at step 4845, enters a low power state and processing ends at 4850.

The Execution SPU's processing commences at 4860 whereupon, at step 4865, it receives executable instructions written to its local memory by the interpreter SPU. At step 4870, the execution SPU executes the received instructions. The execution SPU makes a determination as to whether there are more executable instructions to execute (decision 4875, i.e., the execution SPU may receive additional executable instructions in its local memory). If processing is not finished, decision 4875 branches to "no" branch 4880 which loops back to receive and execute additional instructions. On the other hand, if processing is finished, decision 4875 branches to "yes" branch 4885 whereupon, at step 4890, the execution SPU enters a low power state as the execution SPU waits for additional instructions to execute and processing ends at 4895.

Figure 49:
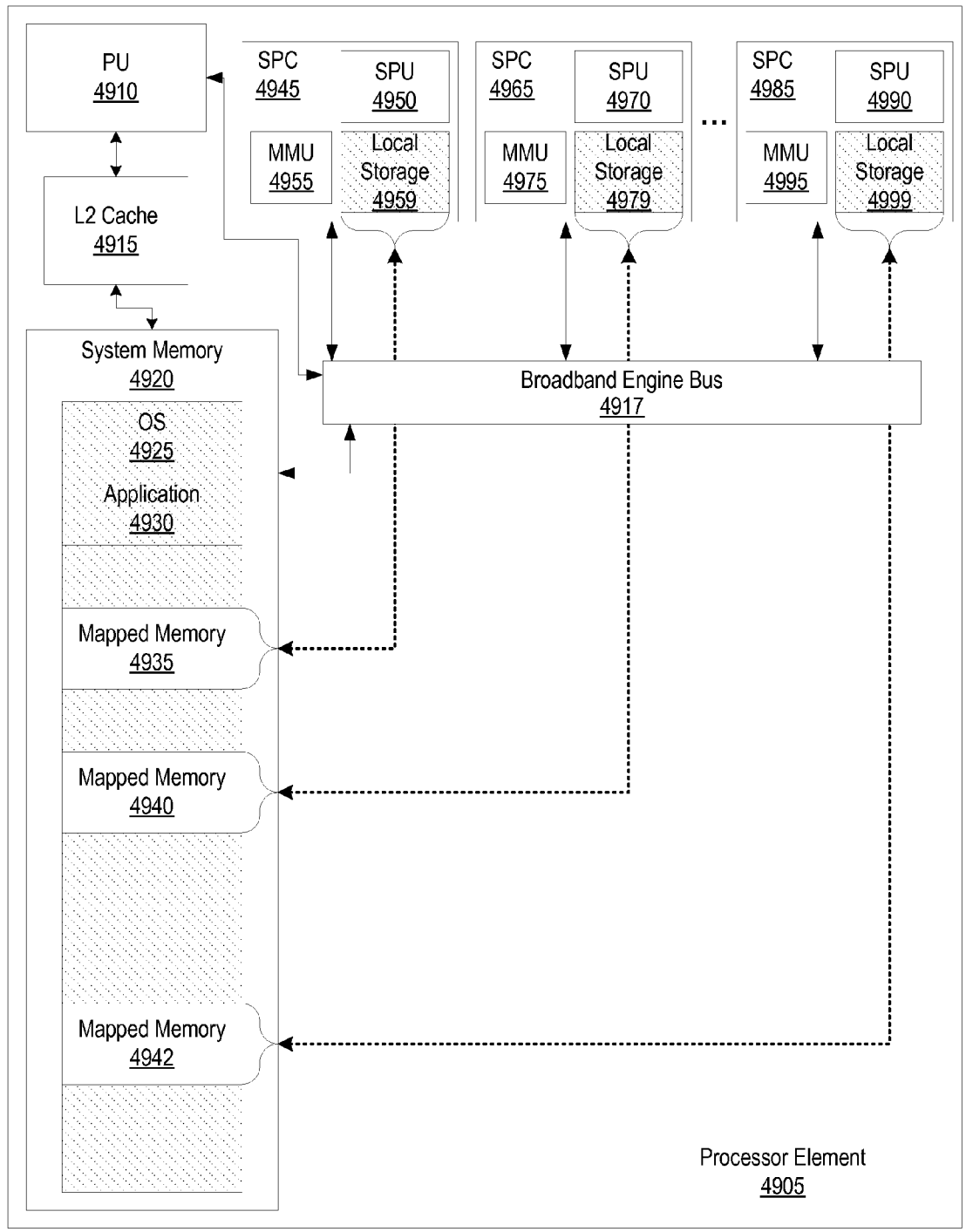
FIG. 49 is a block diagram illustrating a processing element having a main processor and a plurality of secondary processors sharing a system memory.

FIG. 49 is a block diagram illustrating a processing element having a main processor and a plurality of secondary processors sharing a system memory. Processor Element (PE) 4905 includes processing unit (PU) 4910, which, in one embodiment, acts as the main processor and runs an operating system. Processing unit 4910 may be, for example, a Power PC core executing a Linux operating system. PE 4905 also includes a plurality of synergistic processing complex's (SPCs) such as SPCs 4945, 4965, and 4985. The SPCs include synergistic processing units (SPUs) that act as secondary processing units to PU 4910, a memory storage unit, and local storage. For example, SPC 4945 includes SPU 4960, MMU 4955, and local storage 4959; SPC 4965 includes SPU 4970, MMU 4975, and local storage 4979; and SPC 4985 includes SPU 4990, MMU 4995, and local storage 4999.

Each SPC may be configured to perform a different task, and accordingly, in one embodiment, each SPC may be accessed using different instruction sets. If PE 4905 is being used in a wireless communications system, for example, each SPC may be responsible for separate processing tasks, such as modulation, chip rate processing, encoding, network interfacing, etc. In another embodiment, the SPCs may have identical instruction sets and may be used in parallel with each other to perform operations benefiting from parallel processing.

PE 4905 may also include level 2 cache, such as L2 cache 4915, for the use of PU 4910. In addition, PE 4905 includes system memory 4920, which is shared between PU 4910 and the SPUs. System memory 4920 may store, for example, an image of the running operating system (which may include the kernel), device drivers, I/O configuration, etc., executing applications, as well as other data. System memory 4920 includes the local storage units of one or more of the SPCs, which are mapped to a region of system memory 4920. For example, local storage 4959 may be mapped to mapped region 4935, local storage 4979 may be mapped to mapped region 4940, and local storage 4999 may be mapped to mapped region 4942. PU 4910 and the SPCs communicate with each other and system memory 4920 through bus 4917 that is configured to pass data between these devices.

The MMUs are responsible for transferring data between an SPU's local store and the system memory. In one embodiment, an MMU includes a direct memory access (DMA) controller configured to perform this function. PU 4910 may program the MMUs to control which memory regions are available to each of the MMUs. By changing the mapping available to each of the MMUs, the PU may control which SPU has access to which region of system memory 4920. In this manner, the PU may, for example, designate regions of the system memory as private for the exclusive use of a particular SPU. In one embodiment, the SPUs' local stores may be accessed by PU 4910 as well as by the other SPUs using the memory map. In one embodiment, PU 4910 manages the memory map for the common system memory 4920 for all the SPUs. The memory map table may include PU 4910's L2 Cache 4915, system memory 4920, as well as the SPUs' shared local stores.

In one embodiment, the SPUs process data under the control of PU 4910. The SPUs may be, for example, digital signal processing cores, microprocessor cores, micro controller cores, etc., or a combination of the above cores. Each one of the local stores is a storage area associated with a particular SPU. In one embodiment, each SPU can configure its local store as a private storage area, a shared storage area, or an SPU may configure its local store as a partly private and partly shared storage.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 4910 and by the other SPUs. An SPU may reserve part of its local store in order for the SPU to have fast, guaranteed memory access when performing tasks that require such fast access. The SPU may also reserve some of its local store as private when processing sensitive data, as is the case, for example, when the SPU is performing encryption/decryption.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for processing software code, said method comprising:
    loading a virtual machine engine into a common memory, the common memory accessible by a first processor and a second processor, wherein the first processor and the second processor are heterogeneous processors, wherein the first processor executes a first instruction set and wherein the second processor executes a second instruction set, and wherein the first processor includes a first local memory accessible to the first processor and the second processor includes a second local memory accessible to the second processor;
    loading, by the first processor, virtual machine code into the common memory, the virtual machine code adapted to be processed by the virtual machine engine;
    writing, by the first processor, a code processing request into a mailbox associated with the second processor;
    receiving, by the second processor, the code processing request from the second processor's mailbox;
    in response to receiving the code processing request, loading, at the second processor, the virtual machine engine from the common memory into the second local memory;
    in further response to receiving the code processing request, reading, by the second processor from the common memory software code data corresponding to the code request, the software code data including the virtual machine code;
    writing the software code data corresponding to the code processing request to the second local memory;
    processing the software code data by the second processor, wherein the processing includes processing the virtual machine code at the second processor using the virtual machine engine, the processing resulting in executable instructions, the executable instructions comprising instructions from the first instruction set and capable of being executed by the first processor;
    writing the executable instructions to a memory location accessible by the first processor; and
    executing, at the first processor, the executable instructions.

2. The method as described in claim 1 further comprising:
    writing data resulting from the executing to the common memory.

3. The method as described in claim 1 further comprising:
    prior to loading the virtual machine code into the common memory:
        running a first application program;
        in response to running the first application program, identifying a call to a software effect corresponding to the software code data; and
        loading the software code data into the common memory, wherein the processing of the software code data occurs during the running of the first application program and wherein the processing is completed prior to the first program calling the software effect.

4. The method as described in claim 3 further comprising:
    receiving, at the first processor, the executable instructions resulting from the processing performed by the second processor, wherein the executable instructions are adapted to perform a multimedia effect; and
    performing the multimedia effect on the first processor by executing the received executable instructions.

5. The method as described in claim 1 wherein the writing further comprises:

writing the executable instructions to a memory location accessible by the first processor using a direct memory access (DMA) operation.

6. The method as described in claim 5 wherein the memory location is selected from the group consisting of the first local memory, and the common memory.

7. The method as described in claim 1 further comprising:
writing the executable instructions to the common memory; and
notifying the first processor that the executable instructions have been written.

* * * * *